US012167230B2

(12) United States Patent
Han et al.

(10) Patent No.: US 12,167,230 B2
(45) Date of Patent: Dec. 10, 2024

(54) DATA FORWARDING IN MR-DC WITH 5GC OPERATIONS INVOLVING SN CHANGE

(71) Applicant: Apple Inc., Cupertino, CA (US)

(72) Inventors: Jaemin Han, Santa Clara, CA (US); Feng Yang, Cupertino, CA (US); Alexander Sirotkin, Santa Clara, CA (US); Sudeep Palat, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 579 days.

(21) Appl. No.: 17/311,749

(22) PCT Filed: Mar. 18, 2020

(86) PCT No.: PCT/US2020/023373
§ 371 (c)(1),
(2) Date: Jun. 8, 2021

(87) PCT Pub. No.: WO2020/191058
PCT Pub. Date: Sep. 24, 2020

(65) Prior Publication Data
US 2022/0030488 A1    Jan. 27, 2022

Related U.S. Application Data

(60) Provisional application No. 62/820,143, filed on Mar. 18, 2019.

(51) Int. Cl.
*H04W 40/36* (2009.01)
*H04W 36/00* (2009.01)
*H04W 36/08* (2009.01)

(52) U.S. Cl.
CPC ..... *H04W 40/36* (2013.01); *H04W 36/00698* (2023.05); *H04W 36/083* (2023.05)

(58) Field of Classification Search
CPC ..... H04W 36/04; H04W 36/06; H04W 36/08; H04W 36/083; H04W 36/13; H04W 40/36
See application file for complete search history.

(56) References Cited

U.S. PATENT DOCUMENTS 5,565,670 A * 10/1996 Flaherty ............. G06K 17/0022
235/462.49
10,779,254 B2 * 9/2020 Lee ....................... H04L 47/821
(Continued)

FOREIGN PATENT DOCUMENTS

CN    104812008    7/2015
CN    106538034    3/2017
(Continued)

OTHER PUBLICATIONS

International Search Report and Written Opinion for International Application No. PCT/US2020/023373, mailed Jun. 26, 2020, 13 pgs.
(Continued)

*Primary Examiner* — Jean A Gelin
(74) *Attorney, Agent, or Firm* — Kowert, Hood, Munyon, Rankin & Goetzel, P.C.

(57) ABSTRACT

Apparatuses, systems, and methods for a network node to inter-connect with a first secondary node (SN) within a core network. The network node may be a master node and may serve a UE. The first SN may be a source SN. The network node may initiate a change from the first SN to a second SN, which may be a target SN. The network mode may determine data forwarding from the first SN to the second SN and may request, from the first SN, data forwarding intentions prior to initiating the change from the first SN to a second first SN to the second SN. The network node may send, to the first SN, data forwarding instructions (e.g., based, at least in part, on the data forwarding intentions of the first SN) and
(Continued)

the data forwarding instructions may include a requirement for the first SN to follow the data forwarding instructions.

20 Claims, 22 Drawing Sheets

(56) References Cited

U.S. PATENT DOCUMENTS

| | | | |
|---|---|---|---|
| 2012/0044836 A1* | 2/2012 | Sivavakeesar | H04W 24/02 370/255 |
| 2015/0071250 A1* | 3/2015 | Dai | H04W 36/0079 370/331 |
| 2015/0372922 A1* | 12/2015 | He | H04L 47/125 370/235 |
| 2018/0270778 A1* | 9/2018 | Bharatia | H04L 65/1073 |
| 2018/0270895 A1* | 9/2018 | Park | H04W 8/18 |
| 2018/0376444 A1* | 12/2018 | Kim | H04W 36/0022 |
| 2018/0376445 A1* | 12/2018 | Yoon | H04W 60/06 |
| 2019/0281522 A1* | 9/2019 | Wong | H04W 28/0268 |
| 2019/0335364 A1* | 10/2019 | Liu | H04W 36/0077 |
| 2020/0145953 A1* | 5/2020 | Youn | H04W 60/04 |
| 2020/0366794 A1* | 11/2020 | Lee | H04W 60/00 |
| 2021/0084130 A1* | 3/2021 | Dai | H04L 69/327 |

FOREIGN PATENT DOCUMENTS

| | | |
|---|---|---|
| CN | 106941733 | 7/2017 |
| CN | 107302770 | 10/2017 |
| CN | 108811004 | 11/2018 |
| CN | 108990116 | 12/2018 |
| EP | 2846583 A1 | 3/2015 |

OTHER PUBLICATIONS

R3 (ERICSSON): "Data volume reporting for MR-DC with 5GC", 3GPP TSG-RAN WG2, Meeting #105; R2-1902758_R3-190934, Feb. 25-Mar. 1, 2019, Athens, Greece, 13 pgs.

Samsung: "(TP for NR BL CR for TS 38.423): DC establishment for PDCP Termination at SN", 3GPP TSG-RAN WG3 NR AdHoc 1807; R3-183698, Jul. 2-6, 2018, Montreal, Canada; 12 pgs.

Intel Corporation et al: "Correction for data forwarding in MR-DC (PX) with 5GC operations involving SN change", 3GPP TSG-RAN WG3; Meeting #103bis; R3-191792, Apr. 8-12, 2019, Xi'an, China; 3 pgs.

Office Action for CN Patent Application No. 202080007225.3; May 6, 2024.

Ericsson "Corrections for MR-DC procedures"; 3GPP TSG-RAN WG2 Meeting #105 R2-1902667; Feb. 5, 2019.

Nokia et al. "Transfer of the PSCell information for LI purposes"; 3GPP TSG-RAN Meeting #83 RP-190201; Mar. 18, 2019.

Ericsson "Rapporteur updates on version 15.4.0"; 3GPP TSG-RAN WG3 Meeting #103 R3-190737; Feb. 25, 2019.

* cited by examiner

DATA FORWARDING IN MR-DC WITH 5GC OPERATIONS INVOLVING SN CHANGE

This application is a U.S. National Stage filing of International Application No. PCT/US2020/023373, filed Mar. 18, 2020, titled "DATA FORWARDING IN MR-DC WITH 5GC OPERATIONS INVOLVING SN CHANGE", which claims the benefit of priority to the U.S. Provisional Application No. 62/820,143, filed Mar. 18, 2019. All of the aforementioned applications are incorporated herein by reference in their entireties.

FIELD

The present application relates to wireless communications, and more particularly to apparatuses, systems, and methods for data forwarding in multi-RAT dual connectivity (MR-DC) with 5G core network (5GC) operations involving secondary node (SN) change.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities.

Long Term Evolution (LTE) has become the technology of choice for the majority of wireless network operators worldwide, providing mobile broadband data and high-speed Internet access to their subscriber base. LTE defines a number of downlink (DL) physical channels, categorized as transport or control channels, to carry information blocks received from medium access control (MAC) and higher layers. LTE also defines a number of physical layer channels for the uplink (UL).

For example, LTE defines a Physical Downlink Shared Channel (PDSCH) as a DL transport channel. The PDSCH is the main data-bearing channel allocated to users on a dynamic and opportunistic basis. The PDSCH carries data in Transport Blocks (TB) corresponding to a MAC protocol data unit (PDU), passed from the MAC layer to the physical (PHY) layer once per Transmission Time Interval (TTI). The PDSCH is also used to transmit broadcast information such as System Information Blocks (SIB) and paging messages.

As another example, LTE defines a Physical Downlink Control Channel (PDCCH) as a DL control channel that carries the resource assignment for UEs that are contained in a Downlink Control Information (DCI) message. Multiple PDCCHs can be transmitted in the same subframe using Control Channel Elements (CCE), each of which is a nine set of four resource elements known as Resource Element Groups (REG). The PDCCH employs quadrature phase-shift keying (QPSK) modulation, with four QPSK symbols mapped to each REG. Furthermore, 1, 2, 4, or 8 CCEs can be used for a UE, depending on channel conditions, to ensure sufficient robustness.

Additionally, LTE defines a Physical Uplink Shared Channel (PUSCH) as a UL channel shared by all devices (user equipment, UE) in a radio cell to transmit user data to the network. The scheduling for all UEs is under control of the LTE base station (enhanced Node B, or eNB). The eNB uses the uplink scheduling grant (DCI format 0) to inform the UE about resource block (RB) assignment, and the modulation and coding scheme to be used. PUSCH typically supports QPSK and quadrature amplitude modulation (QAM). In addition to user data, the PUSCH also carries any control information necessary to decode the information, such as transport format indicators and multiple-in multiple-out (MIMO) parameters. Control data is multiplexed with information data prior to digital Fourier transform (DFT) spreading.

A proposed next telecommunications standard moving beyond the current International Mobile Telecommunications-Advanced (IMT-Advanced) Standards is called 5th generation mobile networks or 5th generation wireless systems, or 5G for short (otherwise known as 5G-NR for 5G New Radio, also simply referred to as NR). 5G-NR proposes a higher capacity for a higher density of mobile broadband users, also supporting device-to-device, ultra-reliable, and massive machine communications, as well as lower latency and lower battery consumption, than current LTE standards. Further, the 5G-NR standard may allow for less restrictive UE scheduling as compared to current LTE standards. Consequently, efforts are being made in ongoing developments of 5G-NR to take advantage of higher throughputs possible at higher frequencies.

SUMMARY

Embodiments relate to apparatuses, systems, and methods for data forwarding in multi-RAT dual connectivity (MR-DC) with 5G core network (5GC) operations involving secondary node (SN) change.

In some embodiments, a wireless device, e.g., such as a network node, may be configured to inter-connect with a first secondary node within a core network, such as a 5G core network. The network node may be a master node and may serve a user equipment device (UE). In some embodiments, the first secondary node may be a source secondary node. Additionally, the network node may be configured to initiate a change from the first secondary node to a second secondary node in the core network. In some embodiments, the second secondary node may be a target secondary node. The network mode may be configured to determine data forwarding from the first secondary node to the second secondary node. In some embodiments, the network node may request, from the first secondary node, data forwarding intentions of the first secondary node prior to initiating the change from the first secondary node to the second secondary node and data forwarding instructions may be based, at least in part, on the data forwarding intentions of the first secondary node. The network node may be configured send, to the first secondary node, data forwarding instructions. In some embodiments, the data forwarding instructions may include a requirement for the first secondary node to follow the data forwarding instructions. In some embodiments, the data forwarding instructions may include data forwarding addresses.

The techniques described herein may be implemented in and/or used with a number of different types of devices, including but not limited to unmanned aerial vehicles (UAVs), unmanned aerial controllers (UACs), base stations, access points, cellular phones, tablet computers, wearable computing devices, portable media players, automobiles and/or motorized vehicles, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Note that the following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B). An architecture includes, but is not limited to, a network topology. Examples of an architecture include, but is not limited to, a network, a network topology, and a system. Examples of a network include, but is not limited to, a time sensitive network (TSN), a core network (CN), any other suitable network known in the field of wireless communications, or any combination thereof.

BRIEF DESCRIPTION OF THE DRAWINGS

A better understanding of the present subject matter can be obtained when the following detailed description of various embodiments is considered in conjunction with the following drawings, in which.

Figure 1A:
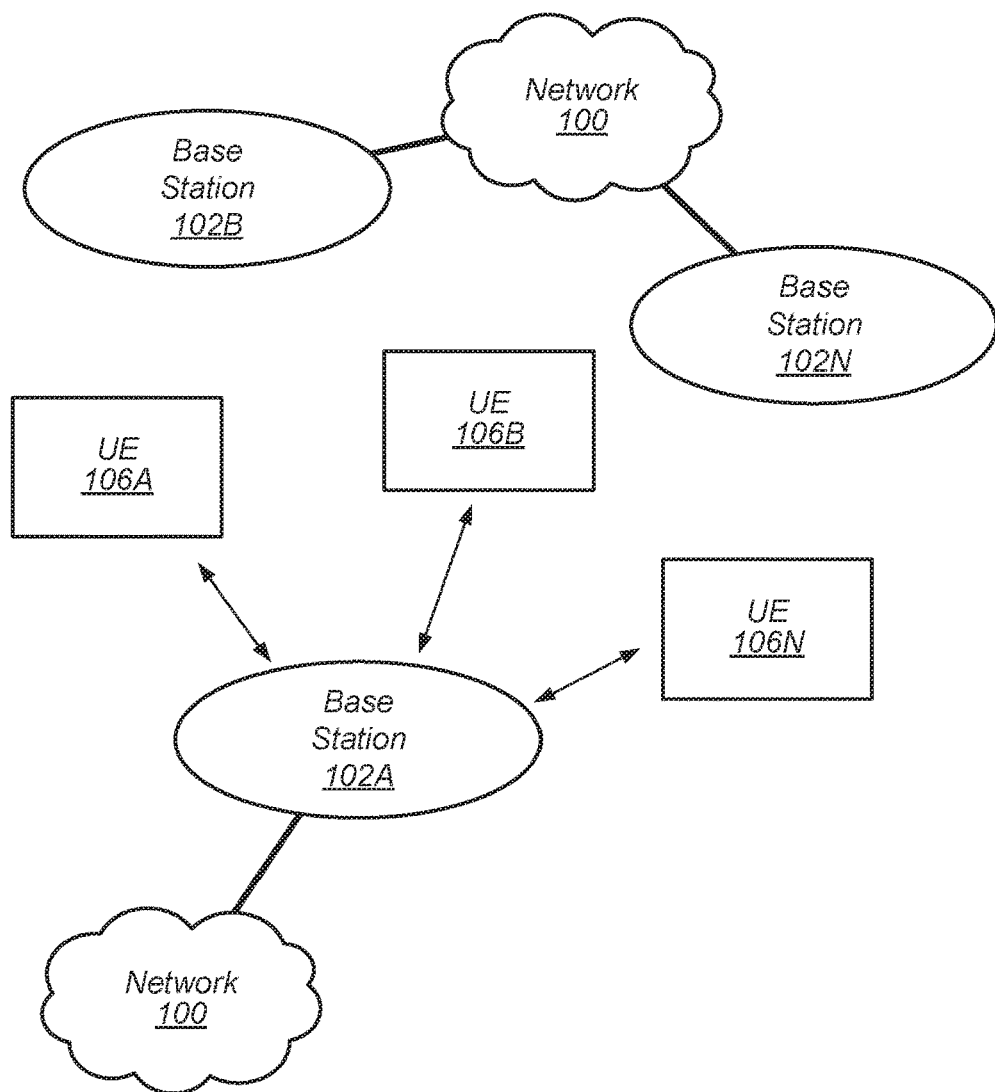
FIG. 1A illustrates an example wireless communication system according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

3GPP: Third Generation Partnership Project
TS: Technical Specification
RAN: Radio Access Network
RAT: Radio Access Technology
UE: User Equipment
RF: Radio Frequency
BS: Base Station
DL: Downlink
UL: Uplink
LTE: Long Term Evolution
NR: New Radio
5GS: 5G System
5GMM: 5GS Mobility Management
5GC: 5G Core Network
IE: Information Element DC: Intra-E-UTRA Dual Connectivity
EN-DC: E-UTRA-NR Dual Connectivity
MCG: Master Cell Group
MN: Master Node
MR-DC: Multi-Radio Dual Connectivity
NE-DC: NR-E-UTRA Dual Connectivity
NGEN-DC: NG-RAN E-UTRA-NR Dual Connectivity
NR-DC: NR-NR Dual Connectivity
SCG: Secondary Cell Group
SN: Secondary Node
DRB: Dedicated Radio Bearer
SRB: Signaling Radio Bearer Terms The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, other handheld devices, automobiles and/or motor vehicles, unmanned aerial vehicles (UAVs) (e.g., drones), UAV controllers (UACs), and so forth. In general, the term "UE" or "UE device" can be broadly defined to encompass any electronic, computing, and/or telecommunications device (or combination of devices) which is easily transported by (or with) a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 1B:
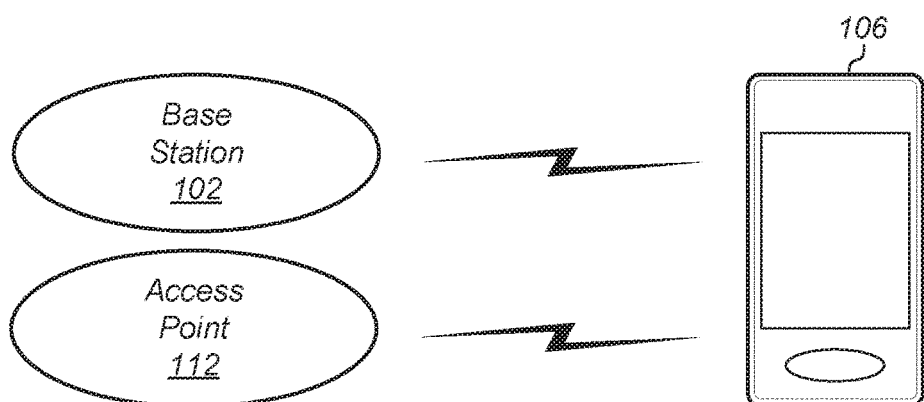
FIG. 1B illustrates an example of a base station (BS) and an access point in communication with a user equipment (UE) device according to some embodiments.

FIGS. 1A and 1B—Communication Systems

FIG. 1A illustrates a simplified example wireless communication system, according to some embodiments. It is noted that the system of FIG. 1A is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 1B illustrates user equipment 106 (e.g., one of the devices 106A through 106N) in communication with a base station 102 and an access point 112, according to some embodiments. The UE 106 may be a device with both cellular communication capability and non-cellular communication capability (e.g., Bluetooth, Wi-Fi, and so forth) such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD), LTE/LTE-Advanced, or 5G NR using a single shared radio and/or GSM, LTE, LTE-Advanced, or 5G NR using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Figure 2:
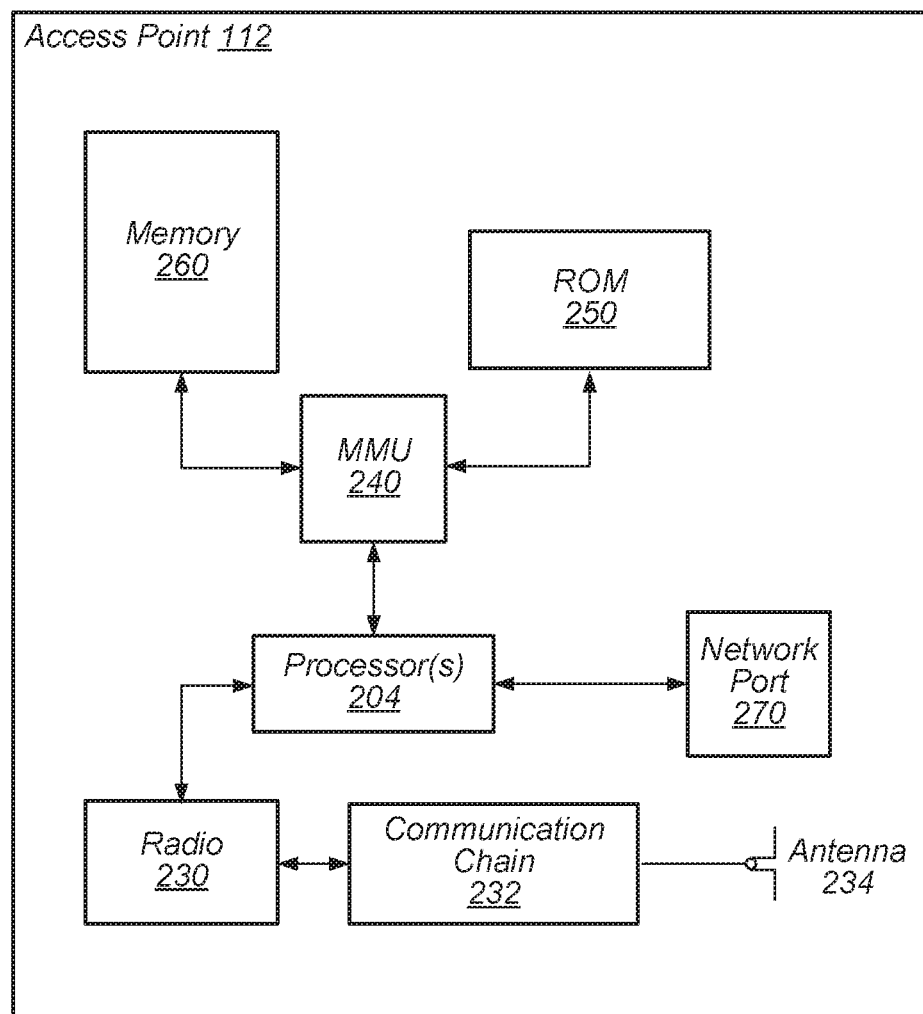
FIG. 2 illustrates an example simplified block diagram of a WLAN Access Point (AP), according to some embodiments.

FIG. 2—Access Point Block Diagram

FIG. 2 illustrates an exemplary block diagram of an access point (AP) 112. It is noted that the block diagram of the AP of FIG. 2 is only one example of a possible system. As shown, the AP 112 may include processor(s) 204 which may execute program instructions for the AP 112. The processor(s) 204 may also be coupled (directly or indirectly) to memory management unit (MMU) 240, which may be configured to receive addresses from the processor(s) 204 and to translate those addresses to locations in memory (e.g., memory 260 and read only memory (ROM) 250) or to other circuits or devices.

The AP 112 may include at least one network port 270. The network port 270 may be configured to couple to a wired network and provide a plurality of devices, such as UEs 106, access to the Internet. For example, the network port 270 (or an additional network port) may be configured to couple to a local network, such as a home network or an enterprise network. For example, port 270 may be an Ethernet port. The local network may provide connectivity to additional networks, such as the Internet.

The AP 112 may include at least one antenna 234, which may be configured to operate as a wireless transceiver and may be further configured to communicate with UE 106 via wireless communication circuitry 230. The antenna 234 communicates with the wireless communication circuitry 230 via communication chain 232. Communication chain 232 may include one or more receive chains, one or more transmit chains or both. The wireless communication circuitry 230 may be configured to communicate via Wi-Fi or WLAN, e.g., 802.11. The wireless communication circuitry 230 may also, or alternatively, be configured to communicate via various other wireless communication technologies, including, but not limited to, 5G NR, Long-Term Evolution (LTE), LTE Advanced (LTE-A), Global System for Mobile (GSM), Wideband Code Division Multiple Access (WCDMA), CDMA2000, etc., for example when the AP is co-located with a base station in case of a small cell, or in other instances when it may be desirable for the AP 112 to communicate via various different wireless communication technologies.

In some embodiments, as further described below, an AP 112 may be configured to perform methods for data forwarding in multi-RAT dual connectivity (MR-DC) with 5G core network (5GC) operations involving secondary node (SN) change as further described herein.

Figure 3:
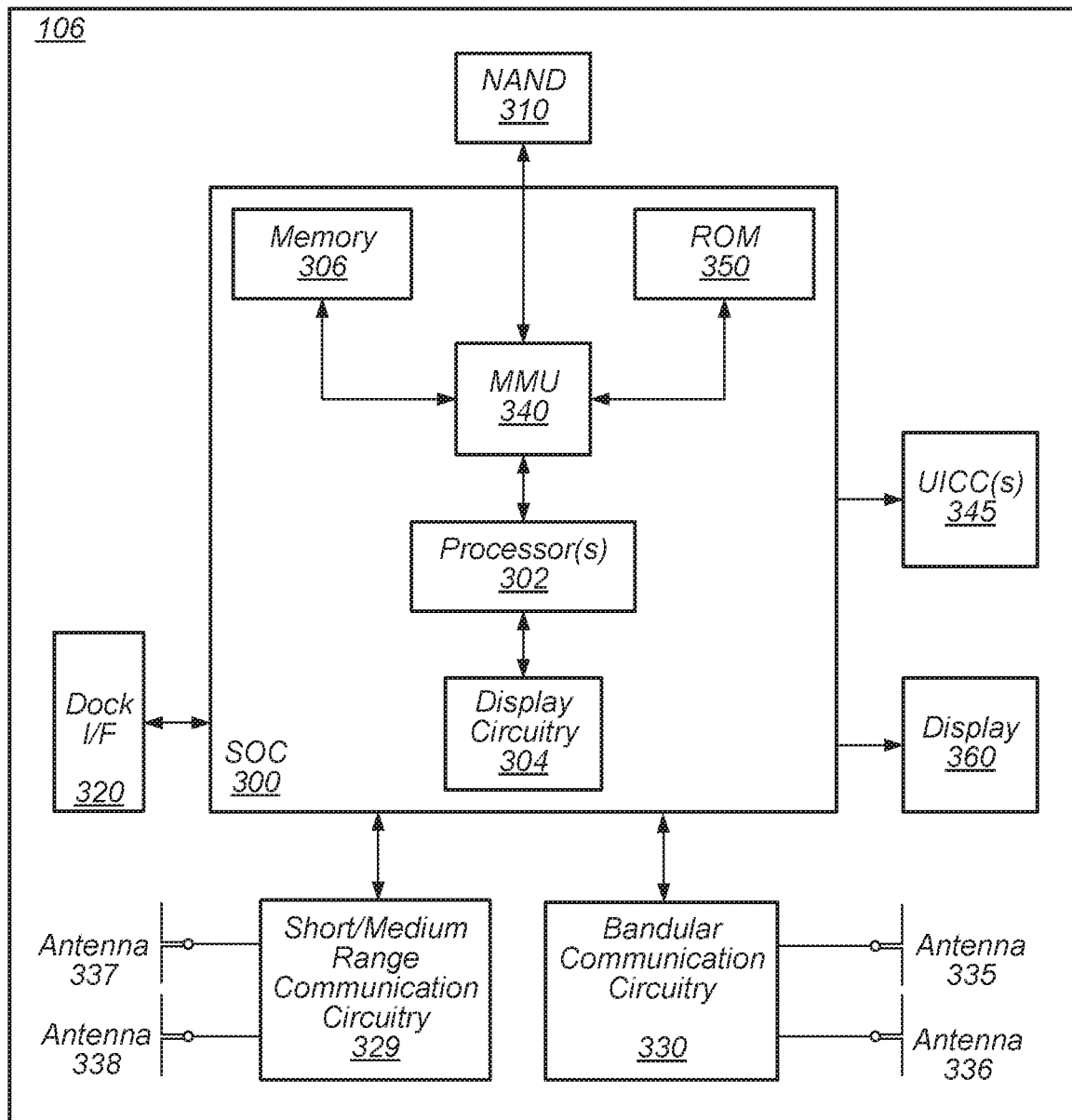
FIG. 3 illustrates an example block diagram of a UE according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet, an unmanned aerial vehicle (UAV), a UAV controller (UAC) and/or a combination of devices, among other devices. As shown, the communication device 106 may include a set of components 300 configured to perform core functions. For example, this set of components may be implemented as a system on chip (SOC), which may include portions for various purposes.

Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345. Note that the term "SIM" or "SIM entity" is intended to include any of various types of SIM implementations or SIM functionality, such as the one or more UICC(s) cards 345, one or more eUICCs, one or more eSIMs, either removable or embedded, etc. In some embodiments, the UE 106 may include at least two SIMs. Each SIM may execute one or more SIM applications and/or otherwise implement SIM functionality. Thus, each SIM may be a single smart card that may be embedded, e.g., may be soldered onto a circuit board in the UE 106, or each SIM 310 may be implemented as a removable smart card. Thus the SIM(s) may be one or more removable smart cards (such as UICC cards, which are sometimes referred to as "SIM cards"), and/or the SIMs 310 may be one or more embedded cards (such as embedded UICCs (eUICCs), which are sometimes referred to as "eSIMs" or "eSIM cards"). In some embodiments (such as when the SIM(s) include an eUICC), one or more of the SIM(s) may implement embedded SIM (eSIM) functionality; in such an embodiment, a single one of the SIM(s) may execute multiple SIM applications. Each of the SIMs may include components such as a processor and/or a memory; instructions for performing SIM/eSIM functionality may be stored in the memory and executed by the processor. In some embodiments, the UE 106 may include a combination of removable smart cards and fixed/non-removable smart cards (such as one or more eUICC cards that implement eSIM functionality), as desired. For example, the UE 106 may comprise two embedded SIMs, two removable SIMs, or a combination of one embedded SIMs and one removable SIMs. Various other SIM configurations are also contemplated.

As noted above, in some embodiments, the UE 106 may include two or more SIMs. The inclusion of two or more SIMs in the UE 106 may allow the UE 106 to support two different telephone numbers and may allow the UE 106 to communicate on corresponding two or more respective networks. For example, a first SIM may support a first RAT such as LTE, and a second SIM 310 support a second RAT such as 5G NR. Other implementations and RATs are of course possible. In some embodiments, when the UE 106 comprises two SIMs, the UE 106 may support Dual SIM Dual Active (DSDA) functionality. The DSDA functionality may allow the UE 106 to be simultaneously connected to two networks (and use two different RATs) at the same time, or to simultaneously maintain two connections supported by two different SIMs using the same or different RATs on the same or different networks. The DSDA functionality may also allow the UE 106 to simultaneously receive voice calls or data traffic on either phone number. In certain embodiments the voice call may be a packet switched communication. In other words, the voice call may be received using voice over LTE (VoLTE) technology and/or voice over NR (VoNR) technology. In some embodiments, the UE 106 may support Dual SIM Dual Standby (DSDS) functionality. The DSDS functionality may allow either of the two SIMs in the UE 106 to be on standby waiting for a voice call and/or data connection. In DSDS, when a call/data is established on one SIM, the other SIM is no longer active. In some embodiments, DSDx functionality (either DSDA or DSDS functionality) may be implemented with a single SIM (e.g., a eUICC) that executes multiple SIM applications for different carriers and/or RATs.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short to medium range wireless communication circuitry 329, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to perform methods for data forwarding in multi-RAT dual connectivity (MR-DC) with 5G core network (5GC) operations involving secondary node (SN) change as further described herein.

As described herein, the communication device 106 may include hardware and software components for implementing the above features for a communication device 106 to communicate a scheduling profile for power savings to a network. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short to medium range wireless communication circuitry 329 may each include one or more processing elements. In other words, one or more processing elements may be included in cellular communication circuitry 330 and, similarly, one or more processing elements may be included in short to medium range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 330. Similarly, the short to medium range wireless communication circuitry 329 may include one or more ICs that are configured to perform the functions of short to medium range wireless communication circuitry 329. In addition, each integrated circuit may include circuitry (e.g., first circuitry, second circuitry, etc.) configured to perform the functions of short to medium range wireless communication circuitry 329.

Figure 4:
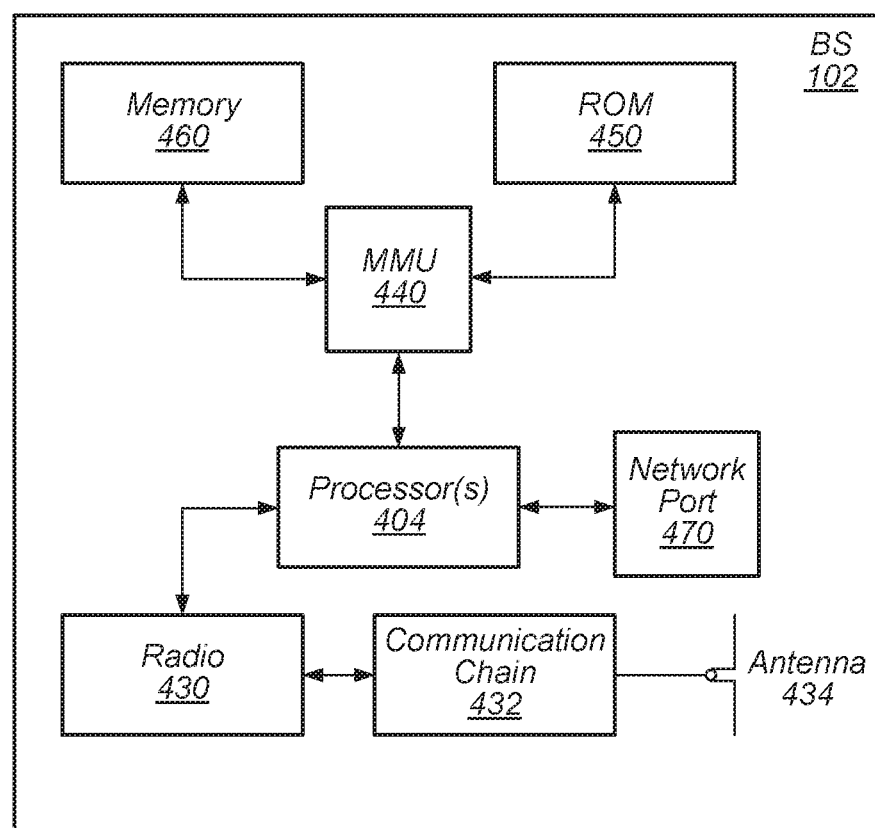
FIG. 4 illustrates an example block diagram of a BS according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
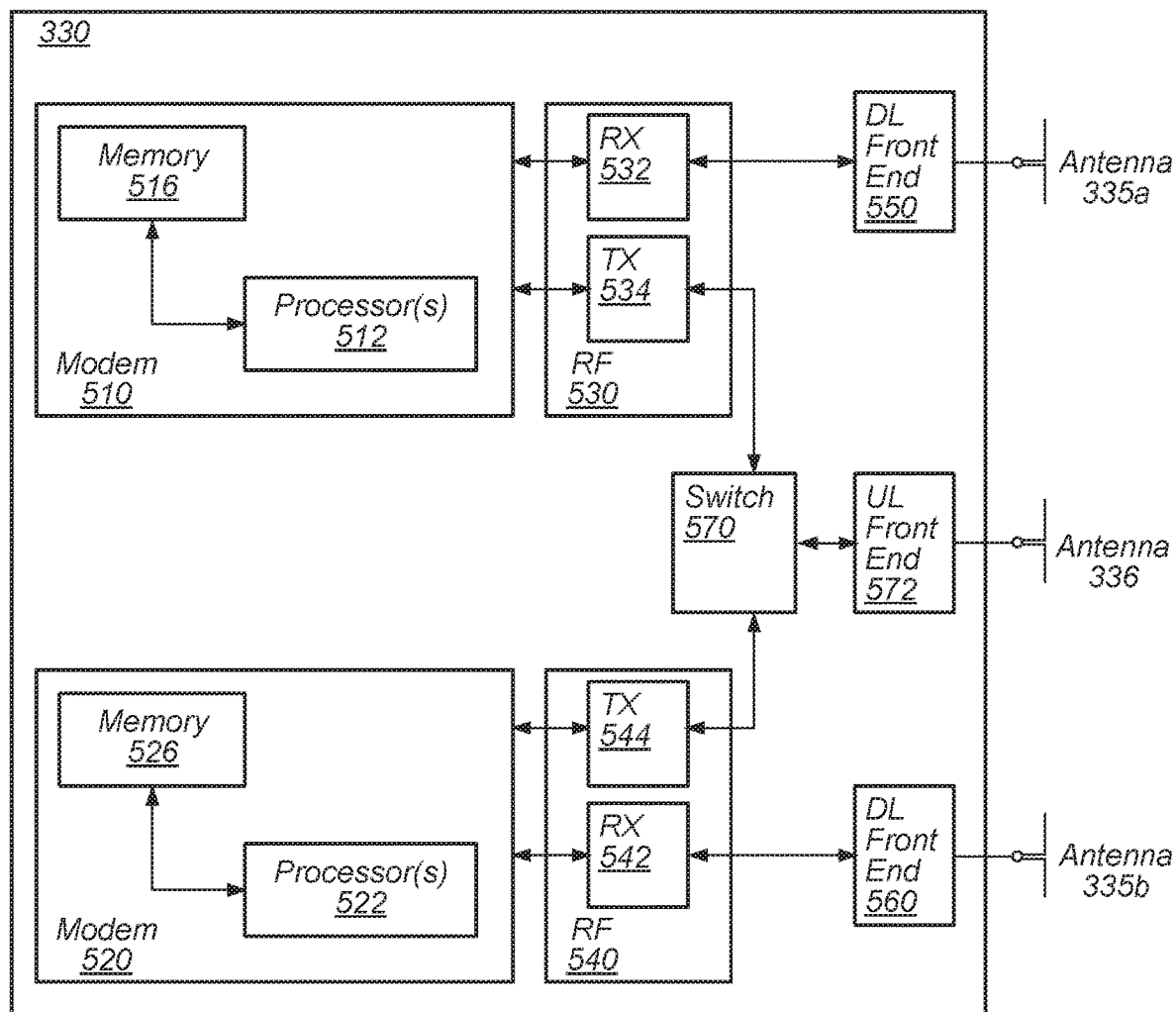
FIG. 5 illustrates an example block diagram of cellular communication circuitry, according to some embodiments.

FIG. 5: Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit. According to embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335a-b and 336 as shown (in FIG. 3). In some embodiments, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, the cellular communication circuitry 330 may be configured to perform methods data forwarding in multi-RAT dual connectivity (MR-DC) with 5G core network (5GC) operations involving secondary node (SN) change as further described herein.

As described herein, the modem 510 may include hardware and software components for implementing the above features or for time division multiplexing UL data for NSA NR operations, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for communicating a scheduling profile for power savings to a network, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

5G NR Architecture with LTE

Figure 6A:
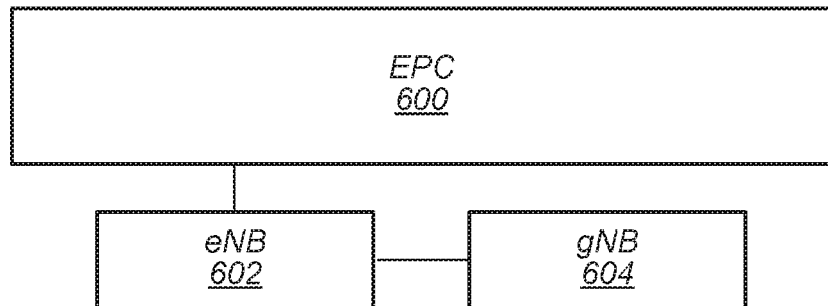
FIG. 6A illustrates an example of connections between an EPC network, an LTE base station (eNB), and a 5G NR base station (gNB).
Figure 6B:
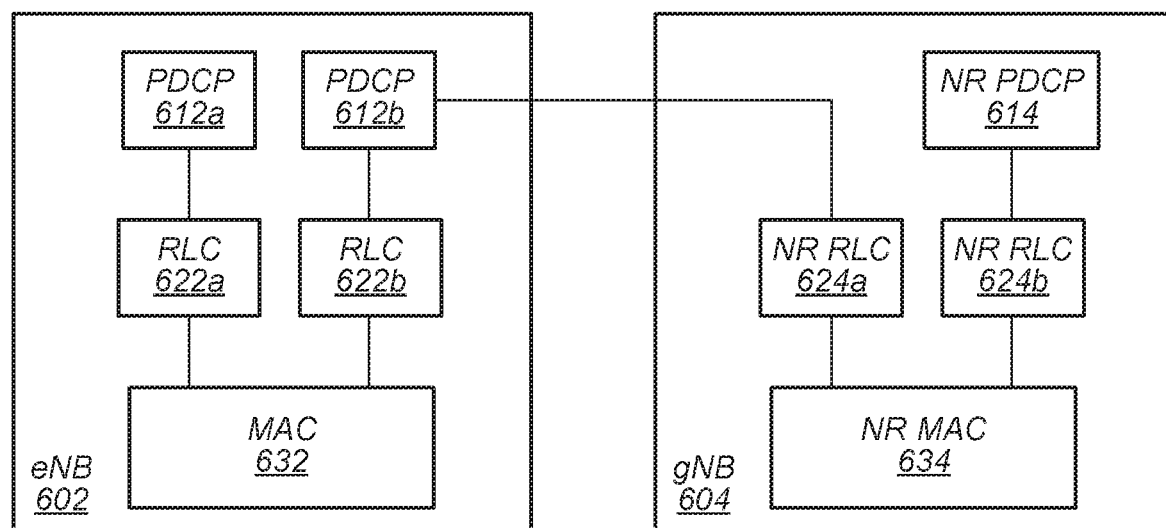
FIG. 6B illustrates an example of a protocol stack for an eNB and a gNB.

In some implementations, fifth generation (5G) wireless communication will initially be deployed concurrently with current wireless communication standards (e.g., LTE). For example, dual connectivity between LTE and 5G new radio (5G NR or NR) has been specified as part of the initial deployment of NR. Thus, as illustrated in FIGS. 6A-B, evolved packet core (EPC) network 600 may continue to communicate with current LTE base stations (e.g., eNB 602). In addition, eNB 602 may be in communication with a 5G NR base station (e.g., gNB 604) and may pass data between the EPC network 600 and gNB 604. Thus, EPC network 600 may be used (or reused) and gNB 604 may serve as extra capacity for UEs, e.g., for providing increased downlink throughput to UEs. In other words, LTE may be used for control plane signaling and NR may be used for user plane signaling. Thus, LTE may be used to establish connections to the network and NR may be used for data services.

FIG. 6B illustrates a proposed protocol stack for eNB 602 and gNB 604. As shown, eNB 602 may include a medium access control (MAC) layer 632 that interfaces with radio link control (RLC) layers 622*a-b*. RLC layer 622*a* may also interface with packet data convergence protocol (PDCP) layer 612*a* and RLC layer 622*b* may interface with PDCP layer 612*b*. Similar to dual connectivity as specified in LTE-Advanced Release 12, PDCP layer 612*a* may interface via a master cell group (MCG) bearer with EPC network 600 whereas PDCP layer 612*b* may interface via a split bearer with EPC network 600.

Additionally, as shown, gNB 604 may include a MAC layer 634 that interfaces with RLC layers 624*a-b*. RLC layer 624*a* may interface with PDCP layer 612*b* of eNB 602 via an $X_2$ interface for information exchange and/or coordination (e.g., scheduling of a UE) between eNB 602 and gNB 604. In addition, RLC layer 624*b* may interface with PDCP layer 614. Similar to dual connectivity as specified in LTE-Advanced Release 12, PDCP layer 614 may interface with EPC network 600 via a secondary cell group (SCG) bearer. Thus, eNB 602 may be considered a master node (MeNB) while gNB 604 may be considered a secondary node (SgNB). In some scenarios, a UE may be required to maintain a connection to both an MeNB and a SgNB. In such scenarios, the MeNB may be used to maintain a radio resource control (RRC) connection to an EPC while the SgNB may be used for capacity (e.g., additional downlink and/or uplink throughput).

5G Core Network Architecture—Interworking with Wi-Fi

Figure 7A:
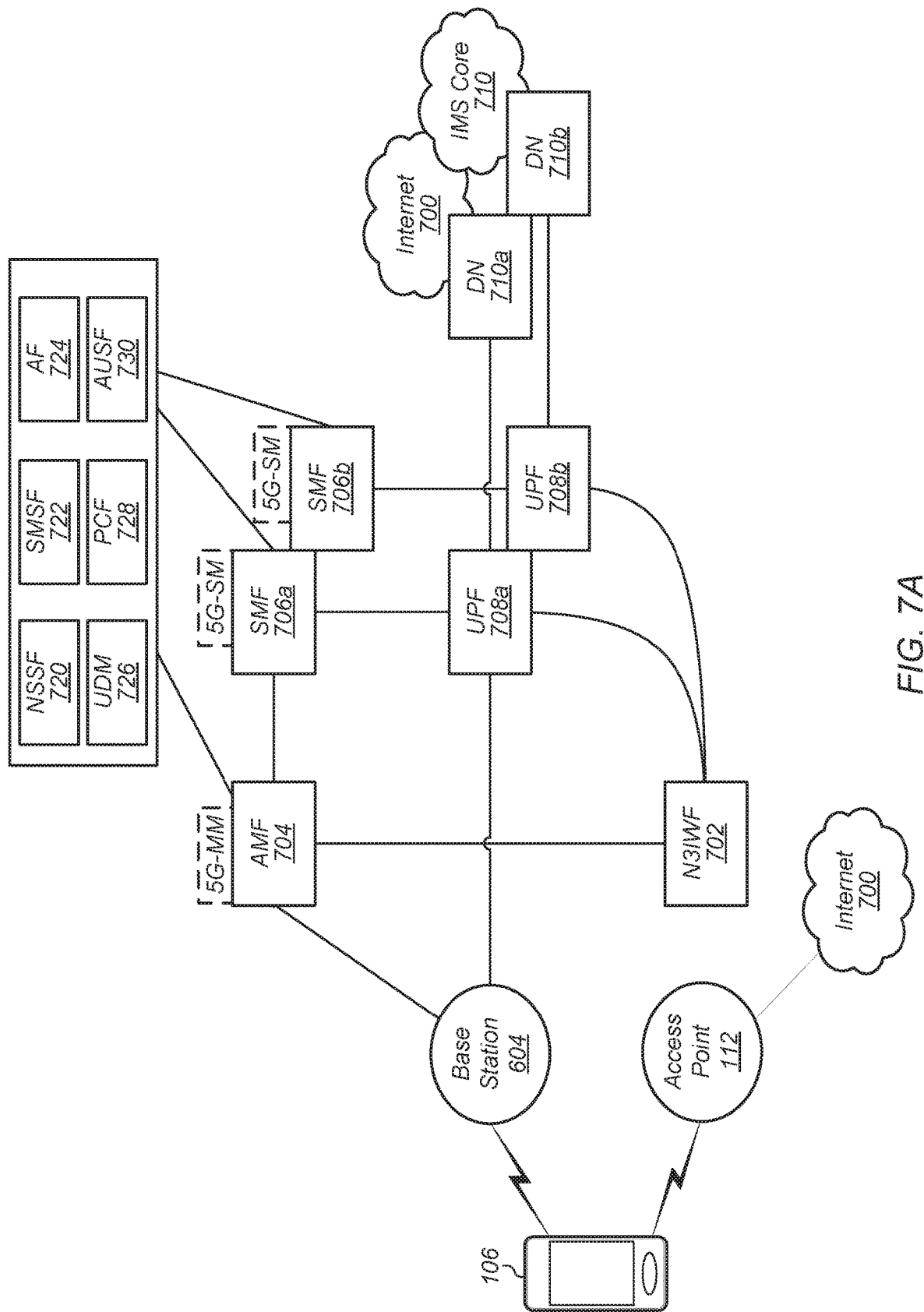
FIG. 7A illustrates an example of a 5G network architecture that incorporates both 3GPP (e.g., cellular) and non-3GPP (e.g., non-cellular) access to the 5G CN, according to some embodiments.

In some embodiments, the 5G core network (CN) may be accessed via (or through) a cellular connection/interface (e.g., via a 3GPP communication architecture/protocol) and a non-cellular connection/interface (e.g., a non-3GPP access architecture/protocol such as Wi-Fi connection). FIG. 7A illustrates an example of a 5G network architecture that incorporates both 3GPP (e.g., cellular) and non-3GPP (e.g., non-cellular) access to the 5G CN, according to some embodiments. As shown, a user equipment device (e.g., such as UE 106) may access the 5G CN through both a radio access network (RAN, e.g., such as gNB or base station 604) and an access point, such as AP 112. The AP 112 may include a connection to the Internet 700 as well as a connection to a non-3GPP inter-working function (N3IWF) 702 network entity. The N3IWF may include a connection to a core access and mobility management function (AMF) 704 of the 5G CN. The AMF 704 may include an instance of a 5G mobility management (5G MM) function associated with the UE 106. In addition, the RAN (e.g., gNB 604) may also have a connection to the AMF 704. Thus, the 5G CN may support unified authentication over both connections as well as allow simultaneous registration for UE 106 access via both gNB 604 and AP 112. As shown, the AMF 704 may include one or more functional entities associated with the 5G CN (e.g., network slice selection function (NSSF) 720, short message service function (SMSF) 722, application function (AF) 724, unified data management (UDM) 726, policy control function (PCF) 728, and/or authentication server function (AUSF) 730). Note that these functional entities may also be supported by a session management function (SMF) 706*a* and an SMF 706*b* of the 5G CN. The AMF 706 may be connected to (or in communication with) the SMF 706*a*. Further, the gNB 604 may in communication with (or connected to) a user plane function (UPF) 708*a* that may also be communication with the SMF 706*a*. Similarly, the N3IWF 702 may be communicating with a UPF 708*b* that may also be communicating with the SMF 706*b*. Both UPFs may be communicating with the data network (e.g., DN 710*a* and 710*b*) and/or the Internet 700 and IMS core network 710.

Figure 7B:
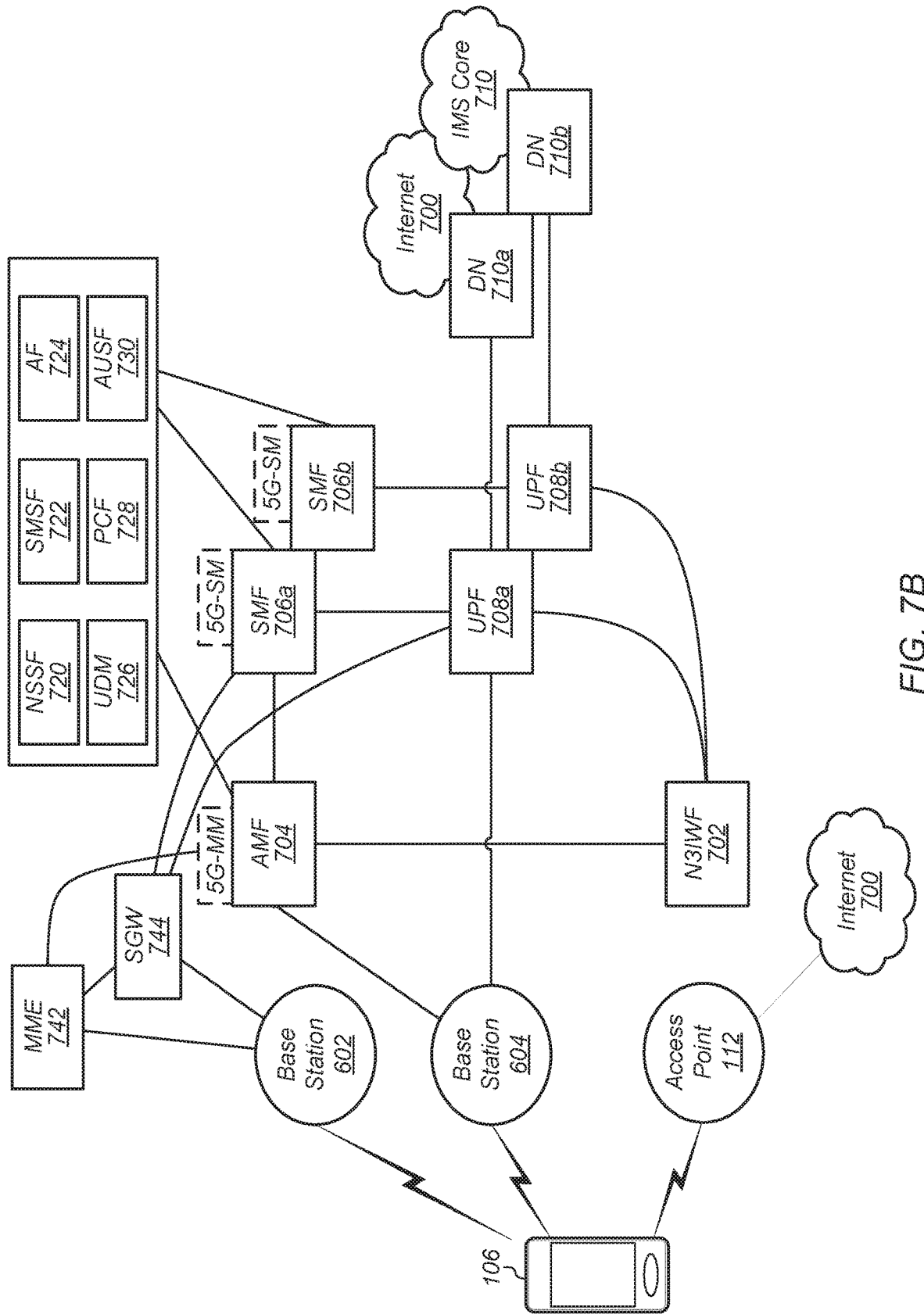
FIG. 7B illustrates an example of a 5G network architecture that incorporates both dual 3GPP (e.g., LTE and 5G NR) access and non-3GPP access to the 5G CN, according to some embodiments.

FIG. 7B illustrates an example of a 5G network architecture that incorporates both dual 3GPP (e.g., LTE and 5G NR) access and non-3GPP access to the 5G CN, according to some embodiments. As shown, a user equipment device (e.g., such as UE 106) may access the 5G CN through both a radio access network (RAN, e.g., such as gNB or base station 604 or eNB or base station 602) and an access point, such as AP 112. The AP 112 may include a connection to the Internet 700 as well as a connection to the N3IWF 702 network entity. The N3IWF may include a connection to the AMF 704 of the 5G CN. The AMF 704 may include an instance of the 5G MM function associated with the UE 106. In addition, the RAN (e.g., gNB 604) may also have a connection to the AMF 704. Thus, the 5G CN may support unified authentication over both connections as well as allow simultaneous registration for UE 106 access via both gNB 604 and AP 112. In addition, the 5G CN may support dual-registration of the UE on both a legacy network (e.g., LTE via base station 602) and a 5G network (e.g., via base station 604). As shown, the base station 602 may have connections to a mobility management entity (MME) 742 and a serving gateway (SGW) 744. The MME 742 may have connections to both the SGW 744 and the AMF 704. In addition, the SGW 744 may have connections to both the SMF 706*a* and the UPF 708*a*. As shown, the AMF 704 may include one or more functional entities associated with the 5G CN (e.g., NSSF 720, SMSF 722, AF 724, UDM 726, PCF 728, and/or AUSF 730). Note that UDM 726 may also include a home subscriber server (HSS) function and the PCF may also include a policy and charging rules function (PCRF). Note further that these functional entities may also be supported by the SMF 706*a* and the SMF 706*b* of the 5G CN. The AMF 706 may be connected to (or in communication with) the SMF 706*a*. Further, the gNB 604 may in communication with (or connected to) the UPF 708*a* that may also be communication with the SMF 706*a*. Similarly, the N3IWF 702 may be communicating with a UPF 708*b* that may also be communicating with the SMF 706*b*. Both UPFs may be communicating with the data network (e.g., DN 710*a* and 710*b*) and/or the Internet 700 and IMS core network 710.

Note that in various embodiments, one or more of the above described network entities may be configured to perform methods to improve security checks in a 5G NR network, including mechanisms data forwarding in multi-RAT dual connectivity (MR-DC) with 5G core network (5GC) operations involving secondary node (SN) change, e.g., as further described herein.

Figure 8:
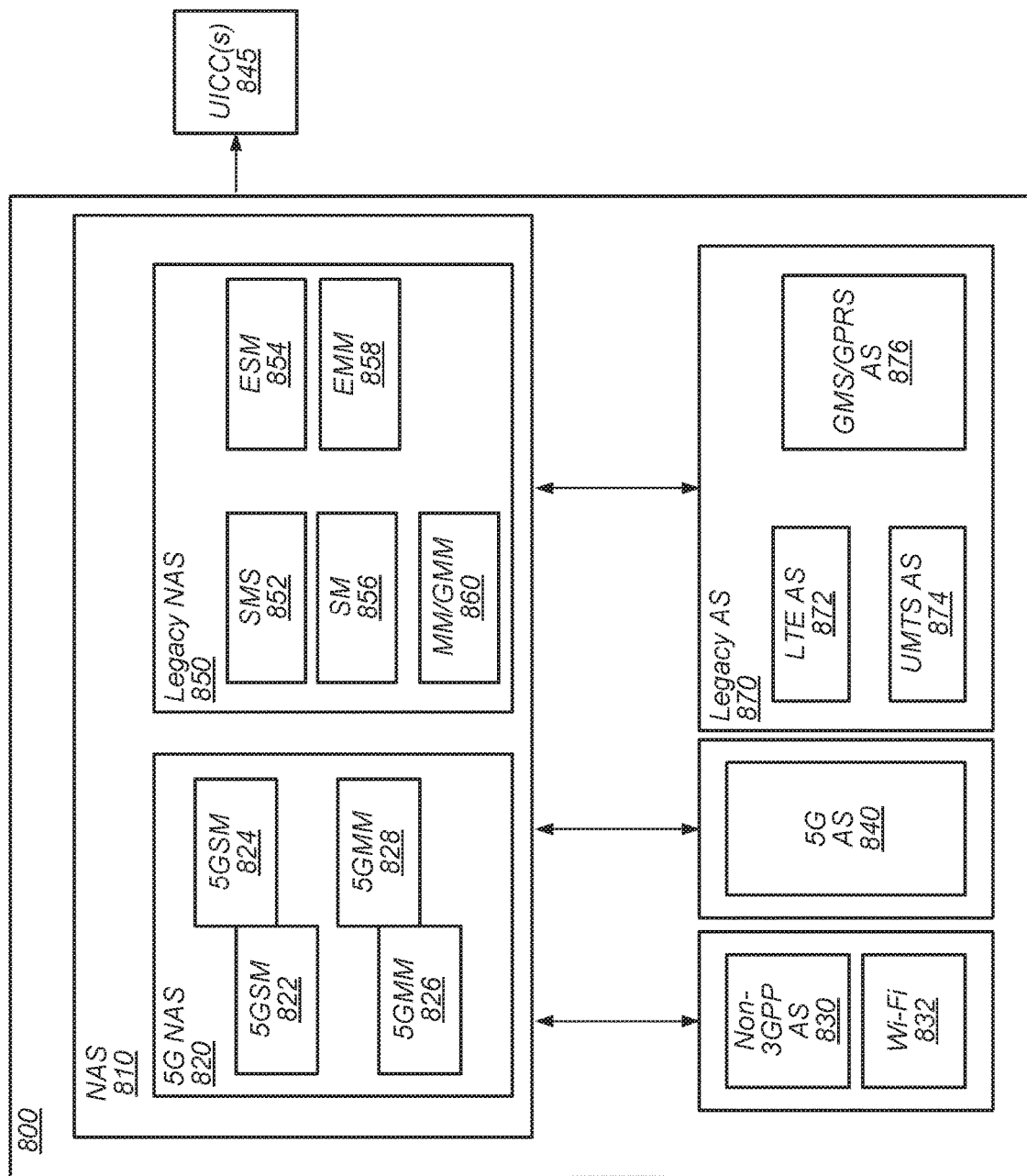
FIG. 8 illustrates an example of a baseband processor architecture for a UE, according to some embodiments.

FIG. 8 illustrates an example of a baseband processor architecture for a UE (e.g., such as UE 106), according to some embodiments. The baseband processor architecture 800 described in FIG. 8 may be implemented on one or more radios (e.g., radios 329 and/or 330 described above) or modems (e.g., modems 510 and/or 520) as described above. As shown, the non-access stratum (NAS) 810 may include a 5G NAS 820 and a legacy NAS 850. The legacy NAS 850 may include a communication connection with a legacy access stratum (AS) 870. The 5G NAS 820 may include communication connections with both a 5G AS 840 and a non-3GPP AS 830 and Wi-Fi AS 832. The 5G NAS 820 may include functional entities associated with both access stratums. Thus, the 5G NAS 820 may include multiple 5G MM entities 826 and 828 and 5G session management (SM) entities 822 and 824. The legacy NAS 850 may include functional entities such as short message service (SMS) entity 852, evolved packet system (EPS) session management (ESM) entity 854, session management (SM) entity 856, EPS mobility management (EMM) entity 858, and mobility management (MM)/GPRS mobility management (GMM) entity 860. In addition, the legacy AS 870 may include functional entities such as LTE AS 872, UMTS AS 874, and/or GSM/GPRS AS 876.

Thus, the baseband processor architecture 800 allows for a common 5G-NAS for both 5G cellular and non-cellular (e.g., non-3GPP access). Note that as shown, the 5G MM may maintain individual connection management and registration management state machines for each connection. Additionally, a device (e.g., UE 106) may register to a single PLMN (e.g., 5G CN) using 5G cellular access as well as non-cellular access. Further, it may be possible for the device to be in a connected state in one access and an idle state in another access and vice versa. Finally, there may be common 5G-MM procedures (e.g., registration, de-registration, identification, authentication, as so forth) for both accesses.

Note that in various embodiments, one or more of the above described functional entities of the 5G NAS and/or 5G AS may be configured to perform methods data forwarding in multi-RAT dual connectivity (MR-DC) with 5G core network (5GC) operations involving secondary node (SN) change, e.g., as further described herein.

Data Forwarding in MR-DC

In implementations of E-UTRAN New Radio-Dual Connectivity (EN-DC), for any scenario involving a secondary node (SN) change (e.g., an SN change, inter-master node hand over (MN HO), master node (MN) to eNB/gNB change, either MN or SN initiate, e.g., as defined in 3GPP TS 37.340 version 15.4.0), data forwarding for any bearers terminated in the (source) SN are not proposed by the bearer-hosting node itself. The (source) MN decides forwarding proposal for any bearers hosted by the (source) SN. This design was acceptable because SN cannot establish a dedicated radio bearer (DRB) on its own in EN-DC (it has to be requested by MN), meaning that MN knows the exact bearers' characteristic hosted by SN, thus it is acceptable for MN to take place of SN's forwarding proposal instead.

In implementations of MR-DC with 5G core network (5GC), the same principles as implemented in EN-DC were adopted with the following differences. As defined by 3GPP TS 37.340 V15.4.0 FIG. 10.5.2-1 (SN change procedure—MN initiated), MN can reflect forwarding proposal from a source secondary node (S-SN) during the secondary node (SN) release procedure before it provides forwarding addresses to the S-SN via an Xn-U Address Indication. However, MR-DC with 5GC scenarios involving SN change may still face the following issues:

(1) the S-SN's forwarding intention happens after MN negotiates data forwarding with the target SN; and (2) DRB-level continuity is not possible for a source SN terminated bearer using SCG resources only for which decided to be served by the target SN.

For example, when the S-SN's forwarding intention happens after MN negotiates data forwarding with the target SN, a forwarding transport network layer (TNL) established (e.g., proposed by MN and accepted by the target SN) may be useless if the S-SN later decides not to do forwarding addressed to the target SN. For example, consider a packet data unit (PDU) session hosted by the source SN. Assume that the MN proposed a downlink (DL) forwarding for all quality of service (QoS) flows within that PDU session to the target SN and the target SN accepted them. Then, the target SN will provide the corresponding PDU session forwarding TNL to the MN. In current implementations, this TNL can be forwarded to the source SN only after the source SN proposes its forwarding intention. Hence, if the source SN determines not to forward those QoS flows of the PDU session (e.g., due to no available resources for forwarding), then, (a) if the MN reflects source SN's forwarding intention and does not forward the TNL, then nothing would be forwarded (including end-marker from UPF); or (b) if the MN does send the TNL to the source SN but source SN does not forward any QoS flows until the path switches, then nothing would be forwarded except the end-marker from UPF.

Such a mechanism may incur packet loss and service interruption (more severe for the first case) because the target SN would wait for forwarding over that TNL for in-order delivery (due to MN's forwarding proposal) for which nothing (or just end-marker) is forwarded in the end.

As another example, DRB-level continuity is not possible for a source SN terminated bearer using SCG resources only for which decided to be served by the target SN. In MR-DC with 5GC, MN cannot propose DRB-level forwarding to the target SN for any bearer completely served by the source SN because an SN decides flow to DRB mapping on its own and MN is not aware of the mapping unless the SN bearer is using MCG resources. Thus, what the MN can propose to the target SN for such a source SN terminated bearer using SCG resources only is, at most, per QoS flow level mapped onto it. Therefore, enhancements are necessary to overcome the above issues.

Embodiments described herein provide systems, methods, and mechanisms to address these issues for MR-DC with 5GC operations involving SN change. In some embodiments, a source SN may be required to follow data forwarding as provided by an MN. In some embodiments, the MN may ignore a forwarding proposal from the source SN when providing forwarding addresses addressed to the target SN.

In some embodiments, the source SN may be required to report flow to DRB mapping to an MN even for SN-terminated bearers using secondary cell group (SCG) resources only. Such an approach may require significant changes to the Xn interface application protocol (XnAP) (e.g., as currently defined by 3GPP TS 38.423 V15.1.0) and may also run against the principle that the hosting node decides forwarding proposal in MR-DC with 5GC.

In some embodiments, an MN may request forwarding intention of the source SN before negotiating data forwarding with the target SN: In some embodiments, the MN can propose data forwarding to the target SN based on the forwarding intention of the source SN. In some embodiments, additional XnAP signaling may be required with the source SN before the MN contacts the target SN, however for MR-DC with 5GC scenarios involving SN change, such additional signaling may already be present as an MN typically queries the current SCG configuration from the source SN beforehand. In some embodiments, an XnAP SN Release Request message may be enhanced as an MN may already know a forwarding intention of a source SN and thus, an MN may provide forwarding addresses to the source SN earlier than a current Xn-U Address Indication procedure (which may occur after releasing a source SN).

Figure 9:
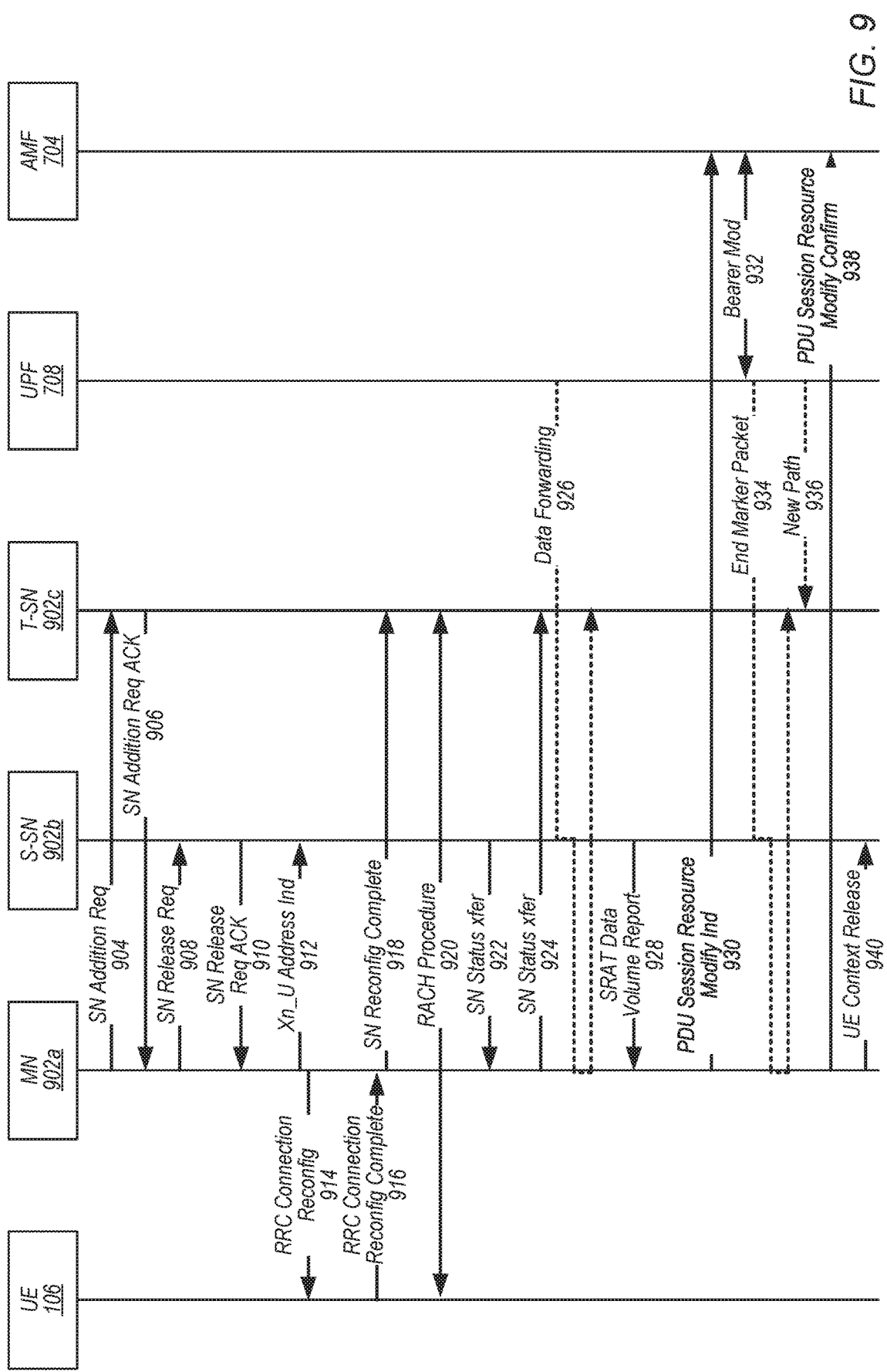
FIG. 9 illustrates an example of a signaling flow for a secondary node change initiated by a master node, according to some embodiments.

For example, FIG. 9 illustrates an example of a signaling flow for a secondary node change initiated by a master node, according to some embodiments. The method shown in FIG. 9 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

As shown, a UE, such as UE 106, may be attached to a first network via a master node (MN), such as MN 902a. The UE may be operating in a dual connectivity mode and may additionally be attached to a second network via a source secondary node, such as S-SN 902b. Note that each of MN 902a and S-SN 902b may be a base station 102. In some embodiments, the first and second networks may differ, e.g., the UE may be operating in EN-DC. In some embodiments, the first and second networks may be the same, e.g., the UE may be operating in MR-DC. MN 902a may initiate an SN change by requesting, via SN addition request message 904, a target SN (T-SN) 902c, which may also be a base station 102, to allocate resources for the UE via an SN addition procedure. MN 902a may include measurement results related to T-SN 902c. In response, if/when data forwarding is needed, the T-SN 902c may provide data forwarding addresses to MN 902a via SN addition request acknowledgement (ACK) message 906. In some embodiments, the T-SN 902c may include an indication of a full or a delta radio resource control (RRC) configuration.

Upon successful allocation of T-SN 902c resources, MN 902a may initiate release of S-SN 902b's resources via SN release request message 908, which may include a cause indicating secondary cell group (SCG) mobility. S-SN 902b may accept or reject the release request. Upon acceptance of the release request, S-SN 902b may acknowledge the release request via SN release request ACK message 910. MN 902a may provide data forwarding addresses to S-SN 902b via Xn U address indication message 912. For example, if/when direct data forwarding is used for SN terminated bearers, MN 902a may provide data forwarding addresses as received from T-SN 902c to S-SN 902b. In some embodiments, when direct data forwarding is used, MN 902a may not reflect forwarding intention of S-SN 902b to T-SN 902c and may require S-SN 902b to follow data forwarding as received from MN 902a. Note that reception of SN release request message 908 may trigger S-SN 902b to stop providing user data to UE 106 and to start data forwarding.

MN 902a may then trigger UE 106 to apply the new RRC configuration via RRC connection reconfiguration message 914. RRC connection reconfiguration message 914 may include a T-SN RRC configuration message. UE 106 may apply the new configuration and may send MN 902a an RRC reconfiguration complete message 916, including an encoded SN RRC response message for T-SN 902c, if needed. MN 902a may then inform T-SN 902c of the RRC reconfiguration via SN reconfiguration complete message 918 with the encoded SN RRC response message for the T-SN, if received from UE 106. UE 106 may then perform random access channel (RACH) procedure 920 to attached to T-SN 902c. Additionally, for secondary node terminated bearers, S-SN 902b may sends an SN status transfer message 922 to MN 902a and MN 902a may forward the SN status transfer message to T-SN 902c. In some instances, as shown, data forwarding 926 (e.g., from UPF 708 to T-SN 902c via S-SN 902b and MN 902a) may take place. Note that data forwarding may be initiated as early as when S-SN 902b receives SN release request message 908 from MN 902a.

Additionally, S-SN 902b may send a secondary RAT data volume report message 928 to MN 902a and include data volumes delivered to UE 106 for related quality of service (QoS) flows. Note that S-SN 902b may send secondary RAT data volume report message 928 before, during, and/or after data forwarding 926 is performed.

MN 902a may send PDU session resource modification identifier message 930 to AMF 704 and AMF 704 may perform bearer modification procedure 932 with UPF 708. UPF 708 may transmit end marker packet 934 to T-SN 902c via S-SN 902b and MN 902a. Additionally, UPF 708 may establish new path 936 to T-SN 902c. MN 902a may confirm PDU session resource modification with the AMF 704 via PDU session resource modify confirmation message 938 and may send a UE context release message 940 to S-SN 902b. Upon reception of the UE context release message, S-SN 902b may release radio and control plane related resources associated to the UE context and any ongoing data forwarding may continue.

Figure 10:
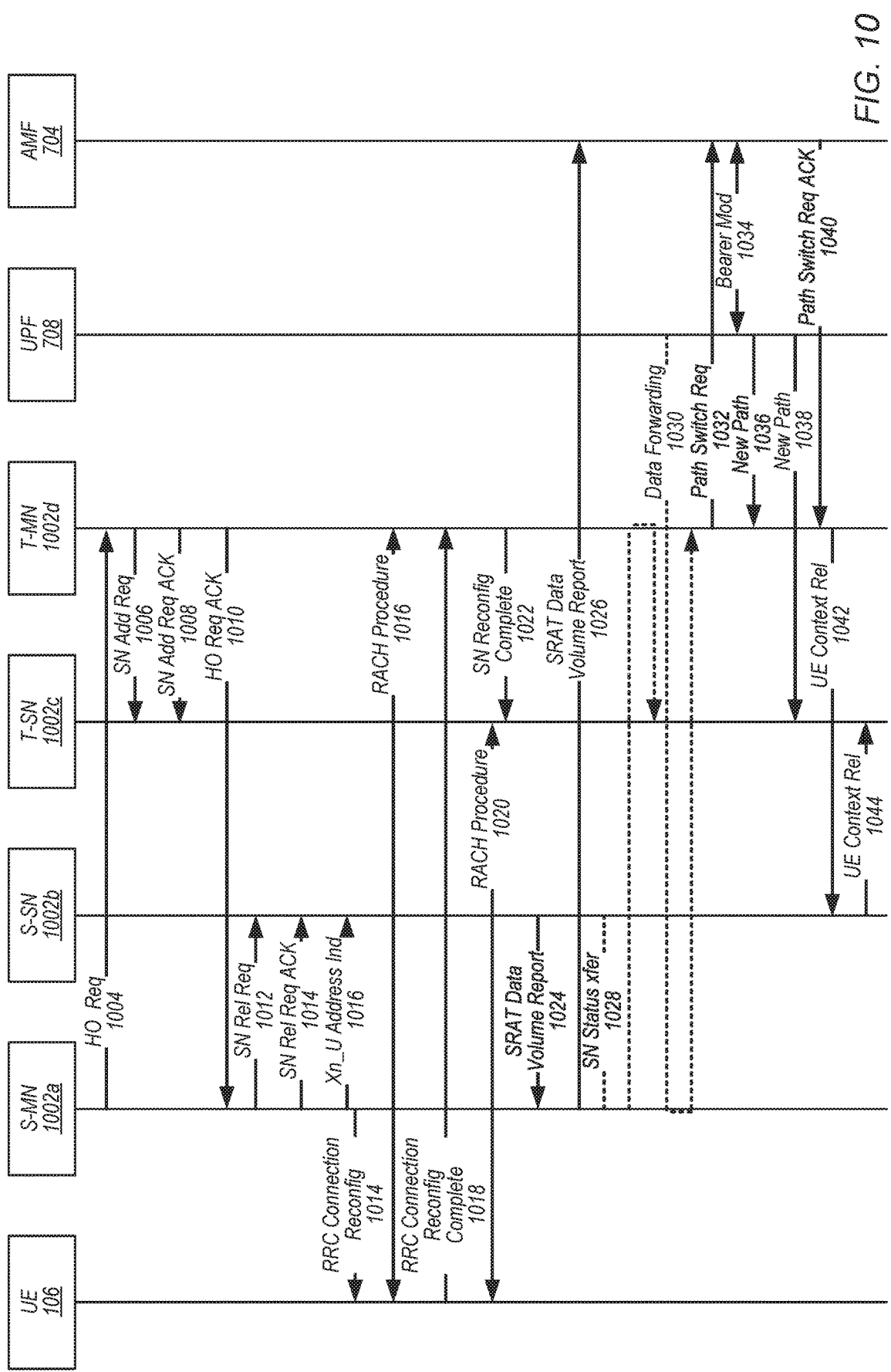
FIG. 10 illustrates an example of a signaling flow for a secondary node change initiated by a master node with inter-master node handover, according to some embodiments.

As another example, FIG. 10 illustrates an example of a signaling flow for a secondary node change initiated by a master node with inter-master node handover, according to some embodiments. The signaling shown in FIG. 10 may be used in conjunction with any of the systems, methods, or devices shown in the Figures, among other devices. In various embodiments, some of the signaling shown may be performed concurrently, in a different order than shown, or may be omitted. Additional signaling may also be performed as desired.

As shown, a UE, such as UE 106, may be attached to a first network via a source master node (S-MN), such as S-MN 1002a. The UE may be operating in a dual connectivity mode and may additionally be attached to a second network via a source secondary node, such as S-SN 1002b. Note that each of S-MN 1002a and S-SN 1002b may be a base station 102. In some embodiments, the first and second networks may differ, e.g., the UE may be operating in EN-DC. In some embodiments, the first and second networks may be the same, e.g., the UE may be operating in MR-DC. S-MN 1002a may initiate a handover procedure to target MN (T-MN) 1002d, which may also be a base station 102, by initiating an Xn handover preparation procedure including both master cell group (MCG) and secondary cell group (SCG) configurations. Thus, S-MN 1002*a* may include a source SN UE XnAP ID, a SN ID and a UE context in the source SN (S-SN) in a handover request message 1004 sent to T-MN 1002*d*. As shown, since T-MN 1002*d* determines to change from S-SN 1002*b* to target SN (T-SN) 1002*c*, which may also be a base station 102, T-MN 1002*d* may send an SN addition request message to T-SN 1002*c* that may include the SN UE XnAP ID as a reference to the UE context in S-SN 1002*b* that was established by the S-MN 1002*a*. T-SN 1002*c* may reply to T-MN 1002*d* with SN addition request ACK message 1008 and may include an indication of a full or delta RRC configuration.

T-MN 1002*d* may include a transparent container to be sent to UE 106 as an RRC message to perform the handover in HO request ACK message 1010. Additionally, T-MN 1002*d* may provide forwarding addresses to S-MN 1002*a*.

S-MN 1002*a* may then send an SN release request message 1012 to S-SN 1002*b* that may include a cause indicating MCG mobility. S-SN 1002*b* may acknowledge the release request via SN release request ACK message 1014. In some embodiments, S-MN 1002*a* may send XN-U address indication message 1016 to S-SN 1002*b* to transfer data forwarding information. In some embodiments, more than one data forwarding address may be provided if/when a PDU session is split in T-MN 1002*d*. In some embodiments, in cases of direct data forwarding either to T-MN 1002*d* or T-SN 1002*c*, S-MN 1002*a* may not reflect forwarding intention from S-SN 1002*b* and S-SN 1002*b* may always follow data forwarding as received from S-MN 1002*a*.

S-MN 1002*a* may then trigger UE 106 to perform handover to T-MN 1002*d* and apply the new RRC configuration via RRC connection reconfiguration message 1018. UE 106 may then synchronize to T-MN 1002*d* via RACH procedure 1020 and may reply to T-MN 1002*d* with RRC connection reconfiguration complete message 1022. Additionally, UE 106 may synchronize to T-SN 1002*c* via RACH procedure 1024 and T-MN 1002*d* may inform T-SN 1002*c* of successful RRC connection reconfiguration via SN reconfiguration complete message 1026.

Additionally, S-SN 1002*b* may send a secondary RAT data volume report message 1028 to S-MN 1002*a* and include data volumes delivered to UE 106 for related quality of service (QoS) flows. S-MN 1002*a* may send SN RAT data volume report message 1030 to AMF 704 and may include data volumes delivered to UE 106 for the related QoS flows. Additionally, for bearers using RLC AM, S-SN 1002*b* may send an SN status transfer message 1032 to T-SN 1002*c* via S-MN 1002*a* and T-MN 1002*d*. In some instances, as shown, data forwarding 1034 (e.g., from UPF 708 to T-SN 1002*c* via S-MN 1002*a*) may take place. Note that data forwarding may be initiated as early as when S-SN 1002*b* receives SN release request message 1012 from S-MN 1002*a*. Note that S-SN 1002*b* may send secondary RAT data volume report message 1028 before, during, and/or after data forwarding 1034 is performed.

T-MN 1002*d* may then initiate a path switch procedure with AMF 704 via path switch request message 1036. AMF 704 may perform bearer modification procedure 1038 with UPF 708 and UPF 708 may inform T-MN 1002*d* and T-SN 1002*c* of new paths via new path messages 1040 and 1042. Additionally, AMF 704 may send T-MN 1002*d* a path switch request ACK message 1044 to acknowledge completion of the path switches. T-MN 1002*d* may send a UE context release message 1046 to S-MN 1002*a* and S-MN 1002*a* may forward the UE context release to S-SN 1002*b* via UE context release message 1048. Upon reception of UE context release message 1048, S-SN 1002*b* may release control plane related resources associated to the UE context and any ongoing data forwarding may continue.

Note that in some embodiments, similar modifications may also be made to procedures as currently defined by 3GPP TS 37.340 V15.4.0, Section 10.8. For example, a source MN may send an XN-U address indication message (e.g., similar to XN-U address indication message 1016) to a source SN to transfer data forwarding information. Additionally, in some embodiments, more than one data forwarding address may be provided if/when a PDU session is split in a target master node. Note that in case of direct data forwarding either to a target MN or a target SN, the source MN may not reflect forwarding intention from the source SN and the source SN may always follow data forwarding as received from the source MN.

In some embodiments, a source secondary node may be required (e.g., forced) to report flow to dedicated radio bearer (DRB) mapping to a master node even for secondary node terminated bearers using secondary cell group (SCG) resources only. In some embodiments, this could be achieved via user plane (UP) or control plane (CP) signaling (e.g., either new or existing). For example, in some embodiments, a PDU Session Resource Setup Response Info—SN terminated information element (IE) as defined by 3GPP TS 38.423 V15.2.0 Section 9.2.1.6 may be modified such that an SN UL PDCP UP TNL Information IE (and/or group name) may become optional (e.g., instead of mandatory). Note that a PDU Session Resource Setup Response Info—SN terminated IE may contain a result of an addition of S-NG-RAN node resources related to a PDU session for DRBs configured with an SN terminated bearer option. Similarly, in some embodiments, a PDU Session Resource Modification Response Info—SN terminated IE as defined by 3GPP TS 38.423 V15.2.0 Section 9.2.1.10 may be modified such that an SN UL PDCP UP TNL Information IE (and/or group name) may become optional (e.g., instead of mandatory). Note that a PDU Session Resource Modification Response Info—SN terminated IE may contain a PDU session resource related result of an M-NG-RAN node-initiated request to modify DRBs configured with an SN terminated bearer option. In some embodiments, PDU Session Modification Required Info—SN terminated IE as defined by 3GPP TS 38.423 V15.2.0 Section 9.2.1.20 may be modified such that an SN UL PDCP UP TNL Information IE (and/or group name) may become optional (e.g., instead of mandatory. Note that an SN UL PDCP UP TNL Information IE may contain PDU session resource information of an S-NG-RAN node-initiated modification request of DRBs configured with an SN terminated bearer option. Note that in some embodiments, such modifications to IEs may be implemented in the signaling flows describe in reference to FIGS. 9 and 10.

In some embodiments, a master node may request forwarding intentions of a source secondary node prior to negotiating data forwarding with a target secondary node. For example, in some embodiments, prior to performing (and/or initiating) a master node initiated secondary node change procedure as defined by 3GPP TS 37.340 V15.4.0 Section 10.5.2, FIG. 10.5.2-1, the master node may send a SN modification request message to a source secondary node to request a current secondary cell group (SCG) configuration and/or to request a data forwarding proposal from the source secondary node. As another example, in some embodiments, prior to performing (and/or initiating) an inter-master node handover with a master node initiated secondary node change procedure as defined by 3GPP TS 37.340 V15.4.0 Section 10.7.2, FIG. 10.7.2-1, a source master node may send a SN modification request message to a source secondary node to request a current SCG configuration and/or to request a data forwarding proposal from the source secondary node. Note that in some embodiments, similar modifications may also be made to procedures as currently defined by 3GPP TS 37.340 V15.4.0, Section 10.8. For example, a source master node may send an SgNB modification request message to a source SN to request a current SCG configuration and/or to request a data forwarding proposal from the source secondary node prior to a master node to eNB change procedure as defined by FIG. 10.8.1-1. Similarly, a source master node may send an SN modification request message to a source SN to request a current SCG configuration and/or to request a data forwarding proposal from the source secondary node prior to a MN to ng-eNB/gNB change procedure as defined by FIG. 10.8.2-1.

In some embodiments, a PDU Session Resource Modification Info—SN terminated IE as defined by 3GPP TS 38.423 V15.2.0 Section 9.2.1.9 may be modified to include a data forwarding and offloading info query IE (and/or group name). Such a field may be optional in some embodiments. In some embodiments, such a field (and/or) IE may be an enumerated type field. Note that a PDU Session Resource Modification Info—SN terminated IE may contain information related to a PDU session resource for an M-NG-RAN node-initiated request to modify DRBs configured with an SN terminated bearer option.

In some embodiments, a PDU Session Resource Modification Response Info—SN terminated IE as defined by 3GPP TS 38.423 V15.2.0 Section 9.2.1.10 may be modified to include a data forwarding and offloading info query IE (and/or group name). Such a field may be optional in some embodiments. In some embodiments, such a field (and/or) IE may be defined by 3GPP TS 38.423 V15.2.0 Section 9.2.1.17. Note that a PDU Session Resource Modification Response Info—SN terminated IE may contain a PDU session resource related result of an M-NG-RAN node-initiated request to modify DRBs configured with an SN terminated bearer option.

In some embodiments, a M-NG-RAN node initiated S-NG-RAN node modification preparation procedure as defined by TS 38.423 V15.2.0 Section 8.8.3 may be modified such that when/if an S-NODE MODIFICATION REQUEST message contains, for a PDU session resource to be modified which is configured with the SN terminated bearer option, a Data Forwarding and Offloading Info Query IE set to be true, an S-NG-RAN node may provide requested data forwarding and offloading information within that PDU session in the S-NODE MODIFICATION REQUEST ACKNOWLEDGE message.

In some embodiments, an S-NODE MODIFICATION REQUEST message as defined by 3GPP TS 38.423 V15.2.0 Section 9.1.2.5 may be modified to include a requested data forwarding and offloading information query IE (and/or group name). In some embodiments, such an IE may by enumerated. Such a field may be optional in some embodiments. Note that such a message may be sent by an M-NG-RAN node to an S-NG-RAN node to either request the preparation to modify S-NG-RAN node resources for a specific UE, to query for the current SCG configuration, or to provide the S-RLF-related information to the S-NG-RAN node.

In some embodiments, an S-NODE MODIFICATION REQUEST ACKNOWLEDGE message as defined by 3GPP TS 38.423 V15.2.0 Section 9.1.2.6 may be modified to include a requested data forwarding and offloading information IE (and/or group name). Such a field may be optional in some embodiments. In some embodiments, such an IE may include a PDU session list with data forwarding request information, e.g., as defined by 3GPP TS 38.423 V15.2.0 Section 9.2.1.24. Note that such a message may be sent by an S-NR-RAN node to confirm an M-NG-RAN node's request to modify the S-NG-RAN node resources for a specific UE.

In some embodiments, an S-NODE RELEASE REQUEST message as defined by 3GPP TS 38.423 V15.2.0 Section 9.1.2.14 may be modified to include a data forwarding information from target NG-RAN node IE (and/or group name). Such a field may be optional in some embodiments. In some embodiments, such an IE may be defined by 3GPP TS 38.423 V15.2.0 Section 9.2.1.16. Note that such a message may be sent by an M-NG-RAN node to an S-NG-RAN node to request the release of resources.

Figure 11:
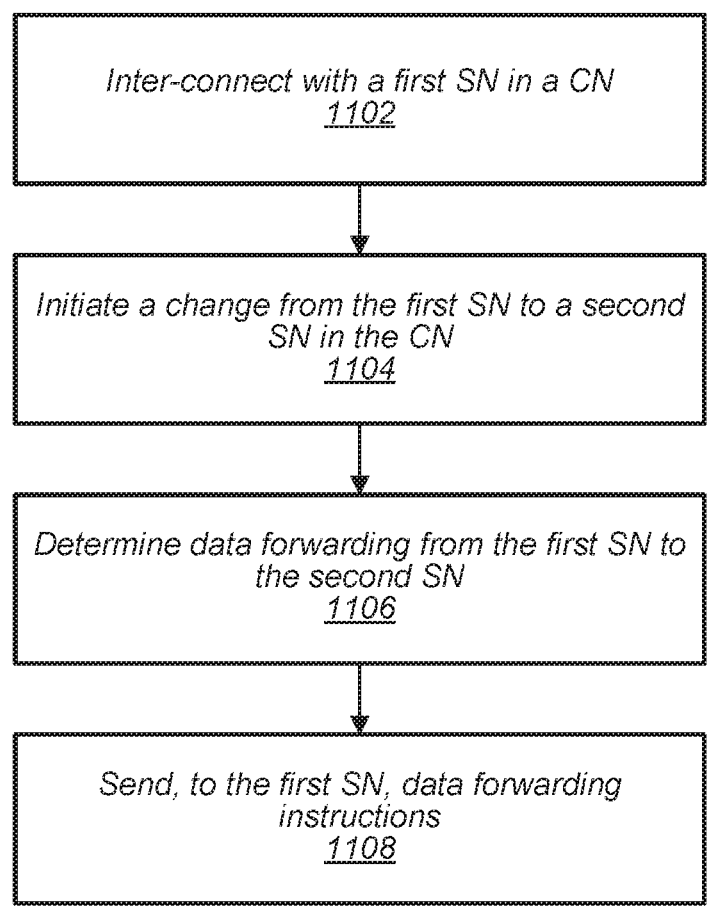
FIG. 11 illustrates an example of a method for a secondary node change initiated by a master node, according to some embodiments.

FIG. 11 illustrates an example of a method for a secondary node change initiated by a master node, according to some embodiments. The method shown in FIG. 11 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1102, a network node, e.g., such as base station 102, may inter-connect with a first secondary node, e.g., such as another base station 102, within a core network, such as a 5G core network. The network node may be a master node and may serve a user equipment device (UE), such as UE 106. In some embodiments, the first secondary node may be a source secondary node.

At 1104, the network node may initiate a change from the first secondary node to a second secondary node in the core network. In some embodiments, the second secondary node may be a target secondary node. In some embodiments, to initiate the change from the first secondary node to the second secondary node, the network node may initiate a hand-over procedure to another master node in the core network. Thus, the network node may be considered a source master node and the other master node may be considered a target master node.

At 1106, the network node may determine data forwarding from the first secondary node to the second secondary node. In some embodiments, the network node may request, from the first secondary node, data forwarding intentions of the first secondary node prior to initiating the change from the first secondary node to the second secondary node. The network node may receive, form the first secondary node, data forwarding intentions of the first secondary node. In such embodiments, data forwarding instructions may be based, at least in part, on the data forwarding intentions of the first secondary node. In some embodiments, the data forwarding intentions of the first secondary node may be received via one of control plane signaling or user plane signaling between the base station and the first secondary node.

At 1108, the network node may send, to the first secondary node, data forwarding instructions. In some embodiments, the data forwarding instructions may include a requirement for the first secondary node to follow the data forwarding instructions. In some embodiments, the data forwarding instructions may include data forwarding addresses.

In some embodiments, the network node may receive, from the first secondary node, a report of dedicated radio bearer (DRB) mapping for first secondary node terminated bearers using secondary cell group resources. In some embodiments, the report of DRB mapping may be received via one of control plane signaling or user plane signaling between the base station and the first secondary node.

In some embodiments, the network mode may generate a protocol data unit (PDU) session resource modification information information element (IE) to modify dedicated resource bearers (DRBs) configured with a secondary node-terminated bearer option. In some embodiments, the session resource modification information IE may include a data forwarding and offloading information query parameter. The network node may transmit the PDU session resource modification information IE to a core access and mobility management function (AMF) of the core network.

Example Embodiments

A first example may include an apparatus employed as a eNodeB or next generation NodeB (e.g., a master node) inter-connecting an eNodeB or next generation Node B (e.g. a secondary node) via an Xn interface in a 5G core network (5GC), including mechanisms to support MR-DC with 5GC operations involving secondary node (SN) change (e.g., SN change, Inter-MN HO, MN to eNB/gNB change, e.g., as defined in TS 37.340) for a specific UE.

A second example may include a secondary node (SN) or some other example herein, wherein reports flow to dedicated radio bearer (DRB) mapping to a master node (MN) of the first example even for SN-terminated bearers using secondary cell group (SCG) resources only during SN addition and/or modification procedure and/or via new control plane (CP) and/or user plane (UP) signaling A third example may include the secondary node of the first example or some other example herein, wherein the secondary node is to perform data forwarding regardless of its forwarding intention as whatever received from a master node of the first example.

A fourth example may the master node of the first example or some other example herein, wherein the master node requests forwarding intention from a secondary node of the first example before contacting a target node for MR-DC with 5GC operations involving SN change.

A fifth example may include the secondary node of the fourth example or some other example herein, wherein the secondary node responds with its forwarding intention as requested from the master node of the fourth example during SN Modification procedure or via new CP and/or UP signaling.

A sixth example may include the master node of the first example or some other example herein, wherein the master node provides a data forwarding address to the secondary node of the first example for MR-DC with 5GC operations involving SN change, during XnAP SN Release procedure earlier than the current XnAP Xn-U Address Indication procedure.

A seventh example may include a method including forcing a source SN to: follow data forwarding provided by a master node or report flow to DRB mapping to a master node even for SN-terminated bearers that only use SCG resources.

An eight example may include the method of the seventh example or some other example herein, wherein said forcing of the source SN may include UP or CP signaling to the source SN.

A ninth example may include the method of the eighth example or some other example herein, wherein UP or CP signaling includes CP signaling during SN addition or modification procedure.

A tenth example may include a method of operating a master node, the method including requesting a forwarding intention of a source secondary node before negotiating data forwarding with a target secondary node.

An eleventh example may include a method including generating a PDU session resource modification information information element to modify DRBs configured with an SN-terminated bearer option, the information element to include a data forwarding and offloading information query parameter; and transmitting the PDU session resource modification information element.

A twelfth example may include a method including generating a PDU session resource modification response information element that includes a PDU session resource related result of an M-NG-RAN node initiated request to modify DRBs configured with an SN-terminated bearer option, the information element to include a requested data forwarding and offloading information parameter; and transmitting the PDU session resource modification response information element.

A thirteenth example may include a method including receiving an S-node modification request message that contains a PDU session resource to be modified that is configured with an SN-terminated bearer option; setting a data forwarding and offloading info query IE to be true based on said receiving.

A fourteenth example may include the method of the thirteenth example or some other example herein, further including providing the requested data forwarding and offloading information within the PDU session in an S-node modification request acknowledgment message.

A fifteenth example may include a method of operating an M-NG-RAN node, the method including: generating an S-node modification request that includes a data forwarding and offloading information query parameter; and transmitting the S-node modification request to an S-NG-RAN node.

A sixteenth example may include a method of operating an S-NG-RAN node, the method including: generating an S-node modification request ACK message that includes a requested data forwarding and offloading info parameter; and transmitting the S-node modification request ACK to an M-NG-RAN node.

A seventeenth example may include a method of operating an M-NG-RAN node, the method including: generating an S-node release request that includes: an Xn-U address information per PDU session resources list; an Xn-U address information per PDU sessions resources item; PDU session ID; or data forwarding info from target NG-RAN node; and transmitting the S-node release request to an S-NG-RAN node.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Systems and Implementations

Figure 12:
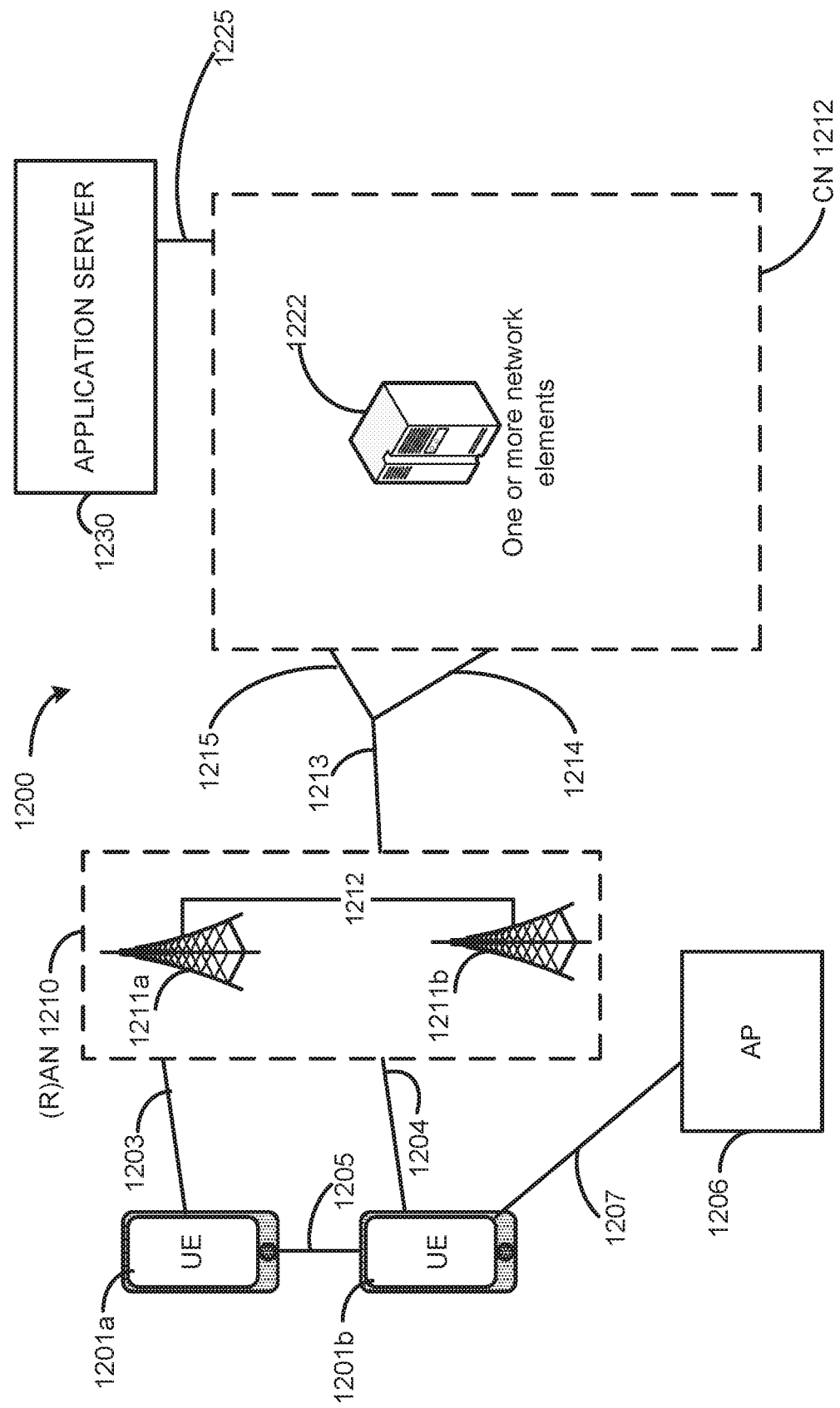
FIG. 12 illustrates an example architecture of a system of a network, according to some embodiments.

FIG. 12 illustrates an example architecture of a system 1200 of a network, in accordance with various embodiments. The following description is provided for an example system 1200 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 12, the system 1200 includes UE 1201a and UE 1201b (collectively referred to as "UEs 1201" or "UE 1201"). In this example, UEs 1201 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, any of the UEs 1201 may be IoT UEs, which may comprise a network access layer designed for low-power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 1201 may be configured to connect, for example, communicatively couple, with an or RAN 1210. In embodiments, the RAN 1210 may be an NG RAN or a 5G RAN, an E-UTRAN, or a legacy RAN, such as a UTRAN or GERAN. As used herein, the term "NG RAN" or the like may refer to a RAN 1210 that operates in an NR or 5G system 1200, and the term "E-UTRAN" or the like may refer to a RAN 1210 that operates in an LTE or 4G system 1200. The UEs 1201 utilize connections (or channels) 1203 and 1204, respectively, each of which comprises a physical communications interface or layer (discussed in further detail below).

In this example, the connections 1203 and 1204 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In embodiments, the UEs 1201 may directly exchange communication data via a ProSe interface 1205. The ProSe interface 1205 may alternatively be referred to as a SL interface 1205 and may comprise one or more logical channels, including but not limited to a PSCCH, a PSSCH, a PSDCH, and a PSBCH.

The UE 1201b is shown to be configured to access an AP 1206 (also referred to as "WLAN node 1206," "WLAN 1206," "WLAN Termination 1206," "WT 1206" or the like) via connection 1207. The connection 1207 can comprise a local wireless connection, such as a connection consistent with any IEEE 802.11 protocol, wherein the AP 1206 would comprise a wireless fidelity (Wi-Fi®) router. In this example, the AP 1206 is shown to be connected to the Internet without connecting to the core network of the wireless system (described in further detail below). In various embodiments, the UE 1201b, RAN 1210, and AP 1206 may be configured to utilize LWA operation and/or LWIP operation. The LWA operation may involve the UE 1201b in RRC_CONNECTED being configured by a RAN node 1211a-b to utilize radio resources of LTE and WLAN. LWIP operation may involve the UE 1201b using WLAN radio resources (e.g., connection 1207) via IPsec protocol tunneling to authenticate and encrypt packets (e.g., IP packets) sent over the connection 1207. IPsec tunneling may include encapsulating the entirety of original IP packets and adding a new packet header, thereby protecting the original header of the IP packets.

The RAN 1210 can include one or more AN nodes or RAN nodes 1211a and 1211b (collectively referred to as "RAN nodes 1211" or "RAN node 1211") that enable the connections 1203 and 1204. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node 1211 that operates in an NR or 5G system 1200 (for example, a gNB), and the term "E-UTRAN node" or the like may refer to a RAN node 1211 that operates in an LTE or 4G system 1200 (e.g., an eNB). According to various embodiments, the RAN nodes 1211 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN nodes 1211 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes 1211; a MAC/PHY split wherein RRC, PDCP, RLC, and MAC layers are operated by the CRAN/vBBUP and the PHY layer is operated by individual RAN nodes 1211; or a "lower PHY" split wherein RRC, PDCP, RLC, MAC layers and upper portions of the PHY layer are operated by the CRAN/vBBUP and lower portions of the PHY layer are operated by individual RAN nodes 1211. This virtualized framework allows the freed-up processor cores of the RAN nodes 1211 to perform other virtualized applications. In some implementations, an individual RAN node 1211 may represent individual gNB-DUs that are connected to a gNB-CU via individual F1 interfaces (not shown by FIG. 12). In these implementations, the gNB-DUs may include one or more remote radio heads or RFEMs (see, e.g., FIG. 15), and the gNB-CU may be operated by a server that is located in the RAN 1210 (not shown) or by a server pool in a similar manner as the CRAN/vBBUP. Additionally or alternatively, one or more of the RAN nodes 1211 may be next generation eNBs (ng-eNBs), which are RAN nodes that provide E-UTRA user plane and control plane protocol terminations toward the UEs 1201, and are connected to a 5GC (e.g., CN 1420 of FIG. 14) via an NG interface (discussed infra).

In V2X scenarios one or more of the RAN nodes 1211 may be or act as RSUs. The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs 1201 (vUEs 1201). The RSU may also include internal data storage circuitry to store intersection map geometry, traffic statistics, media, as well as applications/software to sense and control ongoing vehicular and pedestrian traffic. The RSU may operate on the 5.9 GHz Direct Short-Range Communications (DSRC) band to provide very low latency communications required for high speed events, such as crash avoidance, traffic warnings, and the like. Additionally, or alternatively, the RSU may operate on the cellular V2X band to provide the aforementioned low latency communications, as well as other cellular communications services. Additionally, or alternatively, the RSU may operate as a Wi-Fi hotspot (2.4 GHz band) and/or provide connectivity to one or more cellular networks to provide uplink and downlink communications. The computing device(s) and some or all of the radiofrequency circuitry of the RSU may be packaged in a weatherproof enclosure suitable for outdoor installation, and may include a network interface controller to provide a wired connection (e.g., Ethernet) to a traffic signal controller and/or a backhaul network.

Any of the RAN nodes 1211 can terminate the air interface protocol and can be the first point of contact for the UEs 1201. In some embodiments, any of the RAN nodes 1211 can fulfill various logical functions for the RAN 1210 including, but not limited to, radio network controller (RNC) functions such as radio bearer management, uplink and downlink dynamic radio resource management and data packet scheduling, and mobility management.

In embodiments, the UEs 1201 can be configured to communicate using OFDM communication signals with each other or with any of the RAN nodes 1211 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal sub carriers.

In some embodiments, a downlink resource grid can be used for downlink transmissions from any of the RAN nodes 1211 to the UEs 1201, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UEs 1201 and the RAN nodes 1211 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UEs 1201 and the RAN nodes 1211 may operate using LAA, eLAA, and/or feLAA mechanisms. In these implementations, the UEs 1201 and the RAN nodes 1211 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UEs 1201 RAN nodes 1211, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA. Here, when a WLAN node (e.g., a mobile station (MS) such as UE 1201, AP 1206, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (μs); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 1201 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UEs 1201. The PDCCH carries information about the transport format and resource allocations related to the PDSCH channel, among other things. It may also inform the UEs 1201 about the transport format, resource allocation, and HARQ information related to the uplink shared channel. Typically, downlink scheduling (assigning control and shared channel resource blocks to the UE 1201b within a cell) may be performed at any of the RAN nodes 1211 based on channel quality information fed back from any of the UEs 1201. The downlink resource assignment information may be sent on the PDCCH used for (e.g., assigned to) each of the UEs 1201.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The RAN nodes 1211 may be configured to communicate with one another via interface 1212. In embodiments where the system 1200 is an LTE system (e.g., when CN 1220 is an EPC 1320 as in FIG. 13), the interface 1212 may be an X2 interface 1212. The X2 interface may be defined between two or more RAN nodes 1211 (e.g., two or more eNBs and the like) that connect to EPC 1220, and/or between two eNBs connecting to EPC 1220. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 1201 from an SeNB for user data; information of PDCP PDUs that were not delivered to a UE 1201; information about a current minimum desired buffer size at the SeNB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 1200 is a 5G or NR system (e.g., when CN 1220 is an 5GC 1420 as in FIG. 14), the interface 1212 may be an Xn interface 1212. The Xn interface is defined between two or more RAN nodes 1211 (e.g., two or more gNBs and the like) that connect to 5GC 1220, between a RAN node 1211 (e.g., a gNB) connecting to 5GC 1220 and an eNB, and/or between two eNBs connecting to 5GC 1220. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 1201 in a connected mode (e.g., CM-CONNECTED) including functionality to manage the UE mobility for connected mode between one or more RAN nodes 1211. The mobility support may include context transfer from an old (source) serving RAN node 1211 to new (target) serving RAN node 1211; and control of user plane tunnels between old (source) serving RAN node 1211 to new (target) serving RAN node 1211. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN 1210 is shown to be communicatively coupled to a core network—in this embodiment, core network (CN) 1220. The CN 1220 may comprise a plurality of network elements 1222, which are configured to offer various data and telecommunications services to customers/subscribers (e.g., users of UEs 1201) who are connected to the CN 1220 via the RAN 1210. The components of the CN 1220 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 1220 may be referred to as a network slice, and a logical instantiation of a portion of the CN 1220 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, the application server 1230 may be an element offering applications that use IP bearer resources with the core network (e.g., UMTS PS domain, LTE PS data services, etc.). The application server 1230 can also be configured to support one or more communication services (e.g., VoIP sessions, PTT sessions, group communication sessions, social networking services, etc.) for the UEs 1201 via the EPC 1220.

In embodiments, the CN 1220 may be a 5GC (referred to as "5GC 1220" or the like), and the RAN 1210 may be connected with the CN 1220 via an NG interface 1213. In embodiments, the NG interface 1213 may be split into two parts, an NG user plane (NG-U) interface 1214, which carries traffic data between the RAN nodes 1211 and a UPF, and the S1 control plane (NG-C) interface 1215, which is a signaling interface between the RAN nodes 1211 and AMFs. Embodiments where the CN 1220 is a 5GC 1220 are discussed in more detail with regard to FIG. 14.

In embodiments, the CN 1220 may be a 5G CN (referred to as "5GC 1220" or the like), while in other embodiments, the CN 1220 may be an EPC). Where CN 1220 is an EPC (referred to as "EPC 1220" or the like), the RAN 1210 may be connected with the CN 1220 via an S1 interface 1213. In embodiments, the S1 interface 1213 may be split into two parts, an S1 user plane (S1-U) interface 1214, which carries traffic data between the RAN nodes 1211 and the S-GW, and the S1-MME interface 1215, which is a signaling interface between the RAN nodes 1211 and MMES.

Figure 13:
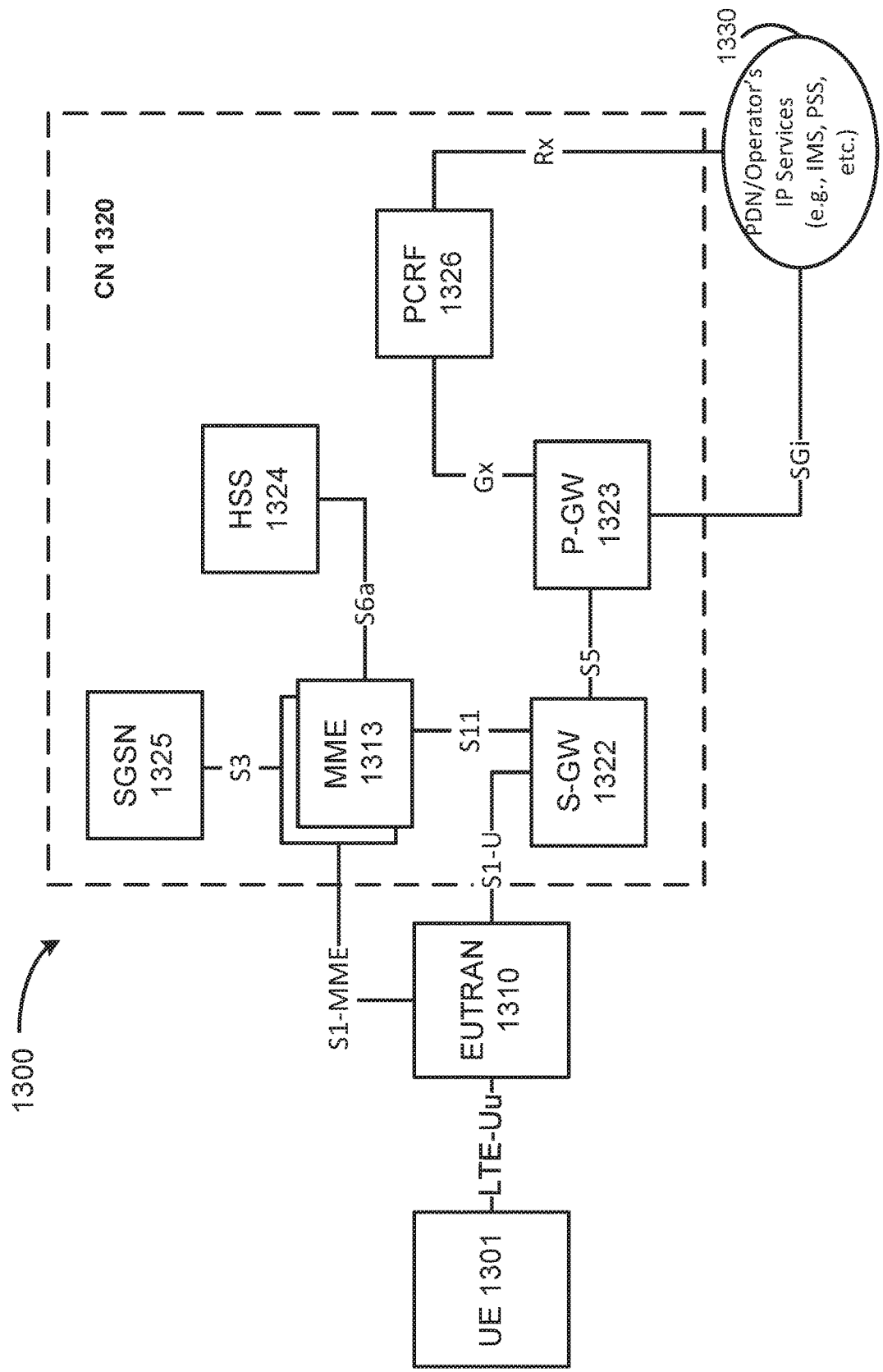
FIG. 13 illustrates an example architecture of a system including a first CN, according to some embodiments.

FIG. 13 illustrates an example architecture of a system 1300 including a first CN 1320, in accordance with various embodiments. In this example, system 1300 may implement the LTE standard wherein the CN 1320 is an EPC 1320 that corresponds with CN 1220 of FIG. 12. Additionally, the UE 1301 may be the same or similar as the UEs 1201 of FIG. 12, and the E-UTRAN 1310 may be a RAN that is the same or similar to the RAN 1210 of FIG. 12, and which may include RAN nodes 1211 discussed previously. The CN 1320 may comprise MMEs 1321, an S-GW 1322, a P-GW 1323, an HSS 1324, and a SGSN 1325.

The MMEs 1321 may be similar in function to the control plane of legacy SGSN, and may implement MM functions to keep track of the current location of a UE 1301. The MMEs 1321 may perform various MM procedures to manage mobility aspects in access such as gateway selection and tracking area list management. MM (also referred to as "EPS MM" or "EMM" in E-UTRAN systems) may refer to all applicable procedures, methods, data storage, etc. that are used to maintain knowledge about a present location of the UE 1301, provide user identity confidentiality, and/or perform other like services to users/subscribers. Each UE 1301 and the MME 1321 may include an MM or EMM sublayer, and an MM context may be established in the UE 1301 and the MME 1321 when an attach procedure is successfully completed. The MM context may be a data structure or database object that stores MM-related information of the UE 1301. The MMEs 1321 may be coupled with the HSS 1324 via an S6a reference point, coupled with the SGSN 1325 via an S3 reference point, and coupled with the S-GW 1322 via an S11 reference point.

The SGSN 1325 may be a node that serves the UE 1301 by tracking the location of an individual UE 1301 and performing security functions. In addition, the SGSN 1325 may perform Inter-EPC node signaling for mobility between 2G/3G and E-UTRAN 3GPP access networks; PDN and S-GW selection as specified by the MMEs 1321; handling of UE 1301 time zone functions as specified by the MMEs 1321; and MME selection for handovers to E-UTRAN 3GPP access network. The S3 reference point between the MMEs 1321 and the SGSN 1325 may enable user and bearer information exchange for inter-3GPP access network mobility in idle and/or active states.

The HSS 1324 may comprise a database for network users, including subscription-related information to support the network entities' handling of communication sessions. The EPC 1320 may comprise one or several HSSs 1324, depending on the number of mobile subscribers, on the capacity of the equipment, on the organization of the network, etc. For example, the HSS 1324 can provide support for routing/roaming, authentication, authorization, naming/addressing resolution, location dependencies, etc. An S6a reference point between the HSS 1324 and the MMEs 1321 may enable transfer of subscription and authentication data for authenticating/authorizing user access to the EPC 1320 between HSS 1324 and the MMEs 1321.

The S-GW 1322 may terminate the S1 interface 1213 ("S1-U" in FIG. 13) toward the RAN 1310, and routes data packets between the RAN 1310 and the EPC 1320. In addition, the S-GW 1322 may be a local mobility anchor point for inter-RAN node handovers and also may provide an anchor for inter-3GPP mobility. Other responsibilities may include lawful intercept, charging, and some policy enforcement. The S11 reference point between the S-GW 1322 and the MMEs 1321 may provide a control plane between the MMEs 1321 and the S-GW 1322. The S-GW 1322 may be coupled with the P-GW 1323 via an S5 reference point.

The P-GW 1323 may terminate an SGi interface toward a PDN 1330. The P-GW 1323 may route data packets between the EPC 1320 and external networks such as a network including the application server 1230 (alternatively referred to as an "AF") via an IP interface 1225 (see e.g., FIG. 12). In embodiments, the P-GW 1323 may be communicatively coupled to an application server (application server 1230 of FIG. 12 or PDN 1330 in FIG. 13) via an IP communications interface 1225 (see, e.g., FIG. 12). The S5 reference point between the P-GW 1323 and the S-GW 1322 may provide user plane tunneling and tunnel management between the P-GW 1323 and the S-GW 1322. The S5 reference point may also be used for S-GW 1322 relocation due to UE 1301 mobility and if the S-GW 1322 needs to connect to a non-collocated P-GW 1323 for the required PDN connectivity. The P-GW 1323 may further include a node for policy enforcement and charging data collection (e.g., PCEF (not shown)). Additionally, the SGi reference point between the P-GW 1323 and the packet data network (PDN) 1330 may be an operator external public, a private PDN, or an intra operator packet data network, for example, for provision of IMS services. The P-GW 1323 may be coupled with a PCRF 1326 via a Gx reference point.

PCRF 1326 is the policy and charging control element of the EPC 1320. In a non-roaming scenario, there may be a single PCRF 1326 in the Home Public Land Mobile Network (HPLMN) associated with a UE 1301's Internet Protocol Connectivity Access Network (IP-CAN) session. In a roaming scenario with local breakout of traffic, there may be two PCRFs associated with a UE 1301's IP-CAN session, a Home PCRF (H-PCRF) within an HPLMN and a Visited PCRF (V-PCRF) within a Visited Public Land Mobile Network (VPLMN). The PCRF 1326 may be communicatively coupled to the application server 1330 via the P-GW 1323. The application server 1330 may signal the PCRF 1326 to indicate a new service flow and select the appropriate QoS and charging parameters. The PCRF 1326 may provision this rule into a PCEF (not shown) with the appropriate TFT and QCI, which commences the QoS and charging as specified by the application server 1330. The Gx reference point between the PCRF 1326 and the P-GW 1323 may allow for the transfer of QoS policy and charging rules from the PCRF 1326 to PCEF in the P-GW 1323. An Rx reference point may reside between the PDN 1330 (or "AF 1330") and the PCRF 1326.

Figure 14:
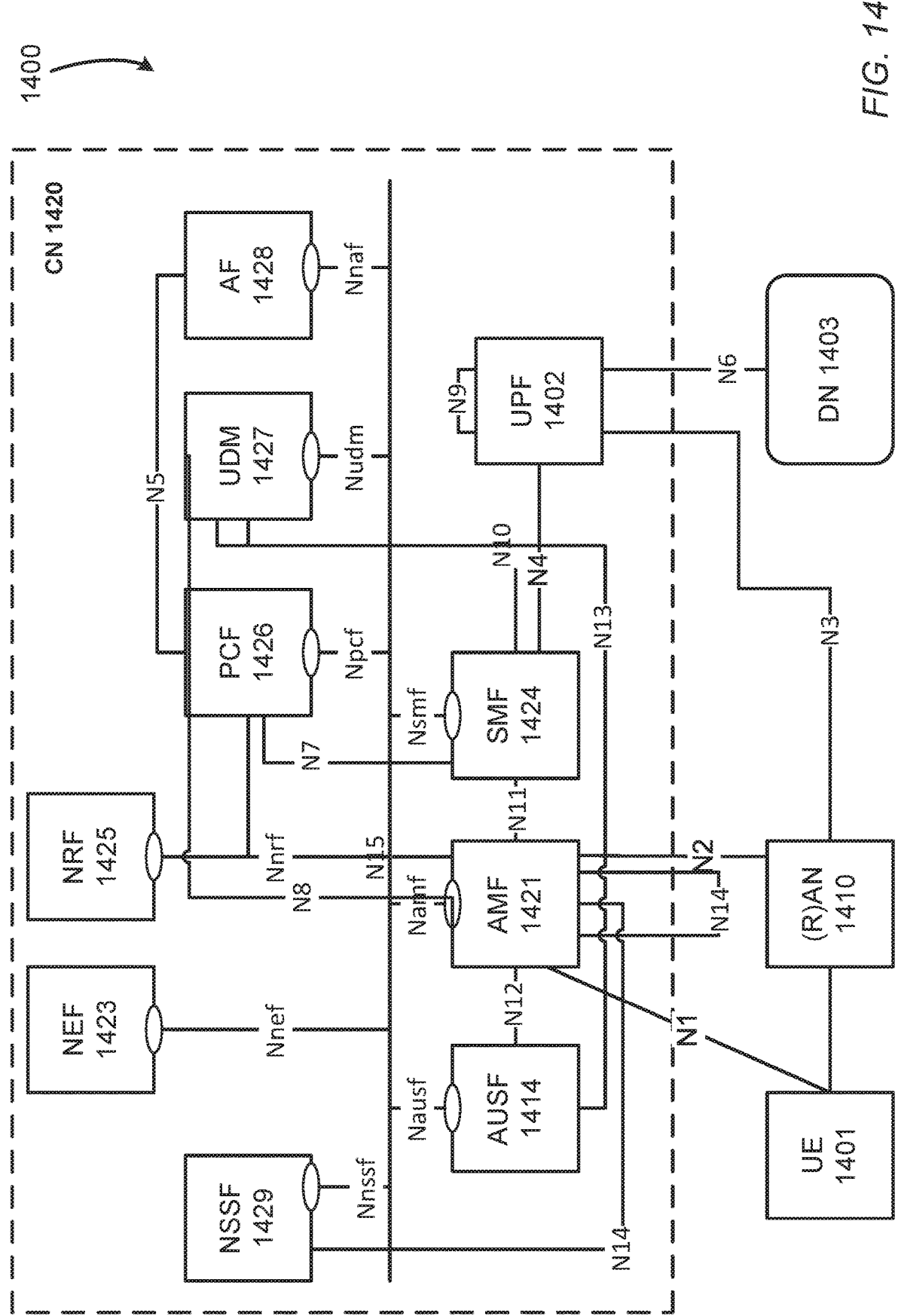
FIG. 14 illustrates an architecture of a system including a second CN, according to some embodiments.

FIG. 14 illustrates an architecture of a system 1400 including a second CN 1420 in accordance with various embodiments. The system 1400 is shown to include a UE 1401, which may be the same or similar to the UEs 1201 and UE 1301 discussed previously; a (R)AN 1410, which may be the same or similar to the RAN 1210 and RAN 1310 discussed previously, and which may include RAN nodes 1211 discussed previously; and a DN 1403, which may be, for example, operator services, Internet access or 3rd party services; and a 5GC 1420. The 5GC 1420 may include an AUSF 1422; an AMF 1421; a SMF 1424; a NEF 1423; a PCF 1426; an NRF 1425; a UDM 1427; an AF 1428; a UPF 1402; and a NSSF 1429.

The UPF 1402 may act as an anchor point for intra-RAT and inter-RAT mobility, an external PDU session point of interconnect to DN 1403, and a branching point to support multi-homed PDU session. The UPF 1402 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform Uplink Traffic verification (e.g., SDF to QoS flow mapping), transport level packet marking in the uplink and downlink, and perform downlink packet buffering and downlink data notification triggering. UPF 1402 may include an uplink classifier to support routing traffic flows to a data network. The DN 1403 may represent various network operator services, Internet access, or third-party services. DN 1403 may include, or be similar to, application server 1230 discussed previously. The UPF 1402 may interact with the SMF 1424 via an N4 reference point between the SMF 1424 and the UPF 1402.

The AUSF 1422 may store data for authentication of UE 1401 and handle authentication-related functionality. The AUSF 1422 may facilitate a common authentication framework for various access types. The AUSF 1422 may communicate with the AMF 1421 via an N12 reference point between the AMF 1421 and the AUSF 1422; and may communicate with the UDM 1427 via an N13 reference point between the UDM 1427 and the AUSF 1422. Additionally, the AUSF 1422 may exhibit a Nausf service-based interface.

The AMF 1421 may be responsible for registration management (e.g., for registering UE 1401, etc.), connection management, reachability management, mobility management, and lawful interception of AMF-related events, and access authentication and authorization. The AMF 1421 may be a termination point for the an N11 reference point between the AMF 1421 and the SMF 1424. The AMF 1421 may provide transport for SM messages between the UE 1401 and the SMF 1424, and act as a transparent proxy for routing SM messages. AMF 1421 may also provide transport for SMS messages between UE 1401 and an SMSF (not shown by FIG. 14). AMF 1421 may act as SEAF, which may include interaction with the AUSF 1422 and the UE 1401, receipt of an intermediate key that was established as a result of the UE 1401 authentication process. Where USIM based authentication is used, the AMF 1421 may retrieve the security material from the AUSF 1422. AMF 1421 may also include a SCM function, which receives a key from the SEA that it uses to derive access-network specific keys. Furthermore, AMF 1421 may be a termination point of a RAN CP interface, which may include or be an N2 reference point between the (R)AN 1410 and the AMF 1421; and the AMF 1421 may be a termination point of NAS (N1) signaling, and perform NAS ciphering and integrity protection.

AMF 1421 may also support NAS signaling with a UE 1401 over an N3 IWF interface. The N3IWF may be used to provide access to untrusted entities. N3IWF may be a termination point for the N2 interface between the (R)AN 1410 and the AMF 1421 for the control plane, and may be a termination point for the N3 reference point between the (R)AN 1410 and the UPF 1402 for the user plane. As such, the AMF 1421 may handle N2 signaling from the SMF 1424 and the AMF 1421 for PDU sessions and QoS, encapsulate/de-encapsulate packets for IPSec and N3 tunneling, mark N3 user-plane packets in the uplink, and enforce QoS corresponding to N3 packet marking taking into account QoS requirements associated with such marking received over N2. N3IWF may also relay uplink and downlink control-plane NAS signaling between the UE 1401 and AMF 1421 via an N1 reference point between the UE 1401 and the AMF 1421, and relay uplink and downlink user-plane packets between the UE 1401 and UPF 1402. The N3IWF also provides mechanisms for IPsec tunnel establishment with the UE 1401. The AMF 1421 may exhibit a Namf service-based interface, and may be a termination point for an N14 reference point between two AMFs 1421 and an N17 reference point between the AMF 1421 and a 5G-EIR (not shown by FIG. 14).

The UE 1401 may need to register with the AMF 1421 in order to receive network services. RM is used to register or deregister the UE 1401 with the network (e.g., AMF 1421), and establish a UE context in the network (e.g., AMF 1421). The UE 1401 may operate in an RM-REGISTERED state or an RM-DEREGISTERED state. In the RM-DEREGISTERED state, the UE 1401 is not registered with the network, and the UE context in AMF 1421 holds no valid location or routing information for the UE 1401 so the UE 1401 is not reachable by the AMF 1421. In the RM-REGISTERED state, the UE 1401 is registered with the network, and the UE context in AMF 1421 may hold a valid location or routing information for the UE 1401 so the UE 1401 is reachable by the AMF 1421. In the RM-REGISTERED state, the UE 1401 may perform mobility Registration Update procedures, perform periodic Registration Update procedures triggered by expiration of the periodic update timer (e.g., to notify the network that the UE 1401 is still active), and perform a Registration Update procedure to update UE capability information or to re-negotiate protocol parameters with the network, among others.

The AMF 1421 may store one or more RM contexts for the UE 1401, where each RM context is associated with a specific access to the network. The RM context may be a data structure, database object, etc. that indicates or stores, inter alia, a registration state per access type and the periodic update timer. The AMF 1421 may also store a 5GC MM context that may be the same or similar to the (E)MM context discussed previously. In various embodiments, the AMF 1421 may store a CE mode B Restriction parameter of the UE 1401 in an associated MM context or RM context. The AMF 1421 may also derive the value, when needed, from the UE's usage setting parameter already stored in the UE context (and/or MM/RM context).

CM may be used to establish and release a signaling connection between the UE 1401 and the AMF 1421 over the N1 interface. The signaling connection is used to enable NAS signaling exchange between the UE 1401 and the CN 1420, and comprises both the signaling connection between the UE and the AN (e.g., RRC connection or UE-N3IWF connection for non-3GPP access) and the N2 connection for the UE 1401 between the AN (e.g., RAN 1410) and the AMF 1421. The UE 1401 may operate in one of two CM states, CM-IDLE mode or CM-CONNECTED mode. When the UE 1401 is operating in the CM-IDLE state/mode, the UE 1401 may have no NAS signaling connection established with the AMF 1421 over the N1 interface, and there may be (R)AN 1410 signaling connection (e.g., N2 and/or N3 connections) for the UE 1401. When the UE 1401 is operating in the CM-CONNECTED state/mode, the UE 1401 may have an established NAS signaling connection with the AMF 1421 over the N1 interface, and there may be a (R)AN 1410 signaling connection (e.g., N2 and/or N3 connections) for the UE 1401. Establishment of an N2 connection between the (R)AN 1410 and the AMF 1421 may cause the UE 1401 to transition from CM-IDLE mode to CM-CONNECTED mode, and the UE 1401 may transition from the CM-CONNECTED mode to the CM-IDLE mode when N2 signaling between the (R)AN 1410 and the AMF 1421 is released.

The SMF 1424 may be responsible for SM (e.g., session establishment, modify and release, including tunnel maintain between UPF and AN node); UE IP address allocation and management (including optional authorization); selection and control of UP function; configuring traffic steering at UPF to route traffic to proper destination; termination of interfaces toward policy control functions; controlling part of policy enforcement and QoS; lawful intercept (for SM events and interface to LI system); termination of SM parts of NAS messages; downlink data notification; initiating AN specific SM information, sent via AMF over N2 to AN; and determining SSC mode of a session. SM may refer to management of a PDU session, and a PDU session or "session" may refer to a PDU connectivity service that provides or enables the exchange of PDUs between a UE 1401 and a data network (DN) 1403 identified by a Data Network Name (DNN). PDU sessions may be established upon UE 1401 request, modified upon UE 1401 and 5GC 1420 request, and released upon UE 1401 and 5GC 1420 request using NAS SM signaling exchanged over the N1 reference point between the UE 1401 and the SMF 1424. Upon request from an application server, the 5GC 1420 may trigger a specific application in the UE 1401. In response to receipt of the trigger message, the UE 1401 may pass the trigger message (or relevant parts/information of the trigger message) to one or more identified applications in the UE 1401. The identified application(s) in the UE 1401 may establish a PDU session to a specific DNN. The SMF 1424 may check whether the UE 1401 requests are compliant with user subscription information associated with the UE 1401. In this regard, the SMF 1424 may retrieve and/or request to receive update notifications on SMF 1424 level subscription data from the UDM 1427.

The SMF 1424 may include the following roaming functionality: handling local enforcement to apply QoS SLAB (VPLMN); charging data collection and charging interface (VPLMN); lawful intercept (in VPLMN for SM events and interface to LI system); and support for interaction with external DN for transport of signaling for PDU session authorization/authentication by external DN. An N16 reference point between two SMFs 1424 may be included in the system 1400, which may be between another SMF 1424 in a visited network and the SMF 1424 in the home network in roaming scenarios. Additionally, the SMF 1424 may exhibit the Nsmf service-based interface.

The NEF 1423 may provide means for securely exposing the services and capabilities provided by 3GPP network functions for third party, internal exposure/re-exposure, Application Functions (e.g., AF 1428), edge computing or fog computing systems, etc. In such embodiments, the NEF 1423 may authenticate, authorize, and/or throttle the AFs. NEF 1423 may also translate information exchanged with the AF 1428 and information exchanged with internal network functions. For example, the NEF 1423 may translate between an AF-Service-Identifier and an internal 5GC information. NEF 1423 may also receive information from other network functions (NFs) based on exposed capabilities of other network functions. This information may be stored at the NEF 1423 as structured data, or at a data storage NF using standardized interfaces. The stored information can then be re-exposed by the NEF 1423 to other NFs and AFs, and/or used for other purposes such as analytics. Additionally, the NEF 1423 may exhibit a Nnef service-based interface.

The NRF 1425 may support service discovery functions, receive NF discovery requests from NF instances, and provide the information of the discovered NF instances to the NF instances. NRF 1425 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 1425 may exhibit the Nnrf service-based interface.

The PCF 1426 may provide policy rules to control plane function(s) to enforce them, and may also support unified policy framework to govern network behavior. The PCF 1426 may also implement an FE to access subscription information relevant for policy decisions in a UDR of the UDM 1427. The PCF 1426 may communicate with the AMF 1421 via an N15 reference point between the PCF 1426 and the AMF 1421, which may include a PCF 1426 in a visited network and the AMF 1421 in case of roaming scenarios. The PCF 1426 may communicate with the AF 1428 via an N5 reference point between the PCF 1426 and the AF 1428; and with the SMF 1424 via an N7 reference point between the PCF 1426 and the SMF 1424. The system 1400 and/or CN 1420 may also include an N24 reference point between the PCF 1426 (in the home network) and a PCF 1426 in a visited network. Additionally, the PCF 1426 may exhibit a Npcf service-based interface.

The UDM 1427 may handle subscription-related information to support the network entities' handling of communication sessions, and may store subscription data of UE 1401. For example, subscription data may be communicated between the UDM 1427 and the AMF 1421 via an N8 reference point between the UDM 1427 and the AMF. The UDM 1427 may include two parts, an application FE and a UDR (the FE and UDR are not shown by FIG. 14). The UDR may store subscription data and policy data for the UDM 1427 and the PCF 1426, and/or structured data for exposure and application data (including PFDs for application detection, application request information for multiple UEs 1401) for the NEF 1423. The Nudr service-based interface may be exhibited by the UDR 221 to allow the UDM 1427, PCF 1426, and NEF 1423 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. The UDR may interact with the SMF 1424 via an N10 reference point between the UDM 1427 and the SMF 1424. UDM 1427 may also support SMS management, wherein an SMS-FE implements the similar application logic as discussed previously. Additionally, the UDM 1427 may exhibit the Nudm service-based interface.

The AF 1428 may provide application influence on traffic routing, provide access to the NCE, and interact with the policy framework for policy control. The NCE may be a mechanism that allows the 5GC 1420 and AF 1428 to provide information to each other via NEF 1423, which may be used for edge computing implementations. In such implementations, the network operator and third-party services may be hosted close to the UE 1401 access point of attachment to achieve an efficient service delivery through the reduced end-to-end latency and load on the transport network. For edge computing implementations, the 5GC may select a UPF 1402 close to the UE 1401 and execute traffic steering from the UPF 1402 to DN 1403 via the N6 interface. This may be based on the UE subscription data, UE location, and information provided by the AF 1428. In this way, the AF 1428 may influence UPF (re)selection and traffic routing. Based on operator deployment, when AF 1428 is considered to be a trusted entity, the network operator may permit AF 1428 to interact directly with relevant NFs. Additionally, the AF 1428 may exhibit a Naf service-based interface.

The NSSF 1429 NSSF 1429 may select a set of network slice instances serving the UE 1401. The NSSF 1429 may also determine allowed NSSAI and the mapping to the subscribed S-NSSAIs, if needed. The NSSF 1429 may also determine the AMF set to be used to serve the UE 1401, or a list of candidate AMF(s) 1421 based on a suitable configuration and possibly by querying the NRF 1425. The selection of a set of network slice instances for the UE 1401 may be triggered by the AMF 1421 with which the UE 1401 is registered by interacting with the NSSF 1429, which may lead to a change of AMF 1421. The NSSF 1429 may interact with the AMF 1421 via an N22 reference point between AMF 1421 and NSSF 1429; and may communicate with another NSSF 1429 in a visited network via an N31 reference point (not shown by FIG. 14). Additionally, the NSSF 1429 may exhibit a Nnssf service-based interface.

As discussed previously, the CN 1420 may include an SMSF, which may be responsible for SMS subscription checking and verification, and relaying SM messages to/from the UE 1401 to/from other entities, such as an SMS-GMSC/IWMSC/SMS-router. The SMS may also interact with AMF 1421 and UDM 1427 for a notification procedure that the UE 1401 is available for SMS transfer (e.g., set a UE not reachable flag, and notifying UDM 1427 when UE 1401 is available for SMS).

The CN 120 may also include other elements that are not shown by FIG. 14, such as a Data Storage system/architecture, a 5G-EIR, a SEPP, and the like. The Data Storage system may include a SDSF, an UDSF, and/or the like. Any NF may store and retrieve unstructured data into/from the UDSF (e.g., UE contexts), via N18 reference point between any NF and the UDSF (not shown by FIG. 14). Individual NFs may share a UDSF for storing their respective unstructured data or individual NFs may each have their own UDSF located at or near the individual NFs. Additionally, the UDSF may exhibit a Nudsf service-based interface (not shown by FIG. 14). The 5G-EIR may be an NF that checks the status of PEI for determining whether particular equipment/entities are blacklisted from the network; and the SEPP may be a non-transparent proxy that performs topology hiding, message filtering, and policing on inter-PLMN control plane interfaces.

Additionally, there may be many more reference points and/or service-based interfaces between the NF services in the NFs; however, these interfaces and reference points have been omitted from FIG. 14 for clarity. In one example, the CN 1420 may include a Nx interface, which is an inter-CN interface between the MME (e.g., MME 1321) and the AMF 1421 in order to enable interworking between CN 1420 and CN 1320. Other example interfaces/reference points may include an N5g-EIR service-based interface exhibited by a 5G-EIR, an N27 reference point between the NRF in the visited network and the NRF in the home network; and an N31 reference point between the NSSF in the visited network and the NSSF in the home network.

Figure 15:
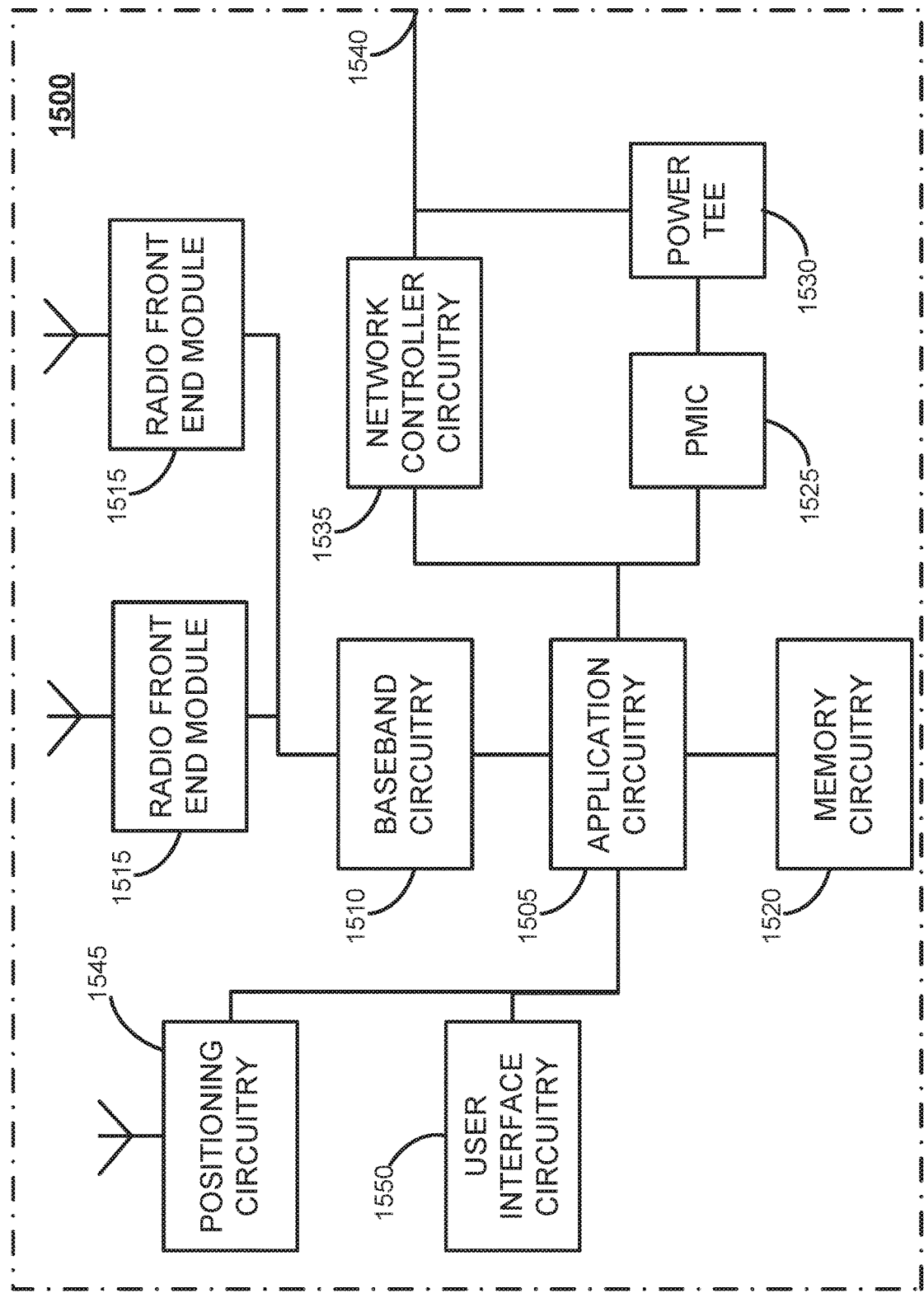
FIG. 15 illustrates an example of infrastructure equipment, according to some embodiments.

FIG. 15 illustrates an example of infrastructure equipment 1500 in accordance with various embodiments. The infrastructure equipment 1500 (or "system 1500") may be implemented as a base station, radio head, RAN node such as the RAN nodes 1211 and/or AP 1206 shown and described previously, application server(s) 1230, and/or any other element/device discussed herein. In other examples, the system 1500 could be implemented in or by a UE.

The system 1500 includes application circuitry 1505, baseband circuitry 1510, one or more radio front end modules (RFEMs) 1515, memory circuitry 1520, power management integrated circuitry (PMIC) 1525, power tee circuitry 1530, network controller circuitry 1535, network interface connector 1540, satellite positioning circuitry 1545, and user interface 1550. In some embodiments, the device 1500 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations.

Application circuitry 1505 includes circuitry such as, but not limited to one or more processors (or processor cores), cache memory, and one or more of low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 1505 may be coupled with or may include memory/storage elements and may be configured to execute instructions stored in the memory/storage to enable various applications or operating systems to run on the system 1500. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 1505 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 1505 may comprise, or may be, a special-purpose processor/controller to operate according to the various embodiments herein. As examples, the processor(s) of application circuitry 1505 may include one or more Apple processors, Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the system 1500 may not utilize application circuitry 1505, and instead may include a special-purpose processor/controller to process IP data received from an EPC or 5GC, for example.

In some implementations, the application circuitry 1505 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 1505 may comprise logic blocks or logic fabric, and other interconnected resources that may be programmed to perform various functions, such as the procedures, methods, functions, etc. of the various embodiments discussed herein. In such embodiments, the circuitry of application circuitry 1505 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like.

The baseband circuitry 1510 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 1510 are discussed infra with regard to FIG. 17.

User interface circuitry 1550 may include one or more user interfaces designed to enable user interaction with the system 1500 or peripheral component interfaces designed to enable peripheral component interaction with the system 1500. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMs) 1515 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 17111 of FIG. 17 infra), and the RFEM may be connected to multiple antennas. In alternative implementations, both mmWave and sub-mmWave radio functions may be implemented in the same physical RFEM 1515, which incorporates both mmWave antennas and sub-mmWave.

The memory circuitry 1520 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 1520 may be implemented as one or more of solder down packaged integrated circuits, socketed memory modules and plug-in memory cards.

The PMIC 1525 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 1530 may provide for electrical power drawn from a network cable to provide both power supply and data connectivity to the infrastructure equipment 1500 using a single cable.

The network controller circuitry 1535 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 1500 via network interface connector 1540 using a physical connection, which may be electrical (commonly referred to as a "copper interconnect"), optical, or wireless. The network controller circuitry 1535 may include one or more dedicated processors and/or FPGAs to communicate using one or more of the aforementioned protocols. In some implementations, the network controller circuitry 1535 may include multiple controllers to provide connectivity to other networks using the same or different protocols.

The positioning circuitry 1545 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 1545 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 1545 may include a Micro-Technology for Positioning, Navigation, and Timing (Micro-PNT) IC that uses a master timing clock to perform position tracking/estimation without GNSS assistance. The positioning circuitry 1545 may also be part of, or interact with, the baseband circuitry 1510 and/or RFEMs 1515 to communicate with the nodes and components of the positioning network. The positioning circuitry 1545 may also provide position data and/or time data to the application circuitry 1505, which may use the data to synchronize operations with various infrastructure (e.g., RAN nodes 1211, etc.), or the like.

The components shown by FIG. 15 may communicate with one another using interface circuitry, which may include any number of bus and/or interconnect (IX) technologies such as industry standard architecture (ISA), extended ISA (EISA), peripheral component interconnect (PCI), peripheral component interconnect extended (PCIx), PCI express (PCIe), or any number of other technologies. The bus/IX may be a proprietary bus, for example, used in a SoC based system. Other bus/IX systems may be included, such as an I2C interface, an SPI interface, point to point interfaces, and a power bus, among others.

Figure 16:
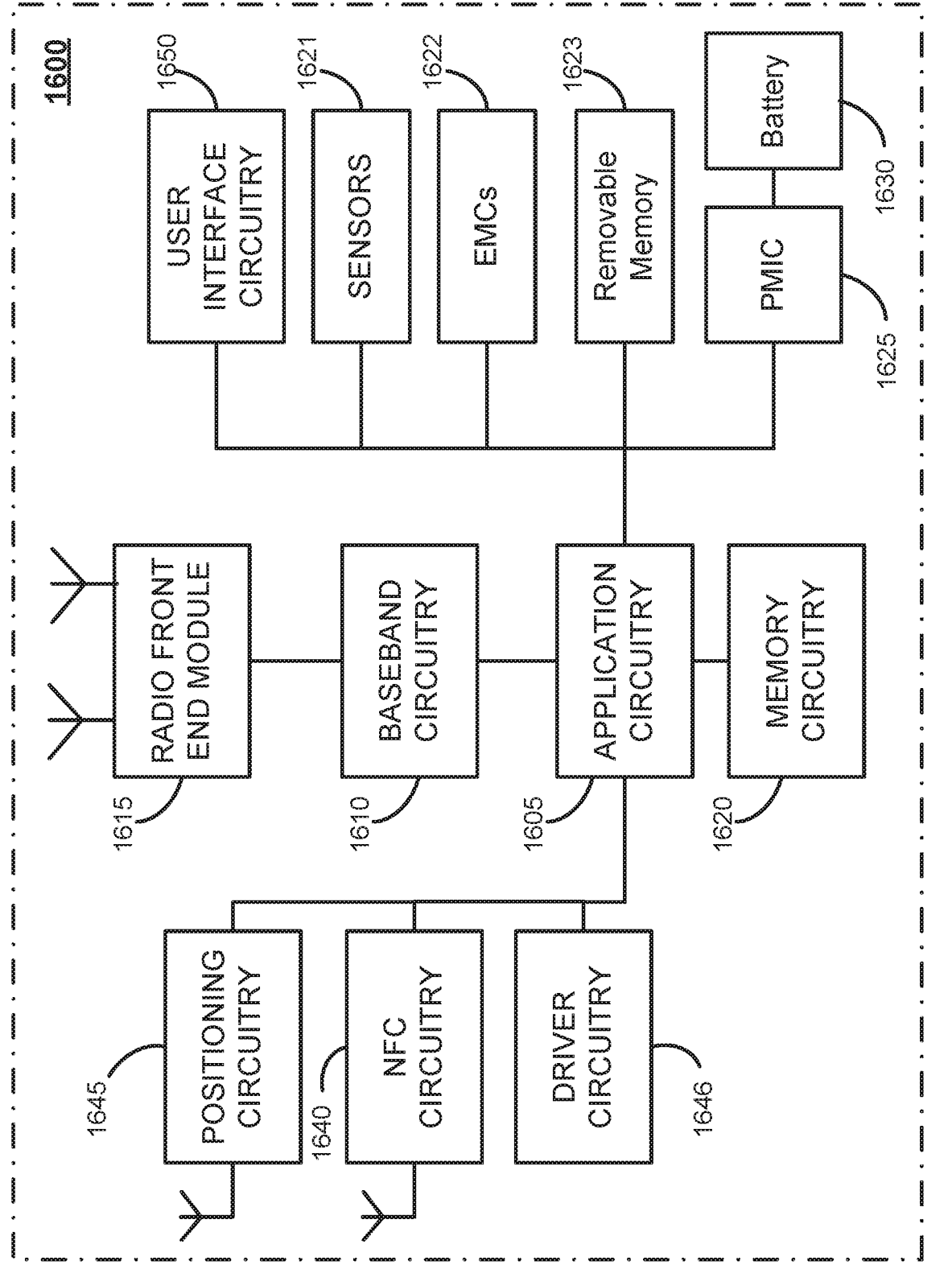
FIG. 16 illustrates an example of a platform, according to some embodiments.

FIG. 16 illustrates an example of a platform 1600 (or "device 1600") in accordance with various embodiments. In embodiments, the computer platform 1600 may be suitable for use as UEs 1201, 1301, 1401, application servers 1230, and/or any other element/device discussed herein. The platform 1600 may include any combinations of the components shown in the example. The components of platform 1600 may be implemented as integrated circuits (ICs), portions thereof, discrete electronic devices, or other modules, logic, hardware, software, firmware, or a combination thereof adapted in the computer platform 1600, or as components otherwise incorporated within a chassis of a larger system. The block diagram of FIG. 16 is intended to show a high-level view of components of the computer platform 1600. However, some of the components shown may be omitted, additional components may be present, and different arrangement of the components shown may occur in other implementations.

Application circuitry 1605 includes circuitry such as, but not limited to one or more processors (or processor cores), cache memory, and one or more of LDOs, interrupt controllers, serial interfaces such as SPI, I2C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 1605 may be coupled with or may include memory/storage elements and may be configured to execute instructions stored in the memory/storage to enable various applications or operating systems to run on the system 1600. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 1505 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some embodiments, the application circuitry 1505 may comprise, or may be, a special-purpose processor/controller to operate according to the various embodiments herein.

As examples, the processor(s) of application circuitry 1605 may include A-series processor(s) from Apple® Inc., Intel® Architecture Core™ based processor, such as a Quark™, an Atom™, an i3, an i5, an i7, or an MCU-class processor, or another such processor available from Intel® Corporation, Santa Clara, CA. The processors of the application circuitry 1605 may also be one or more of Advanced Micro Devices (AMD) Ryzen® processor(s) or Accelerated Processing Units (APUs); Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 1605 may be a part of a system on a chip (SoC) in which the application circuitry 1605 and other components are formed into a single integrated circuit, or a single package, such as the Edison™ or Galileo™ SoC boards from Intel® Corporation.

Additionally or alternatively, application circuitry 1605 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 1605 may comprise logic blocks or logic fabric, and other interconnected resources that may be programmed to perform various functions, such as the procedures, methods, functions, etc. of the various embodiments discussed herein. In such embodiments, the circuitry of application circuitry 1605 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up tables (LUTs) and the like.

The baseband circuitry 1610 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 1610 are discussed infra with regard to FIG. 17.

The RFEMs 1615 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 17111 of FIG. 17 infra), and the RFEM may be connected to multiple antennas. In alternative implementations, both mmWave and sub-mmWave radio functions may be implemented in the same physical RFEM 1615, which incorporates both mmWave antennas and sub-mmWave.

The memory circuitry 1620 may include any number and type of memory devices used to provide for a given amount of system memory. As examples, the memory circuitry 1620 may include one or more of volatile memory including random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry 1620 may be developed in accordance with a Joint Electron Devices Engineering Council (JEDEC) low power double data rate (LPDDR)-based design, such as LPDDR2, LPDDR3, LPDDR4, or the like. Memory circuitry 1620 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 1620 may be on-die memory or registers associated with the application circuitry 1605. To provide for persistent storage of information such as data, applications, operating systems and so forth, memory circuitry 1620 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform 1600 may incorporate the three-dimensional (3D) cross-point (XPOINT) memories from Intel® and Micron®.

Removable memory circuitry 1623 may include devices, circuitry, enclosures/housings, ports or receptacles, etc. used to couple portable data storage devices with the platform 1600. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 1600 may also include interface circuitry (not shown) that is used to connect external devices with the platform 1600. The external devices connected to the platform 1600 via the interface circuitry include sensor circuitry 1621 and electro-mechanical components (EMCs) 1622, as well as removable memory devices coupled to removable memory circuitry 1623.

The sensor circuitry 1621 include devices, modules, or subsystems whose purpose is to detect events or changes in its environment and send the information (sensor data) about the detected events to some other a device, module, subsystem, etc. Examples of such sensors include, inter alia, inertia measurement units (IMUS) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 1622 include devices, modules, or subsystems whose purpose is to enable platform 1600 to change its state, position, and/or orientation, or move or control a mechanism or (sub)system. Additionally, EMCs 1622 may be configured to generate and send messages/signaling to other components of the platform 1600 to indicate a current state of the EMCs 1622. Examples of the EMCs 1622 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 1600 is configured to operate one or more EMCs 1622 based on one or more captured events and/or instructions or control signals received from a service provider and/or various clients.

In some implementations, the interface circuitry may connect the platform 1600 with positioning circuitry 1645. The positioning circuitry 1645 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 1645 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 1645 may include a Micro-PNT IC that uses a master timing clock to perform position tracking/estimation without GNSS assistance. The positioning circuitry 1645 may also be part of, or interact with, the baseband circuitry 1510 and/or RFEMs 1615 to communicate with the nodes and components of the positioning network. The positioning circuitry

1645 may also provide position data and/or time data to the application circuitry 1605, which may use the data to synchronize operations with various infrastructure (e.g., radio base stations), for turn-by-turn navigation applications, or the like In some implementations, the interface circuitry may connect the platform 1600 with Near-Field Communication (NFC) circuitry 1640. NFC circuitry 1640 is configured to provide contactless, short-range communications based on radio frequency identification (RFID) standards, wherein magnetic field induction is used to enable communication between NFC circuitry 1640 and NFC-enabled devices external to the platform 1600 (e.g., an "NFC touchpoint"). NFC circuitry 1640 comprises an NFC controller coupled with an antenna element and a processor coupled with the NFC controller. The NFC controller may be a chip/IC providing NFC functionalities to the NFC circuitry 1640 by executing NFC controller firmware and an NFC stack. The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 1640, or initiate data transfer between the NFC circuitry 1640 and another active NFC device (e.g., a smartphone or an NFC-enabled POS terminal) that is proximate to the platform 1600.

The driver circuitry 1646 may include software and hardware elements that operate to control particular devices that are embedded in the platform 1600, attached to the platform 1600, or otherwise communicatively coupled with the platform 1600. The driver circuitry 1646 may include individual drivers allowing other components of the platform 1600 to interact with or control various input/output (I/O) devices that may be present within, or connected to, the platform 1600. For example, driver circuitry 1646 may include a display driver to control and allow access to a display device, a touchscreen driver to control and allow access to a touchscreen interface of the platform 1600, sensor drivers to obtain sensor readings of sensor circuitry 1621 and control and allow access to sensor circuitry 1621, EMC drivers to obtain actuator positions of the EMCs 1622 and/or control and allow access to the EMCs 1622, a camera driver to control and allow access to an embedded image capture device, audio drivers to control and allow access to one or more audio devices.

The power management integrated circuitry (PMIC) 1625 (also referred to as "power management circuitry 1625") may manage power provided to various components of the platform 1600. In particular, with respect to the baseband circuitry 1610, the PMIC 1625 may control power-source selection, voltage scaling, battery charging, or DC-to-DC conversion. The PMIC 1625 may often be included when the platform 1600 is capable of being powered by a battery 1630, for example, when the device is included in a UE 1201, 1301, 1401.

In some embodiments, the PMIC 1625 may control, or otherwise be part of, various power saving mechanisms of the platform 1600. For example, if the platform 1600 is in an RRC_Connected state, where it is still connected to the RAN node as it expects to receive traffic shortly, then it may enter a state known as Discontinuous Reception Mode (DRX) after a period of inactivity. During this state, the platform 1600 may power down for brief intervals of time and thus save power. If there is no data traffic activity for an extended period of time, then the platform 1600 may transition off to an RRC_Idle state, where it disconnects from the network and does not perform operations such as channel quality feedback, handover, etc. The platform 1600 goes into a very low power state and it performs paging where again it periodically wakes up to listen to the network and then powers down again. The platform 1600 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 1630 may power the platform 1600, although in some examples the platform 1600 may be mounted deployed in a fixed location, and may have a power supply coupled to an electrical grid. The battery 1630 may be a lithium ion battery, a metal-air battery, such as a zinc-air battery, an aluminum-air battery, a lithium-air battery, and the like. In some implementations, such as in V2X applications, the battery 1630 may be a typical lead-acid automotive battery.

In some implementations, the battery 1630 may be a "smart battery," which includes or is coupled with a Battery Management System (BMS) or battery monitoring integrated circuitry. The BMS may be included in the platform 1600 to track the state of charge (SoCh) of the battery 1630. The BMS may be used to monitor other parameters of the battery 1630 to provide failure predictions, such as the state of health (SoH) and the state of function (SoF) of the battery 1630. The BMS may communicate the information of the battery 1630 to the application circuitry 1605 or other components of the platform 1600. The BMS may also include an analog-to-digital (ADC) convertor that allows the application circuitry 1605 to directly monitor the voltage of the battery 1630 or the current flow from the battery 1630. The battery parameters may be used to determine actions that the platform 1600 may perform, such as transmission frequency, network operation, sensing frequency, and the like.

A power block, or other power supply coupled to an electrical grid may be coupled with the BMS to charge the battery 1630. In some examples, the power block XS30 may be replaced with a wireless power receiver to obtain the power wirelessly, for example, through a loop antenna in the computer platform 1600. In these examples, a wireless battery charging circuit may be included in the BMS. The specific charging circuits chosen may depend on the size of the battery 1630, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 1650 includes various input/output (I/O) devices present within, or connected to, the platform 1600, and includes one or more user interfaces designed to enable user interaction with the platform 1600 and/or peripheral component interfaces designed to enable peripheral component interaction with the platform 1600. The user interface circuitry 1650 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 1600. The output device circuitry may also include speakers or other audio emitting devices, printer(s), and/or the like. In some embodiments, the sensor circuitry 1621 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 1600 may communicate with one another using a suitable bus or interconnect (IX) technology, which may include any number of technologies, including ISA, EISA, PCI, PCIx, PCIe, a Time-Trigger Protocol (TTP) system, a FlexRay system, or any number of other technologies. The bus/IX may be a proprietary bus/IX, for example, used in a SoC based system. Other bus/IX systems may be included, such as an I2C interface, an SPI interface, point-to-point interfaces, and a power bus, among others.

Figure 17:
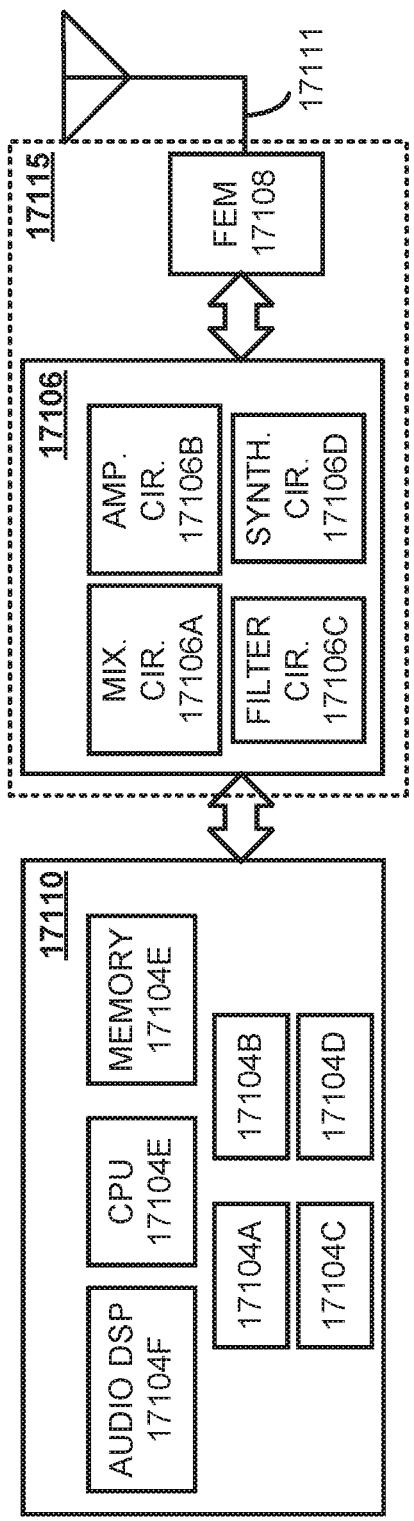
FIG. 17 illustrates example components of baseband circuitry and radio front end modules, according to some embodiments.

FIG. 17 illustrates example components of baseband circuitry 17110 and radio front end modules (RFEM) 17115 in accordance with various embodiments. The baseband circuitry 17110 corresponds to the baseband circuitry 1510 and 1610 of FIGS. 15 and 16, respectively. The RFEM 17115 corresponds to the RFEM 1515 and 1615 of FIGS. 15 and 16, respectively. As shown, the RFEMs 17115 may include Radio Frequency (RF) circuitry 17106, front-end module (FEM) circuitry 17108, antenna array 17111 coupled together at least as shown.

The baseband circuitry 17110 includes circuitry and/or control logic configured to carry out various radio/network protocol and radio control functions that enable communication with one or more radio networks via the RF circuitry 17106. The radio control functions may include, but are not limited to, signal modulation/demodulation, encoding/decoding, radio frequency shifting, etc. In some embodiments, modulation/demodulation circuitry of the baseband circuitry 17110 may include Fast-Fourier Transform (FFT), precoding, or constellation mapping/demapping functionality. In some embodiments, encoding/decoding circuitry of the baseband circuitry 17110 may include convolution, tail-biting convolution, turbo, Viterbi, or Low-Density Parity Check (LDPC) encoder/decoder functionality. Embodiments of modulation/demodulation and encoder/decoder functionality are not limited to these examples and may include other suitable functionality in other embodiments. The baseband circuitry 17110 is configured to process baseband signals received from a receive signal path of the RF circuitry 17106 and to generate baseband signals for a transmit signal path of the RF circuitry 17106. The baseband circuitry 17110 is configured to interface with application circuitry 1505/1605 (see FIGS. 15 and 16) for generation and processing of the baseband signals and for controlling operations of the RF circuitry 17106. The baseband circuitry 17110 may handle various radio control functions.

The aforementioned circuitry and/or control logic of the baseband circuitry 17110 may include one or more single or multi-core processors. For example, the one or more processors may include a 3G baseband processor 17104A, a 4G/LTE baseband processor 17104B, a 5G/NR baseband processor 17104C, or some other baseband processor(s) 17104D for other existing generations, generations in development or to be developed in the future (e.g., sixth generation (6G), etc.). In other embodiments, some or all of the functionality of baseband processors 17104A-D may be included in modules stored in the memory 17104G and executed via a Central Processing Unit (CPU) 17104E. In other embodiments, some or all of the functionality of baseband processors 17104A-D may be provided as hardware accelerators (e.g., FPGAs, ASICs, etc.) loaded with the appropriate bit streams or logic blocks stored in respective memory cells. In various embodiments, the memory 17104G may store program code of a real-time OS (RTOS), which when executed by the CPU 17104E (or other baseband processor), is to cause the CPU 17104E (or other baseband processor) to manage resources of the baseband circuitry 17110, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein. In addition, the baseband circuitry 17110 includes one or more audio digital signal processor(s) (DSP) 17104F. The audio DSP(s) 17104F include elements for compression/decompression and echo cancellation and may include other suitable processing elements in other embodiments.

In some embodiments, each of the processors 17104A-17104E include respective memory interfaces to send/receive data to/from the memory 17104G. The baseband circuitry 17110 may further include one or more interfaces to communicatively couple to other circuitries/devices, such as an interface to send/receive data to/from memory external to the baseband circuitry 17110; an application circuitry interface to send/receive data to/from the application circuitry 1505/1605 of FIGS. 15-17); an RF circuitry interface to send/receive data to/from RF circuitry 17106 of FIG. 17; a wireless hardware connectivity interface to send/receive data to/from one or more wireless hardware elements (e.g., Near Field Communication (NFC) components, Bluetooth®/Bluetooth® Low Energy components, Wi-Fi® components, and/or the like); and a power management interface to send/receive power or control signals to/from the PMIC 1625.

In alternate embodiments (which may be combined with the above described embodiments), baseband circuitry 17110 comprises one or more digital baseband systems, which are coupled with one another via an interconnect subsystem and to a CPU subsystem, an audio subsystem, and an interface subsystem. The digital baseband subsystems may also be coupled to a digital baseband interface and a mixed-signal baseband subsystem via another interconnect subsystem. Each of the interconnect subsystems may include a bus system, point-to-point connections, network-on-chip (NOC) structures, and/or some other suitable bus or interconnect technology, such as those discussed herein. The audio subsystem may include DSP circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 17110 may include protocol processing circuitry with one or more instances of control circuitry (not shown) to provide control functions for the digital baseband circuitry and/or radio frequency circuitry (e.g., the radio front end modules 17115).

Although not shown by FIG. 17, in some embodiments, the baseband circuitry 17110 includes individual processing device(s) to operate one or more wireless communication protocols (e.g., a "multi-protocol baseband processor" or "protocol processing circuitry") and individual processing device(s) to implement PHY layer functions. In these embodiments, the PHY layer functions include the aforementioned radio control functions. In these embodiments, the protocol processing circuitry operates or implements various protocol layers/entities of one or more wireless communication protocols. In a first example, the protocol processing circuitry may operate LTE protocol entities and/or 5G/NR protocol entities when the baseband circuitry 17110 and/or RF circuitry 17106 are part of mmWave communication circuitry or some other suitable cellular communication circuitry. In the first example, the protocol processing circuitry would operate MAC, RLC, PDCP, SDAP, RRC, and NAS functions. In a second example, the protocol processing circuitry may operate one or more IEEE-based protocols when the baseband circuitry 17110 and/or RF circuitry 17106 are part of a Wi-Fi communication system. In the second example, the protocol processing circuitry would operate Wi-Fi MAC and logical link control (LLC) functions. The protocol processing circuitry may include one or more memory structures (e.g., 17104G) to store program code and data for operating the protocol functions, as well as one or more processing cores to execute the program code and perform various operations using the data. The baseband circuitry 17110 may also support radio communications for more than one wireless protocol.

The various hardware elements of the baseband circuitry 17110 discussed herein may be implemented, for example, as a solder-down substrate including one or more integrated circuits (ICs), a single packaged IC soldered to a main circuit board or a multi-chip module containing two or more ICs. In one example, the components of the baseband circuitry 17110 may be suitably combined in a single chip or chipset, or disposed on a same circuit board. In another example, some or all of the constituent components of the baseband circuitry 17110 and RF circuitry 17106 may be implemented together such as, for example, a system on a chip (SoC) or System-in-Package (SiP). In another example, some or all of the constituent components of the baseband circuitry 17110 may be implemented as a separate SoC that is communicatively coupled with and RF circuitry 17106 (or multiple instances of RF circuitry 17106). In yet another example, some or all of the constituent components of the baseband circuitry 17110 and the application circuitry 1505/ 1605 may be implemented together as individual SoCs mounted to a same circuit board (e.g., a "multi-chip package").

In some embodiments, the baseband circuitry 17110 may provide for communication compatible with one or more radio technologies. For example, in some embodiments, the baseband circuitry 17110 may support communication with an E-UTRAN or other WMAN, a WLAN, a WPAN. Embodiments in which the baseband circuitry 17110 is configured to support radio communications of more than one wireless protocol may be referred to as multi-mode baseband circuitry.

RF circuitry 17106 may enable communication with wireless networks using modulated electromagnetic radiation through a non-solid medium. In various embodiments, the RF circuitry 17106 may include switches, filters, amplifiers, etc. to facilitate the communication with the wireless network. RF circuitry 17106 may include a receive signal path, which may include circuitry to down-convert RF signals received from the FEM circuitry 17108 and provide baseband signals to the baseband circuitry 17110. RF circuitry 17106 may also include a transmit signal path, which may include circuitry to up-convert baseband signals provided by the baseband circuitry 17110 and provide RF output signals to the FEM circuitry 17108 for transmission.

In some embodiments, the receive signal path of the RF circuitry 17106 may include mixer circuitry 17106*a*, amplifier circuitry 17106*b* and filter circuitry 17106*c*. In some embodiments, the transmit signal path of the RF circuitry 17106 may include filter circuitry 17106*c* and mixer circuitry 17106*a*. RF circuitry 17106 may also include synthesizer circuitry 17106*d* for synthesizing a frequency for use by the mixer circuitry 17106*a* of the receive signal path and the transmit signal path. In some embodiments, the mixer circuitry 17106*a* of the receive signal path may be configured to down-convert RF signals received from the FEM circuitry 17108 based on the synthesized frequency provided by synthesizer circuitry 17106*d*. The amplifier circuitry 17106*b* may be configured to amplify the down-converted signals and the filter circuitry 17106*c* may be a low-pass filter (LPF) or band-pass filter (BPF) configured to remove unwanted signals from the down-converted signals to generate output baseband signals. Output baseband signals may be provided to the baseband circuitry 17110 for further processing. In some embodiments, the output baseband signals may be zero-frequency baseband signals, although this is not a requirement. In some embodiments, mixer circuitry 17106*a* of the receive signal path may comprise passive mixers, although the scope of the embodiments is not limited in this respect.

In some embodiments, the mixer circuitry 17106*a* of the transmit signal path may be configured to up-convert input baseband signals based on the synthesized frequency provided by the synthesizer circuitry 17106*d* to generate RF output signals for the FEM circuitry 17108. The baseband signals may be provided by the baseband circuitry 17110 and may be filtered by filter circuitry 17106*c*.

In some embodiments, the mixer circuitry 17106*a* of the receive signal path and the mixer circuitry 17106*a* of the transmit signal path may include two or more mixers and may be arranged for quadrature downconversion and upconversion, respectively. In some embodiments, the mixer circuitry 17106*a* of the receive signal path and the mixer circuitry 17106*a* of the transmit signal path may include two or more mixers and may be arranged for image rejection (e.g., Hartley image rejection). In some embodiments, the mixer circuitry 17106*a* of the receive signal path and the mixer circuitry 17106*a* of the transmit signal path may be arranged for direct downconversion and direct upconversion, respectively. In some embodiments, the mixer circuitry 17106*a* of the receive signal path and the mixer circuitry 17106*a* of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 17106 may include analog-to-digital converter (ADC) and digital-to-analog converter (DAC) circuitry and the baseband circuitry 17110 may include a digital baseband interface to communicate with the RF circuitry 17106.

In some dual-mode embodiments, a separate radio IC circuitry may be provided for processing signals for each spectrum, although the scope of the embodiments is not limited in this respect.

In some embodiments, the synthesizer circuitry 17106*d* may be a fractional-N synthesizer or a fractional N/N+1 synthesizer, although the scope of the embodiments is not limited in this respect as other types of frequency synthesizers may be suitable. For example, synthesizer circuitry 17106*d* may be a delta-sigma synthesizer, a frequency multiplier, or a synthesizer comprising a phase-locked loop with a frequency divider.

The synthesizer circuitry 17106*d* may be configured to synthesize an output frequency for use by the mixer circuitry 17106*a* of the RF circuitry 17106 based on a frequency input and a divider control input. In some embodiments, the synthesizer circuitry 17106*d* may be a fractional N/N+1 synthesizer.

In some embodiments, frequency input may be provided by a voltage-controlled oscillator (VCO), although that is not a requirement. Divider control input may be provided by either the baseband circuitry 17110 or the application circuitry 1505/1605 depending on the desired output frequency. In some embodiments, a divider control input (e.g., N) may be determined from a look-up table based on a channel indicated by the application circuitry 1505/1605.

Synthesizer circuitry 17106*d* of the RF circuitry 17106 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 17106*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 17106 may include an IQ/polar converter.

FEM circuitry 17108 may include a receive signal path, which may include circuitry configured to operate on RF signals received from antenna array 17111, amplify the received signals and provide the amplified versions of the received signals to the RF circuitry 17106 for further processing. FEM circuitry 17108 may also include a transmit signal path, which may include circuitry configured to amplify signals for transmission provided by the RF circuitry 17106 for transmission by one or more of antenna elements of antenna array 17111. In various embodiments, the amplification through the transmit or receive signal paths may be done solely in the RF circuitry 17106, solely in the FEM circuitry 17108, or in both the RF circuitry 17106 and the FEM circuitry 17108.

In some embodiments, the FEM circuitry 17108 may include a TX/RX switch to switch between transmit mode and receive mode operation. The FEM circuitry 17108 may include a receive signal path and a transmit signal path. The receive signal path of the FEM circuitry 17108 may include an LNA to amplify received RF signals and provide the amplified received RF signals as an output (e.g., to the RF circuitry 17106). The transmit signal path of the FEM circuitry 17108 may include a power amplifier (PA) to amplify input RF signals (e.g., provided by RF circuitry 17106), and one or more filters to generate RF signals for subsequent transmission by one or more antenna elements of the antenna array 17111.

The antenna array 17111 comprises one or more antenna elements, each of which is configured convert electrical signals into radio waves to travel through the air and to convert received radio waves into electrical signals. For example, digital baseband signals provided by the baseband circuitry 17110 is converted into analog RF signals (e.g., modulated waveform) that will be amplified and transmitted via the antenna elements of the antenna array 17111 including one or more antenna elements (not shown). The antenna elements may be omnidirectional, direction, or a combination thereof. The antenna elements may be formed in a multitude of arranges as are known and/or discussed herein. The antenna array 17111 may comprise microstrip antennas or printed antennas that are fabricated on the surface of one or more printed circuit boards. The antenna array 17111 may be formed in as a patch of metal foil (e.g., a patch antenna) in a variety of shapes, and may be coupled with the RF circuitry 17106 and/or FEM circuitry 17108 using metal transmission lines or the like.

Processors of the application circuitry 1505/1605 and processors of the baseband circuitry 17110 may be used to execute elements of one or more instances of a protocol stack. For example, processors of the baseband circuitry 17110, alone or in combination, may be used execute Layer 3, Layer 2, or Layer 1 functionality, while processors of the application circuitry 1505/1605 may utilize data (e.g., packet data) received from these layers and further execute Layer 4 functionality (e.g., TCP and UDP layers). As referred to herein, Layer 3 may comprise an RRC layer, described in further detail below. As referred to herein, Layer 2 may comprise a MAC layer, an RLC layer, and a PDCP layer, described in further detail below. As referred to herein, Layer 1 may comprise a PHY layer of a UE/RAN node, described in further detail below.

Figure 18:
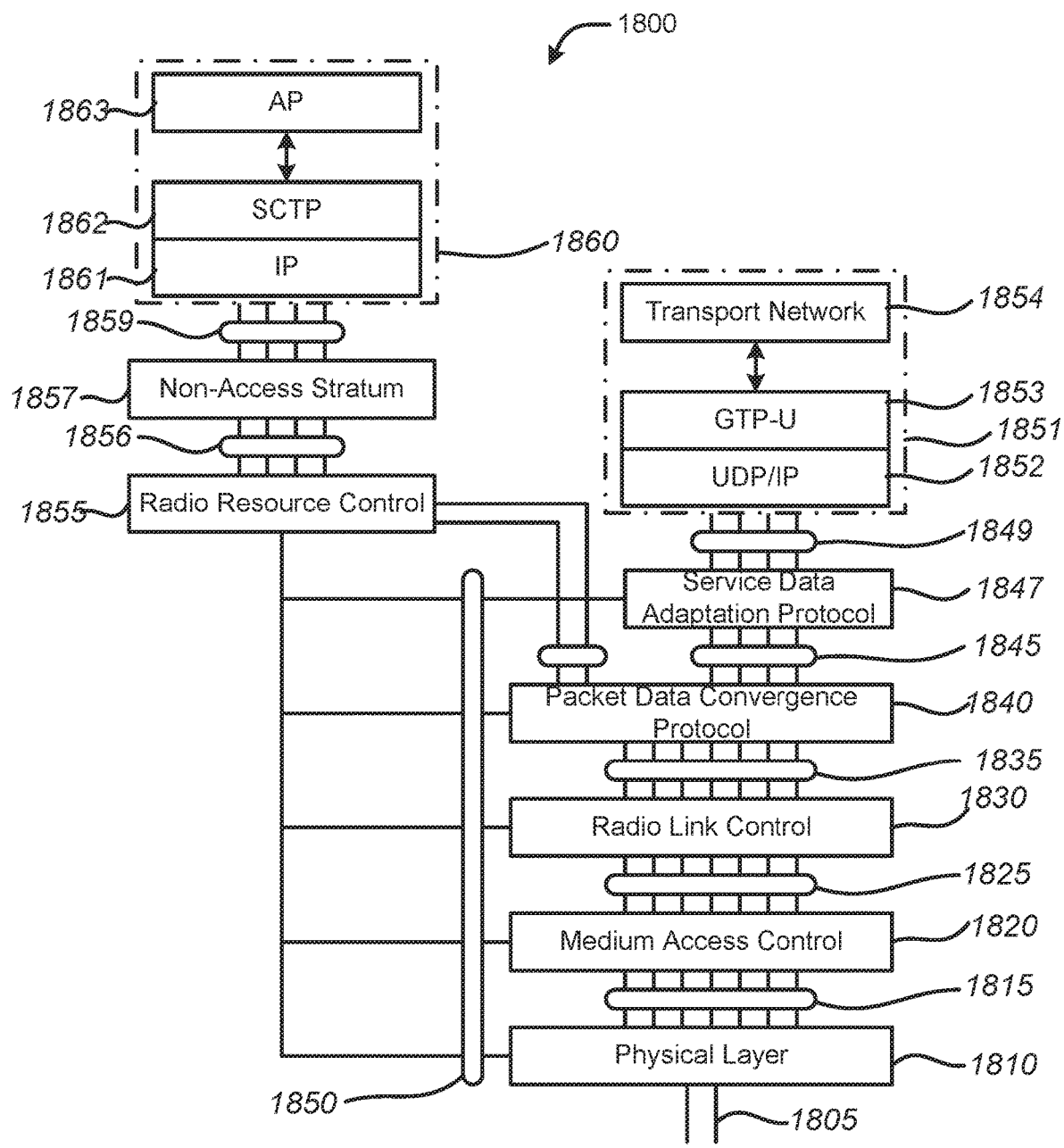
FIG. 18 illustrates various protocol functions that may be implemented in a wireless communication device, according to some embodiments.

FIG. 18 illustrates various protocol functions that may be implemented in a wireless communication device according to various embodiments. In particular, FIG. 18 includes an arrangement 1800 showing interconnections between various protocol layers/entities. The following description of FIG. 18 is provided for various protocol layers/entities that operate in conjunction with the 5G/NR system standards and LTE system standards, but some or all of the aspects of FIG. 18 may be applicable to other wireless communication network systems as well.

The protocol layers of arrangement 1800 may include one or more of PHY 1810, MAC 1820, RLC 1830, PDCP 1840, SDAP 1847, RRC 1855, and NAS layer 1857, in addition to other higher layer functions not illustrated. The protocol layers may include one or more service access points (e.g., items 1859, 1856, 1850, 1849, 1845, 1835, 1825, and 1815 in FIG. 18) that may provide communication between two or more protocol layers.

The PHY 1810 may transmit and receive physical layer signals 1805 that may be received from or transmitted to one or more other communication devices. The physical layer signals 1805 may comprise one or more physical channels, such as those discussed herein. The PHY 1810 may further perform link adaptation or adaptive modulation and coding (AMC), power control, cell search (e.g., for initial synchronization and handover purposes), and other measurements used by higher layers, such as the RRC 1855. The PHY 1810 may still further perform error detection on the transport channels, forward error correction (FEC) coding/decoding of the transport channels, modulation/demodulation of physical channels, interleaving, rate matching, mapping onto physical channels, and MIMO antenna processing. In embodiments, an instance of PHY 1810 may process requests from and provide indications to an instance of MAC 1820 via one or more PHY-SAP 1815. According to some embodiments, requests and indications communicated via PHY-SAP 1815 may comprise one or more transport channels.

Instance(s) of MAC 1820 may process requests from, and provide indications to, an instance of RLC 1830 via one or more MAC-SAPs 1825. These requests and indications communicated via the MAC-SAP 1825 may comprise one or more logical channels. The MAC 1820 may perform mapping between the logical channels and transport channels, multiplexing of MAC SDUs from one or more logical channels onto TBs to be delivered to PHY 1810 via the transport channels, de-multiplexing MAC SDUs to one or more logical channels from TBs delivered from the PHY 1810 via transport channels, multiplexing MAC SDUs onto TBs, scheduling information reporting, error correction through HARQ, and logical channel prioritization.

Instance(s) of RLC 1830 may process requests from and provide indications to an instance of PDCP 1840 via one or more radio link control service access points (RLC-SAP) 1835. These requests and indications communicated via RLC-SAP 1835 may comprise one or more RLC channels. The RLC 1830 may operate in a plurality of modes of operation, including: Transparent Mode (TM), Unacknowledged Mode (UM), and Acknowledged Mode (AM). The RLC 1830 may execute transfer of upper layer protocol data units (PDUs), error correction through automatic repeat request (ARQ) for AM data transfers, and concatenation, segmentation and reassembly of RLC SDUs for UM and AM data transfers. The RLC 1830 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

Instance(s) of PDCP 1840 may process requests from and provide indications to instance(s) of RRC 1855 and/or instance(s) of SDAP 1847 via one or more packet data convergence protocol service access points (PDCP-SAP) 1845. These requests and indications communicated via PDCP-SAP 1845 may comprise one or more radio bearers. The PDCP 1840 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

Instance(s) of SDAP 1847 may process requests from and provide indications to one or more higher layer protocol entities via one or more SDAP-SAP 1849. These requests and indications communicated via SDAP-SAP 1849 may comprise one or more QoS flows. The SDAP 1847 may map QoS flows to DRBs, and vice versa, and may also mark QFIs in DL and UL packets. A single SDAP entity 1847 may be configured for an individual PDU session. In the UL direction, the NG-RAN 1210 may control the mapping of QoS Flows to DRB(s) in two different ways, reflective mapping or explicit mapping. For reflective mapping, the SDAP 1847 of a UE 1201 may monitor the QFIs of the DL packets for each DRB, and may apply the same mapping for packets flowing in the UL direction. For a DRB, the SDAP 1847 of the UE 1201 may map the UL packets belonging to the QoS flows(s) corresponding to the QoS flow ID(s) and PDU session observed in the DL packets for that DRB. To enable reflective mapping, the NG-RAN 1410 may mark DL packets over the Uu interface with a QoS flow ID. The explicit mapping may involve the RRC 1855 configuring the SDAP 1847 with an explicit QoS flow to DRB mapping rule, which may be stored and followed by the SDAP 1847. In embodiments, the SDAP 1847 may only be used in NR implementations and may not be used in LTE implementations.

The RRC 1855 may configure, via one or more management service access points (M-SAP), aspects of one or more protocol layers, which may include one or more instances of PHY 1810, MAC 1820, RLC 1830, PDCP 1840 and SDAP 1847. In embodiments, an instance of RRC 1855 may process requests from and provide indications to one or more NAS entities 1857 via one or more RRC-SAPs 1856. The main services and functions of the RRC 1855 may include broadcast of system information (e.g., included in MIBs or SIBs related to the NAS), broadcast of system information related to the access stratum (AS), paging, establishment, maintenance and release of an RRC connection between the UE 1201 and RAN 1210 (e.g., RRC connection paging, RRC connection establishment, RRC connection modification, and RRC connection release), establishment, configuration, maintenance and release of point to point Radio Bearers, security functions including key management, inter-RAT mobility, and measurement configuration for UE measurement reporting. The MIBs and SIBs may comprise one or more IEs, which may each comprise individual data fields or data structures.

The NAS 1857 may form the highest stratum of the control plane between the UE 1201 and the AMF 1421. The NAS 1857 may support the mobility of the UEs 1201 and the session management procedures to establish and maintain IP connectivity between the UE 1201 and a P-GW in LTE systems.

According to various embodiments, one or more protocol entities of arrangement 1800 may be implemented in UEs 1201, RAN nodes 1211, AMF 1421 in NR implementations or MME 1321 in LTE implementations, UPF 1402 in NR implementations or S-GW 1322 and P-GW 1323 in LTE implementations, or the like to be used for control plane or user plane communications protocol stack between the aforementioned devices. In such embodiments, one or more protocol entities that may be implemented in one or more of UE 1201, gNB 1211, AMF 1421, etc. may communicate with a respective peer protocol entity that may be implemented in or on another device using the services of respective lower layer protocol entities to perform such communication. In some embodiments, a gNB-CU of the gNB 1211 may host the RRC 1855, SDAP 1847, and PDCP 1840 of the gNB that controls the operation of one or more gNB-DUs, and the gNB-DUs of the gNB 1211 may each host the RLC 1830, MAC 1820, and PHY 1810 of the gNB 1211.

In a first example, a control plane protocol stack may comprise, in order from highest layer to lowest layer, NAS 1857, RRC 1855, PDCP 1840, RLC 1830, MAC 1820, and PHY 1810. In this example, upper layers 1860 may be built on top of the NAS 1857, which includes an IP layer 1861, an SCTP 1862, and an application layer signaling protocol (AP) 1863.

In NR implementations, the AP 1863 may be an NG application protocol layer (NGAP or NG-AP) 1863 for the NG interface 1213 defined between the NG-RAN node 1211 and the AMF 1421, or the AP 1863 may be an Xn application protocol layer (XnAP or Xn-AP) 1863 for the Xn interface 1212 that is defined between two or more RAN nodes 1211.

The NG-AP 1863 may support the functions of the NG interface 1213 and may comprise Elementary Procedures (EPs). An NG-AP EP may be a unit of interaction between the NG-RAN node 1211 and the AMF 1421. The NG-AP 1863 services may comprise two groups: UE-associated services (e.g., services related to a UE 1201) and non-UE-associated services (e.g., services related to the whole NG interface instance between the NG-RAN node 1211 and AMF 1421). These services may include functions including, but not limited to: a paging function for the sending of paging requests to NG-RAN nodes 1211 involved in a particular paging area; a UE context management function for allowing the AMF 1421 to establish, modify, and/or release a UE context in the AMF 1421 and the NG-RAN node 1211; a mobility function for UEs 1201 in ECM-CONNECTED mode for intra-system HOs to support mobility within NG-RAN and inter-system HOs to support mobility from/to EPS systems; a NAS Signaling Transport function for transporting or rerouting NAS messages between UE 1201 and AMF 1421; a NAS node selection function for determining an association between the AMF 1421 and the UE 1201; NG interface management function(s) for setting up the NG interface and monitoring for errors over the NG interface; a warning message transmission function for providing means to transfer warning messages via NG interface or cancel ongoing broadcast of warning messages; a Configuration Transfer function for requesting and transferring of RAN configuration information (e.g., SON information, performance measurement (PM) data, etc.) between two RAN nodes 1211 via CN 1220; and/or other like functions.

The XnAP 1863 may support the functions of the Xn interface 1212 and may comprise XnAP basic mobility procedures and XnAP global procedures. The XnAP basic mobility procedures may comprise procedures used to handle UE mobility within the NG RAN 1211 (or E-UTRAN 1310), such as handover preparation and cancellation procedures, SN Status Transfer procedures, UE context retrieval and UE context release procedures, RAN paging procedures, dual connectivity related procedures, and the like. The XnAP global procedures may comprise procedures that are not related to a specific UE 1201, such as Xn interface setup and reset procedures, NG-RAN update procedures, cell activation procedures, and the like.

In LTE implementations, the AP 1863 may be an S1 Application Protocol layer (S1-AP) 1863 for the S1 interface 1213 defined between an E-UTRAN node 1211 and an MME, or the AP 1863 may be an X2 application protocol layer (X2AP or X2-AP) 1863 for the X2 interface 1212 that is defined between two or more E-UTRAN nodes 1211.

The S1 Application Protocol layer (S1-AP) 1863 may support the functions of the S1 interface, and similar to the NG-AP discussed previously, the S1-AP may comprise S1-AP EPs. An S1-AP EP may be a unit of interaction between the E-UTRAN node 1211 and an MME 1321 within an LTE CN 1220. The S1-AP 1863 services may comprise two groups: UE-associated services and non-UE-associated services. These services perform functions including, but not limited to: E-UTRAN Radio Access Bearer (E-RAB) management, UE capability indication, mobility, NAS signaling transport, RAN Information Management (RIM), and configuration transfer.

The X2AP 1863 may support the functions of the X2 interface 1212 and may comprise X2AP basic mobility procedures and X2AP global procedures. The X2AP basic mobility procedures may comprise procedures used to handle UE mobility within the E-UTRAN 1220, such as handover preparation and cancellation procedures, SN Status Transfer procedures, UE context retrieval and UE context release procedures, RAN paging procedures, dual connectivity related procedures, and the like. The X2AP global procedures may comprise procedures that are not related to a specific UE 1201, such as X2 interface setup and reset procedures, load indication procedures, error indication procedures, cell activation procedures, and the like.

The SCTP layer (alternatively referred to as the SCTP/IP layer) 1862 may provide guaranteed delivery of application layer messages (e.g., NGAP or XnAP messages in NR implementations, or S1-AP or X2AP messages in LTE implementations). The SCTP 1862 may ensure reliable delivery of signaling messages between the RAN node 1211 and the AMF 1421/MME 1321 based, in part, on the IP protocol, supported by the IP 1861. The Internet Protocol layer (IP) 1861 may be used to perform packet addressing and routing functionality. In some implementations the IP layer 1861 may use point-to-point transmission to deliver and convey PDUs. In this regard, the RAN node 1211 may comprise L2 and L1 layer communication links (e.g., wired or wireless) with the MIME/AMF to exchange information.

In a second example, a user plane protocol stack may comprise, in order from highest layer to lowest layer, SDAP 1847, PDCP 1840, RLC 1830, MAC 1820, and PHY 1810. The user plane protocol stack may be used for communication between the UE 1201, the RAN node 1211, and UPF 1402 in NR implementations or an S-GW 1322 and P-GW 1323 in LTE implementations. In this example, upper layers 1851 may be built on top of the SDAP 1847, and may include a user datagram protocol (UDP) and IP security layer (UDP/IP) 1852, a General Packet Radio Service (GPRS) Tunneling Protocol for the user plane layer (GTP-U) 1853, and a User Plane PDU layer (UP PDU) 1863.

The transport network layer 1854 (also referred to as a "transport layer") may be built on IP transport, and the GTP-U 1853 may be used on top of the UDP/IP layer 1852 (comprising a UDP layer and IP layer) to carry user plane PDUs (UP-PDUs). The IP layer (also referred to as the "Internet layer") may be used to perform packet addressing and routing functionality. The IP layer may assign IP addresses to user data packets in any of IPv4, IPv6, or PPP formats, for example.

The GTP-U 1853 may be used for carrying user data within the GPRS core network and between the radio access network and the core network. The user data transported can be packets in any of IPv4, IPv6, or PPP formats, for example. The UDP/IP 1852 may provide checksums for data integrity, port numbers for addressing different functions at the source and destination, and encryption and authentication on the selected data flows. The RAN node 1211 and the S-GW 1322 may utilize an S1-U interface to exchange user plane data via a protocol stack comprising an L1 layer (e.g., PHY 1810), an L2 layer (e.g., MAC 1820, RLC 1830, PDCP 1840, and/or SDAP 1847), the UDP/IP layer 1852, and the GTP-U 1853. The S-GW 1322 and the P-GW 1323 may utilize an S5/S8a interface to exchange user plane data via a protocol stack comprising an L1 layer, an L2 layer, the UDP/IP layer 1852, and the GTP-U 1853. As discussed previously, NAS protocols may support the mobility of the UE 1201 and the session management procedures to establish and maintain IP connectivity between the UE 1201 and the P-GW 1323.

Moreover, although not shown by FIG. 18, an application layer may be present above the AP 1863 and/or the transport network layer 1854. The application layer may be a layer in which a user of the UE 1201, RAN node 1211, or other network element interacts with software applications being executed, for example, by application circuitry 1505 or application circuitry 1605, respectively. The application layer may also provide one or more interfaces for software applications to interact with communications systems of the UE 1201 or RAN node 1211, such as the baseband circuitry 17110. In some implementations the IP layer and/or the application layer may provide the same or similar functionality as layers 5-7, or portions thereof, of the Open Systems Interconnection (OSI) model (e.g., OSI Layer 7—the application layer, OSI Layer 6—the presentation layer, and OSI Layer 5—the session layer).

Figure 19:
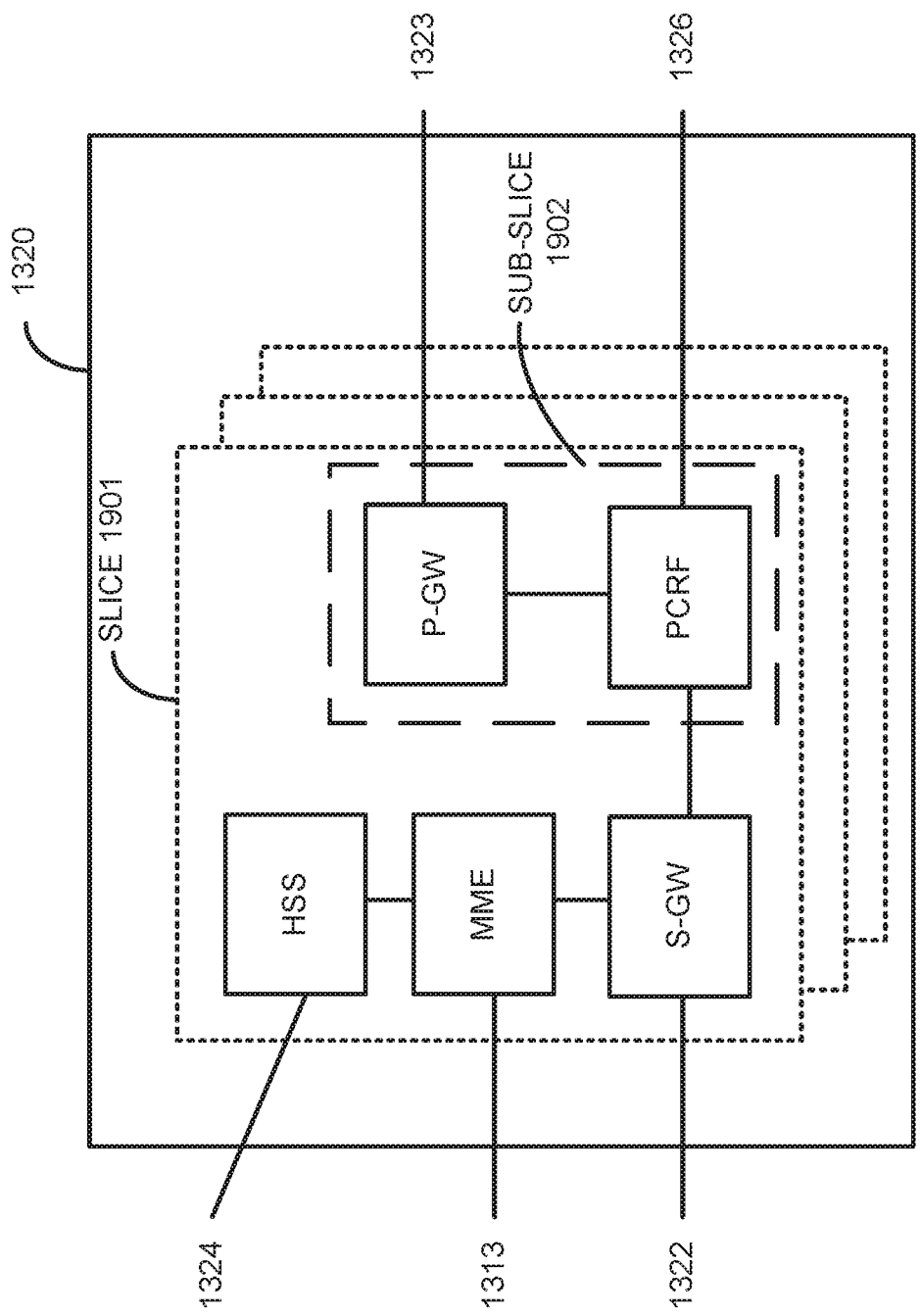
FIG. 19 illustrates components of a core network, according to some embodiments.

FIG. 19 illustrates components of a core network in accordance with various embodiments. The components of the CN 1320 may be implemented in one physical node or separate physical nodes including components to read and execute instructions from a machine-readable or computer-readable medium (e.g., a non-transitory machine-readable storage medium). In embodiments, the components of CN 1420 may be implemented in a same or similar manner as discussed herein with regard to the components of CN 1320. In some embodiments, NFV is utilized to virtualize any or all of the above-described network node functions via executable instructions stored in one or more computer-readable storage mediums (described in further detail below). A logical instantiation of the CN 1320 may be referred to as a network slice 1901, and individual logical instantiations of the CN 1320 may provide specific network capabilities and network characteristics. A logical instantiation of a portion of the CN 1320 may be referred to as a network sub-slice 1902 (e.g., the network sub-slice 1902 is shown to include the P-GW 1323 and the PCRF 1326).

As used herein, the terms "instantiate," "instantiation," and the like may refer to the creation of an instance, and an "instance" may refer to a concrete occurrence of an object, which may occur, for example, during execution of program code. A network instance may refer to information identifying a domain, which may be used for traffic detection and routing in case of different IP domains or overlapping IP addresses. A network slice instance may refer to a set of network functions (NFs) instances and the resources (e.g., compute, storage, and networking resources) required to deploy the network slice.

With respect to 5G systems (see, e.g., FIG. 14), a network slice always comprises a RAN part and a CN part. The support of network slicing relies on the principle that traffic for different slices is handled by different PDU sessions. The network can realize the different network slices by scheduling and also by providing different L1/L2 configurations. The UE 1401 provides assistance information for network slice selection in an appropriate RRC message, if it has been provided by NAS. While the network can support large number of slices, the UE need not support more than 8 slices simultaneously.

A network slice may include the CN 1420 control plane and user plane NFs, NG-RANs 1410 in a serving PLMN, and a N3IWF functions in the serving PLMN. Individual network slices may have different S-NSSAI and/or may have different SSTs. NSSAI includes one or more S-NSSAIs, and each network slice is uniquely identified by an S-NSSAI. Network slices may differ for supported features and network functions optimizations, and/or multiple network slice instances may deliver the same service/features but for different groups of UEs 1401 (e.g., enterprise users). For example, individual network slices may deliver different committed service(s) and/or may be dedicated to a particular customer or enterprise. In this example, each network slice may have different S-NSSAIs with the same SST but with different slice differentiators. Additionally, a single UE may be served with one or more network slice instances simultaneously via a 5G AN and associated with eight different S-NSSAIs. Moreover, an AMF 1421 instance serving an individual UE 1401 may belong to each of the network slice instances serving that UE.

Network Slicing in the NG-RAN 1410 involves RAN slice awareness. RAN slice awareness includes differentiated handling of traffic for different network slices, which have been pre-configured. Slice awareness in the NG-RAN 1410 is introduced at the PDU session level by indicating the S-NSSAI corresponding to a PDU session in all signaling that includes PDU session resource information. How the NG-RAN 1410 supports the slice enabling in terms of NG-RAN functions (e.g., the set of network functions that comprise each slice) is implementation dependent. The NG-RAN 1410 selects the RAN part of the network slice using assistance information provided by the UE 1401 or the 5GC 1420, which unambiguously identifies one or more of the pre-configured network slices in the PLMN. The NG-RAN 1410 also supports resource management and policy enforcement between slices as per SLAs. A single NG-RAN node may support multiple slices, and the NG-RAN 1410 may also apply an appropriate RRM policy for the SLA in place to each supported slice. The NG-RAN 1410 may also support QoS differentiation within a slice.

The NG-RAN 1410 may also use the UE assistance information for the selection of an AMF 1421 during an initial attach, if available. The NG-RAN 1410 uses the assistance information for routing the initial NAS to an AMF 1421. If the NG-RAN 1410 is unable to select an AMF 1421 using the assistance information, or the UE 1401 does not provide any such information, the NG-RAN 1410 sends the NAS signaling to a default AMF 1421, which may be among a pool of AMFs 1421. For subsequent accesses, the UE 1401 provides a temp ID, which is assigned to the UE 1401 by the 5GC 1420, to enable the NG-RAN 1410 to route the NAS message to the appropriate AMF 1421 as long as the temp ID is valid. The NG-RAN 1410 is aware of, and can reach, the AMF 1421 that is associated with the temp ID. Otherwise, the method for initial attach applies.

The NG-RAN 1410 supports resource isolation between slices. NG-RAN 1410 resource isolation may be achieved by means of RRM policies and protection mechanisms that should avoid that shortage of shared resources if one slice breaks the service level agreement for another slice. In some implementations, it is possible to fully dedicate NG-RAN 1410 resources to a certain slice. How NG-RAN 1410 supports resource isolation is implementation dependent.

Some slices may be available only in part of the network. Awareness in the NG-RAN 1410 of the slices supported in the cells of its neighbors may be beneficial for inter-frequency mobility in connected mode. The slice availability may not change within the UE's registration area. The NG-RAN 1410 and the 5GC 1420 are responsible to handle a service request for a slice that may or may not be available in a given area. Admission or rejection of access to a slice may depend on factors such as support for the slice, availability of resources, support of the requested service by NG-RAN 1410.

The UE 1401 may be associated with multiple network slices simultaneously. In case the UE 1401 is associated with multiple slices simultaneously, only one signaling connection is maintained, and for intra-frequency cell reselection, the UE 1401 tries to camp on the best cell. For inter-frequency cell reselection, dedicated priorities can be used to control the frequency on which the UE 1401 camps. The 5GC 1420 is to validate that the UE 1401 has the rights to access a network slice. Prior to receiving an Initial Context Setup Request message, the NG-RAN 1410 may be allowed to apply some provisional/local policies, based on awareness of a particular slice that the UE 1401 is requesting to access. During the initial context setup, the NG-RAN 1410 is informed of the slice for which resources are being requested.

NFV architectures and infrastructures may be used to virtualize one or more NFs, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Figure 20:
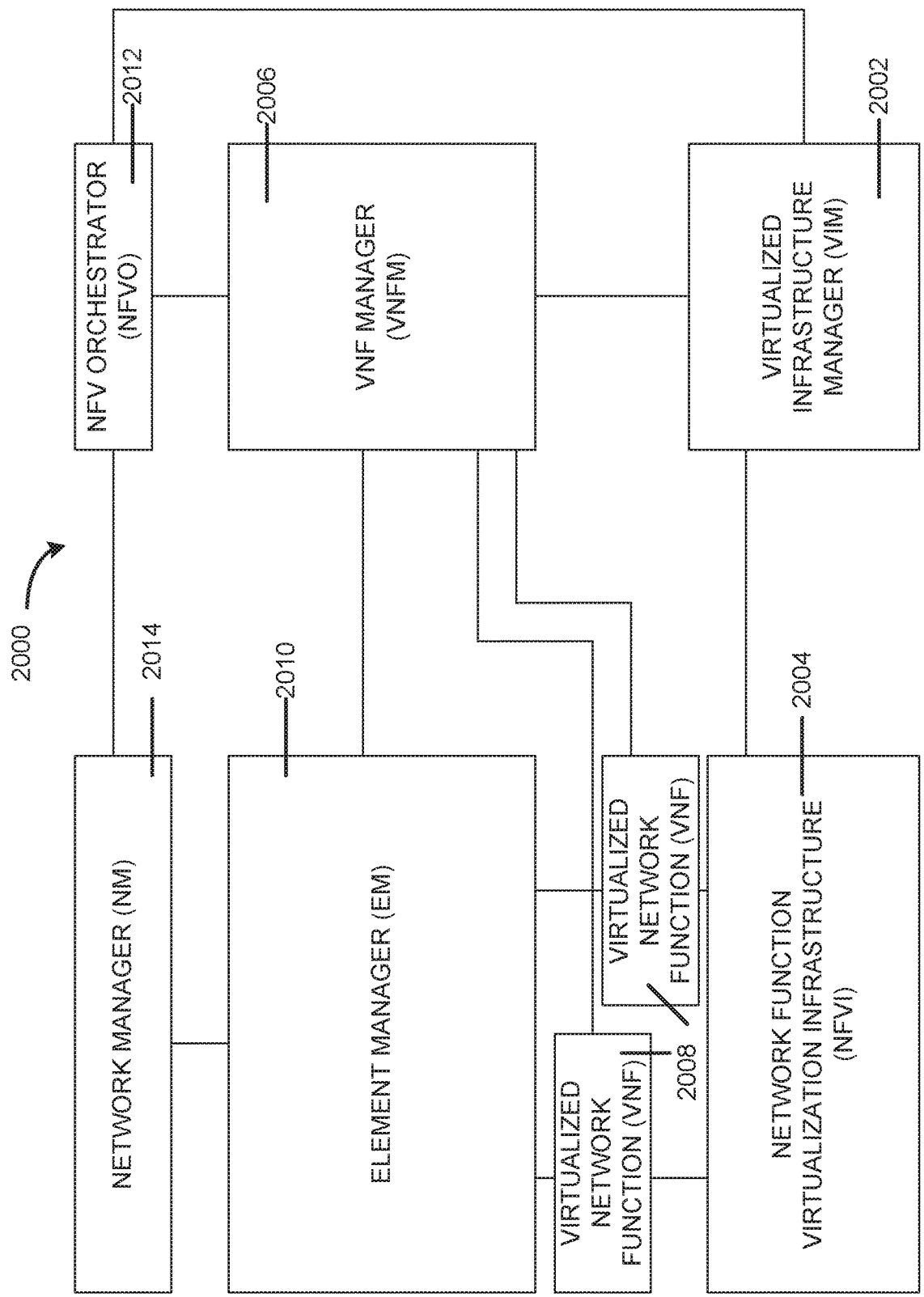
FIG. 20 is a block diagram illustrating components of a system to support NFV, according to some embodiments.

FIG. 20 is a block diagram illustrating components, according to some example embodiments, of a system 2000 to support NFV. The system 2000 is illustrated as including a VIM 2002, an NFVI 2004, an VNFM 2006, VNFs 2008, an EM 2010, an NFVO 2012, and a NM 2014.

The VIM 2002 manages the resources of the NFVI 2004. The NFVI 2004 can include physical or virtual resources and applications (including hypervisors) used to execute the system 2000. The VIM 2002 may manage the life cycle of virtual resources with the NFVI 2004 (e.g., creation, maintenance, and tear down of VMs associated with one or more physical resources), track VM instances, track performance, fault and security of VM instances and associated physical resources, and expose VM instances and associated physical resources to other management systems.

The VNFM 2006 may manage the VNFs 2008. The VNFs 2008 may be used to execute EPC components/functions. The VNFM 2006 may manage the life cycle of the VNFs 2008 and track performance, fault and security of the virtual aspects of VNFs 2008. The EM 2010 may track the performance, fault and security of the functional aspects of VNFs 2008. The tracking data from the VNFM 2006 and the EM 2010 may comprise, for example, PM data used by the VIM 2002 or the NFVI 2004. Both the VNFM 2006 and the EM 2010 can scale up/down the quantity of VNFs of the system 2000.

The NFVO 2012 may coordinate, authorize, release and engage resources of the NFVI 2004 in order to provide the requested service (e.g., to execute an EPC function, component, or slice). The NM 2014 may provide a package of end-user functions with the responsibility for the management of a network, which may include network elements with VNFs, non-virtualized network functions, or both (management of the VNFs may occur via the EM 2010).

Figure 21:
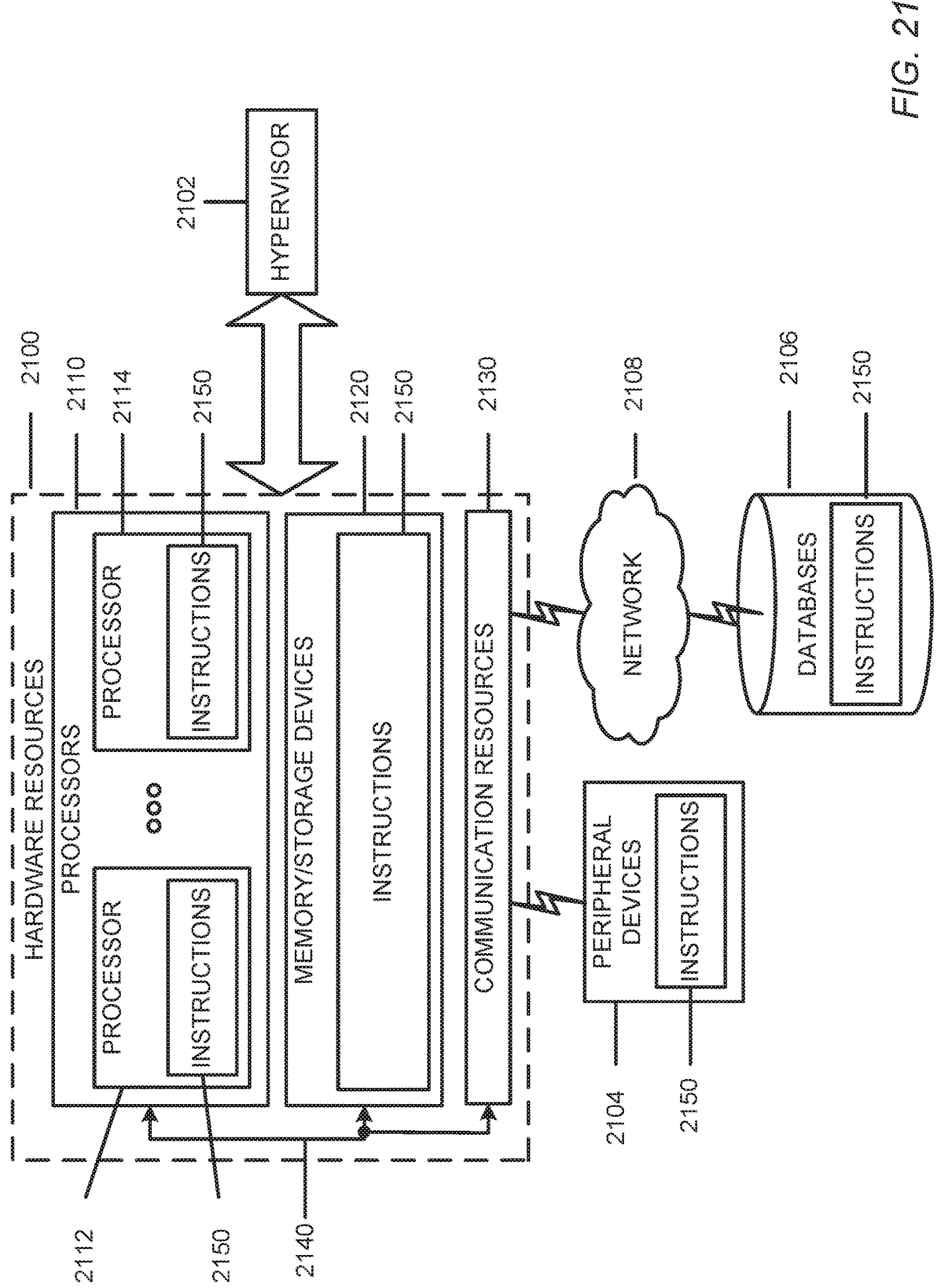
FIG. 21 is a block diagram illustrating components able to read instructions from a machine-readable or computer-readable medium (e.g., a non-transitory machine-readable storage medium) and perform any one or more of the methodologies discussed herein, according to some embodiments.

FIG. 21 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 21 shows a diagrammatic representation of hardware resources 2100 including one or more processors (or processor cores) 2110, one or more memory/storage devices 2120, and one or more communication resources 2130, each of which may be communicatively coupled via a bus 2140. For embodiments where node virtualization (e.g., NFV) is utilized, a hypervisor 2102 may be executed to provide an execution environment for one or more network slices/sub-slices to utilize the hardware resources 2100.

The processors 2110 may include, for example, a processor 2112 and a processor 2114. The processor(s) 2110 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 2120 may include main memory, disk storage, or any suitable combination thereof. The memory/storage devices 2120 may include, but are not limited to, any type of volatile or nonvolatile memory such as dynamic random-access memory (DRAM), static random access memory (SRAM), erasable programmable read-only memory (EPROM), electrically erasable programmable read-only memory (EEPROM), Flash memory, solid-state storage, etc.

The communication resources 2130 may include interconnection or network interface components or other suitable devices to communicate with one or more peripheral devices 2104 or one or more databases 2106 via a network 2108. For example, the communication resources 2130 may include wired communication components (e.g., for coupling via USB), cellular communication components, NFC components, Bluetooth® (or Bluetooth® Low Energy) components, Wi-Fi® components, and other communication components.

Instructions 2150 may comprise software, a program, an application, an applet, an app, or other executable code for causing at least any of the processors 2110 to perform any one or more of the methodologies discussed herein. The instructions 2150 may reside, completely or partially, within at least one of the processors 2110 (e.g., within the processor's cache memory), the memory/storage devices 2120, or any suitable combination thereof. Furthermore, any portion of the instructions 2150 may be transferred to the hardware resources 2100 from any combination of the peripheral devices 2104 or the databases 2106. Accordingly, the memory of processors 2110, the memory/storage devices 2120, the peripheral devices 2104, and the databases 2106 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A base station, comprising:
   at least one antenna;
   at least one radio, wherein the at least one radio is configured to perform cellular communication using at least one radio access technology (RAT); and
   one or more processors communicatively coupled to the at least one radio, wherein the one or more processors and the at least one radio are configured to perform voice and/or data communications;
   wherein the one or more processors are configured to cause the base station to:
   serve a user equipment (UE) device as a master node in a core network;
   inter-connect with a first secondary node in the core network;
   initiate a change from the first secondary node to a second secondary node in the core network;
   determine data forwarding from the first secondary node to the second secondary node;
   receive, from the first secondary node, a report of dedicated radio bearer (DRB) mapping for first secondary node terminated bearers using secondary cell group resources; and
   send, to the first secondary node, data forwarding instructions, wherein the data forwarding instructions include a requirement for the first secondary node to follow the data forwarding instructions.

2. The base station of claim 1,
   wherein, to initiate the change from the first secondary node to the second secondary node, the one or more processors are further configured to cause the base station to:
   initiate a hand-over procedure to another master node in the core network.

3. The base station of claim 1,
   wherein the report of DRB mapping is received via control plane signaling between the base station and the first secondary node.

4. The base station of claim 1,
   wherein the one or more processors are further configured to cause the base station to:
   request, from the first secondary node, data forwarding intentions of the first secondary node prior to initiating the change from the first secondary node to the second secondary node; and
   receive, form the first secondary node, data forwarding intentions of the first secondary node; and
   wherein the data forwarding instructions are based, at least in part, on the data forwarding intentions of the first secondary node.

5. The base station of claim 4,
   wherein the data forwarding intentions of the first secondary node are received via control plane signaling between the base station and the first secondary node.

6. The base station of claim 1
   wherein the data forwarding instructions include data forwarding addresses.

7. The base station of claim 1,
   wherein the one or more processors are further configured to cause the base station to:
   generate a protocol data unit (PDU) session resource modification information element (IE) to modify dedicated resource bearers (DRBs) configured with a secondary node-terminated bearer option, wherein the session resource modification information IE includes a data forwarding and offloading information query parameter; and transmit the PDU session resource modification information IE to a core access and mobility management function (AMF) of the core network.

8. A processor configured to cause a wireless device to:
inter-connect with a first secondary node in a core network, wherein the first secondary node serves a user equipment (UE) device attached to the core network;
initiate a change from the first secondary node to a second secondary node in the core network;
determine data forwarding from the first secondary node to the second secondary node;
receive, from the first secondary node, a report of dedicated radio bearer (DRB) mapping for first secondary node terminated bearers using secondary cell group resources; and
generate instructions to send, to the first secondary node, data forwarding instructions, wherein the data forwarding instructions include a requirement for the first secondary node to follow the data forwarding instructions.

9. The processor of claim 8,
wherein the report of DRB mapping is received via user plane signaling.

10. The processor of claim 8,
wherein the processor is further configured to:
request, from the first secondary node, data forwarding intentions of the first secondary node prior to initiating the change from the first secondary node to the second secondary node; and
receive, form the first secondary node, data forwarding intentions of the first secondary node, wherein the data forwarding intentions of the first secondary node are received via user plane signaling; and
wherein the data forwarding instructions are based, at least in part, on the data forwarding intentions of the first secondary node.

11. The processor of claim 8
wherein the data forwarding instructions include data forwarding addresses.

12. The processor of claim 8,
wherein the processor is further configured to:
generate a protocol data unit (PDU) session resource modification information element (IE) to modify dedicated resource bearers (DRBs) configured with a secondary node-terminated bearer option; and
transmit the PDU session resource modification information IE to a core access and mobility management function (AMF) of the core network.

13. The processor of claim 12,
wherein the session resource modification information IE includes a data forwarding and offloading information query parameter.

14. A non-transitory memory medium storing program instructions executable by processing circuitry to cause a network node to:
inter-connect with a first secondary node in a core network, wherein the first secondary node serves a user equipment (UE) device attached to the core network;
initiate a change from the first secondary node to a second secondary node in the core network;
determine data forwarding from the first secondary node to the second secondary node;
receive, from the first secondary node, a report of dedicated radio bearer (DRB) mapping for first secondary node terminated bearers using secondary cell group resources; and
send, to the first secondary node, data forwarding instructions, wherein the data forwarding instructions include a requirement for the first secondary node to follow the data forwarding instructions, and wherein the data forwarding instructions include data forwarding addresses.

15. The non-transitory memory medium of claim 14,
wherein, to initiate the change from the first secondary node to the second secondary node, the program instructions are further executable to cause the network node to:
initiate a hand-over procedure to another master node in the core network.

16. The non-transitory memory medium of claim 14,
wherein the report of DRB mapping is received via user plane signaling.

17. The non-transitory memory medium of claim 14,
wherein the program instructions are further executable to cause the network node to:
request, from the first secondary node, data forwarding intentions of the first secondary node prior to initiating the change from the first secondary node to the second secondary node; and
receive, form the first secondary node, data forwarding intentions of the first secondary node, wherein the data forwarding intentions of the first secondary node are received via control plane signaling between the network node and the first secondary node; and
wherein the data forwarding instructions are based, at least in part, on the data forwarding intentions of the first secondary node.

18. The non-transitory memory medium of claim 14,
wherein the program instructions are further executable to cause the network node to:
generate a protocol data unit (PDU) session resource modification information element (IE) to modify dedicated resource bearers (DRBs) configured with a secondary node-terminated bearer option; and
transmit the PDU session resource modification information IE to a core access and mobility management function (AMF) of the core network.

19. The non-transitory memory medium of claim 18,
wherein the session resource modification information IE includes a data forwarding and offloading information query parameter.

20. The non-transitory memory medium of claim 14,
wherein the data forwarding instructions include data forwarding addresses.

* * * * *